US012041362B2

(12) United States Patent
Sakurabu et al.

(10) Patent No.: US 12,041,362 B2
(45) Date of Patent: Jul. 16, 2024

(54) IMAGING APPARATUS, OPERATION METHOD OF IMAGING APPARATUS, AND PROGRAM

(71) Applicant: FUJIFILM CORPORATION, Tokyo (JP)

(72) Inventors: Hitoshi Sakurabu, Saitama (JP); Ryo Hasegawa, Saitama (JP); Tomoyuki Kawai, Saitama (JP); Makoto Kobayashi, Saitama (JP); Kazufumi Sugawara, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 14 days.

(21) Appl. No.: 17/805,689

(22) Filed: Jun. 7, 2022

(65) Prior Publication Data

US 2022/0303475 A1 Sep. 22, 2022

Related U.S. Application Data

(63) Continuation of application No. PCT/JP2020/039715, filed on Oct. 22, 2020.

(30) Foreign Application Priority Data

Jan. 31, 2020 (JP) .................................. 2020-015747

(51) Int. Cl.
*H04N 23/959* (2023.01)
*H04N 5/265* (2006.01)
(Continued)

(52) U.S. Cl.
CPC ........... *H04N 23/959* (2023.01); *H04N 5/265* (2013.01); *H04N 23/61* (2023.01); *H04N 23/672* (2023.01)

(58) Field of Classification Search
CPC ...... H04N 23/959; H04N 5/265; H04N 23/61; H04N 23/672; H04N 23/951; H04N 25/40;
(Continued)

(56) References Cited

U.S. PATENT DOCUMENTS 9,288,377 B2 * 3/2016 Peng ...................... H04N 25/70
2013/0308036 A1 11/2013 Peng
(Continued)

FOREIGN PATENT DOCUMENTS

JP 2009-088742 A 4/2009
JP 2015-080179 A 4/2015
(Continued)

OTHER PUBLICATIONS

International Search Report issued in International Application No. PCT/JP2020/039715 dated Dec. 28, 2020.
(Continued)

*Primary Examiner* — Michael E Teitelbaum
(74) *Attorney, Agent, or Firm* — SOLARIS Intellectual Property Group, PLLC

(57) ABSTRACT

An imaging apparatus includes an imaging element that incorporates a memory which stores image data obtained by imaging an imaging region at a first frame rate, and a first processor configured to output the image data at a second frame rate less than or equal to the first frame rate, and an imaging lens including a focus lens, in which the first processor is configured to generate combined image data based on the image data of the number of frames decided in accordance with a depth of field with respect to the imaging region out of the image data of a plurality of frames obtained by imaging the imaging region at different positions of the focus lens.

23 Claims, 35 Drawing Sheets

(51) Int. Cl.
*H04N 23/61* (2023.01)
*H04N 23/67* (2023.01)

(58) Field of Classification Search
CPC .......... G02B 7/34; G03B 7/091; G03B 13/36; G03B 15/00
See application file for complete search history.

(56) References Cited

U.S. PATENT DOCUMENTS

| | | | |
|---|---|---|---|
| 2014/0043435 A1* | 2/2014 | Blayvas | H04N 13/271 |
| | | | 348/46 |
| 2016/0014397 A1* | 1/2016 | Konno | G06T 5/003 |
| | | | 348/49 |
| 2016/0191784 A1 | 6/2016 | Murayama et al. | |
| 2019/0089908 A1* | 3/2019 | Matsunaga | H04N 5/268 |
| 2020/0186723 A1* | 6/2020 | Kang | H04N 25/46 |
| 2021/0044757 A1 | 2/2021 | Kuriyama et al. | |

FOREIGN PATENT DOCUMENTS

| | | |
|---|---|---|
| JP | 2016-032180 A | 3/2016 |
| JP | 2019-054461 A | 4/2019 |
| WO | 2015/020038 A1 | 2/2015 |
| WO | 2019/220584 A1 | 11/2019 |

OTHER PUBLICATIONS

Written Opinion of the ISA issued in International Application No. PCT/JP2020/039715 dated Dec. 28, 2020.
International Preliminary Report on Patentability issued in International Application No. PCT/JP2020/039715 dated Jun. 8, 2021.

\* cited by examiner

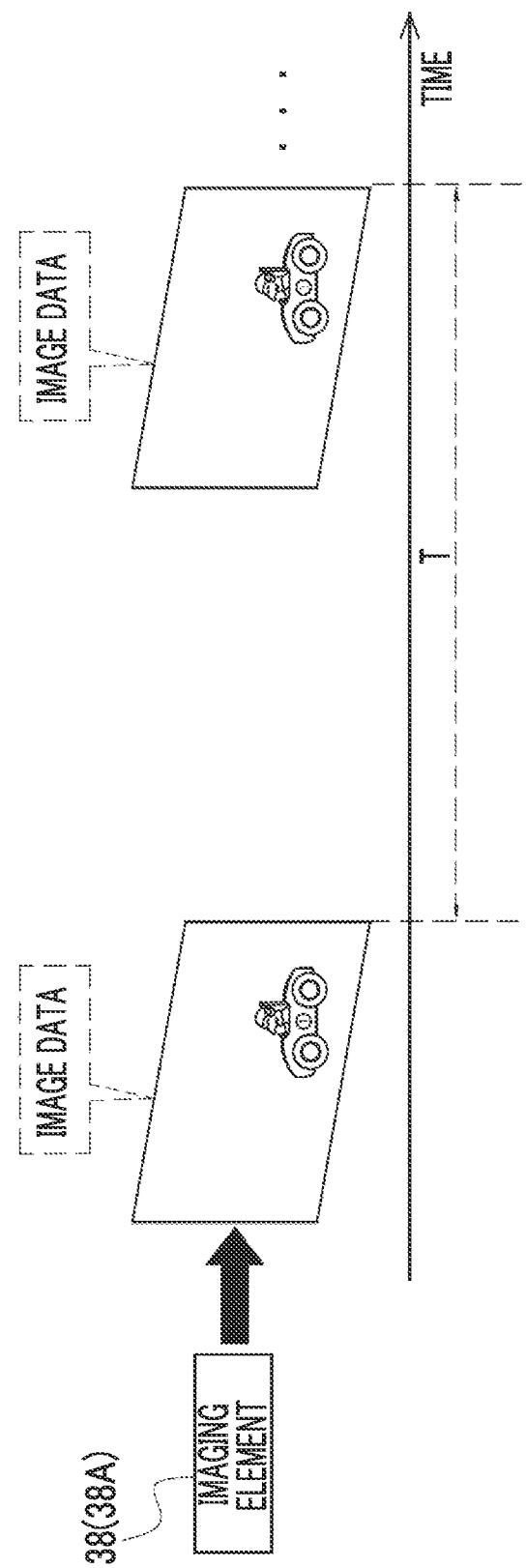

IMAGING APPARATUS, OPERATION METHOD OF IMAGING APPARATUS, AND PROGRAM

CROSS-REFERENCE TO RELATED APPLICATIONS

This application is a continuation application of International Application No. PCT/JP2020/039715, filed Oct. 22, 2020, the disclosure of which is incorporated herein by reference in its entirety. Further, this application claims priority from Japanese Patent Application No. 2020-015747, filed Jan. 31, 2020, the disclosure of which is incorporated herein by reference in its entirety.

BACKGROUND OF THE INVENTION

Field of the Invention

The technology of the present disclosure relates to an imaging apparatus, an operation method of an imaging apparatus, and a program.

Description of the Related Art

JP2019-054461A discloses an imaging apparatus comprising an imaging portion, an image generation portion, a focusing position setting portion, a combined image generation portion, an imaging information acquisition portion, a displayed image decision portion, and a display portion. The imaging portion includes an imaging element and converts a subject image into image data. The image generation portion generates a display image from the acquired image data. The focusing position setting portion sets a focusing position of the subject image. The combined image generation portion generates a combined image having a deep depth of field from a plurality of combining images acquired by the imaging portion at each of a plurality of set focusing positions. The imaging information acquisition portion acquires information about various imaging conditions. The displayed image decision portion decides which of the display image and the combined image is to be set as the displayed image. The display portion displays the decided displayed image.

JP2009-088742A discloses an imaging apparatus comprising an imaging unit, a recognition unit, a selection unit, an extraction unit, and a combining unit. The imaging unit consecutively captures a plurality of images. The recognition unit recognizes a common subject part in each image. The selection unit selects the clearest subject part in the common subject part. The extraction unit extracts the selected subject part from the image. The combining unit generates a single combined image by combining the extracted subject part.

JP2015-080179A discloses an imaging apparatus comprising an imaging element, a focus lens, an acquisition unit, a focal point adjustment unit, and a combining unit. The imaging element captures a subject image through an imaging lens. The focus lens can move in an optical axis direction and is included in the imaging lens. The acquisition unit acquires a first image acquired at a first frame rate and a plurality of second images acquired at a second frame rate. The focal point adjustment unit performs focal point adjustment with respect to the subject image by controlling a position of the focus lens. The combining unit generates an image having an extended dynamic range by combining a plurality of images obtained from the imaging element.

SUMMARY OF THE INVENTION

One embodiment according to the technology of the present disclosure provides an imaging apparatus, an operation method of an imaging apparatus, and a program that can quickly obtain an image having a deep depth of field, compared to a case of performing imaging by increasing the depth of field using only a stop.

A first aspect according to the technology of the present disclosure is an imaging apparatus comprising an imaging element that incorporates a memory which stores image data obtained by imaging an imaging region at a first frame rate, and a first processor configured to output the image data at a second frame rate less than or equal to the first frame rate, and an imaging lens including a focus lens, in which the first processor is configured to generate combined image data based on the image data of the number of frames decided in accordance with a depth of field with respect to the imaging region out of the image data of a plurality of frames obtained by imaging the imaging region at different positions of the focus lens.

A second aspect according to the technology of the present disclosure is the imaging apparatus according to the first aspect, in which positions at which the imaging region is focused are different from each other in each of a plurality of pieces of the image data used for generating the combined image data.

A third aspect according to the technology of the present disclosure is the imaging apparatus according to the first or second aspect, in which the first processor is configured to generate the combined image data with respect to a partial region of the imaging region from the image data.

A fourth aspect according to the technology of the present disclosure is the imaging apparatus according to any one of the first to third aspects, further comprising an optical system including the focus lens, in which the first processor is configured to derive the depth of field in accordance with a subject distance with respect to the imaging region and characteristics of the optical system.

A fifth aspect according to the technology of the present disclosure is the imaging apparatus according to the fourth aspect, in which the characteristics include a focal length and an F number related to the optical system.

A sixth aspect according to the technology of the present disclosure is the imaging apparatus according to the fifth aspect, in which the first processor is configured to perform distance measurement with respect to the imaging region, and derive the subject distance in accordance with a distance measurement result.

A seventh aspect according to the technology of the present disclosure is the imaging apparatus according to the sixth aspect, further comprising a plurality of phase difference pixels, in which the first processor is configured to perform the distance measurement based on a phase difference image obtained from the plurality of phase difference pixels.

An eighth aspect according to the technology of the present disclosure is the imaging apparatus according to any one of the fifth to seventh aspects, in which the first processor is configured to update the F number in accordance with the derived depth of field.

A ninth aspect according to the technology of the present disclosure is the imaging apparatus according to any one of the first to eighth aspects, in which the first processor is configured to perform first combining processing and second combining processing, the first combining processing is processing of setting a combining condition and generating the combined image data in accordance with the set combining condition, the first processor is configured to perform the first combining processing until a specific subject is detected based on the combined image data generated by the first combining processing, and the second combining processing is processing of generating the combined image data in accordance with the combining condition related to the combined image data used for detecting the specific subject in a case where the specific subject is detected.

A tenth aspect according to the technology of the present disclosure is the imaging apparatus according to any one of the first to ninth aspects, in which the first processor is configured to output image data of which a focused position decided by a position of the focus lens corresponds to a subject distance of a middle subject within the imaging region out of the image data of the plurality of frames, as live view image data.

An eleventh aspect according to the technology of the present disclosure is the imaging apparatus according to any one of the first to tenth aspects, further comprising a second processor configured to receive an input of at least one of the image data output from the first processor or the combined image data, in which the second processor is configured to detect a subject based on the combined image data.

A twelfth aspect according to the technology of the present disclosure is the imaging apparatus according to any one of the first to eleventh aspects, in which the first processor is configured to read out the image data of each of the plurality of frames in parallel within an output period defined by the second frame rate as a period in which one frame of the image data is output, and the memory stores each image data read out in parallel by the first processor in parallel.

A thirteenth aspect according to the technology of the present disclosure is the imaging apparatus according to any one of the first to twelfth aspects, in which a ratio of the first frame rate and the second frame rate is an integer.

A fourteenth aspect according to the technology of the present disclosure is the imaging apparatus according to any one of the first to thirteenth aspects, in which at least a photoelectric conversion element and the memory are formed in one chip in the imaging element.

A fifteenth aspect according to the technology of the present disclosure is the imaging apparatus according to the fourteenth aspect, in which the imaging element is a laminated imaging element in which the photoelectric conversion element and the memory are laminated.

A sixteenth aspect according to the technology of the present disclosure is an operation method of an imaging apparatus, the operation method comprising storing image data obtained by imaging an imaging region at a first frame rate in a memory, performing processing of combining the image data of a plurality of frames, acquiring the image data of the number of frames decided in accordance with a depth of field with respect to the imaging region out of the image data of the plurality of frames at different positions of a focus lens included in an imaging lens, and outputting combined image data obtained by performing combining based on the image data at a second frame rate.

A seventeenth aspect according to the technology of the present disclosure is a program causing a computer to execute a process comprising storing image data obtained by imaging an imaging region at a first frame rate in a memory, performing processing of combining the image data of a plurality of frames, acquiring the image data of the number of frames decided in accordance with a depth of field with respect to the imaging region out of the image data of the plurality of frames at different positions of a focus lens included in an imaging lens, and outputting combined image data obtained by performing combining based on the image data at a second frame rate.

BRIEF DESCRIPTION OF THE DRAWINGS

FIG. 4B is a conceptual diagram for describing an output frame rate of the imaging element included in the imaging apparatus according to each embodiment.

DESCRIPTION OF THE PREFERRED EMBODIMENTS

Hereinafter, an example of embodiments of an imaging apparatus according to the embodiments of the technology of the present disclosure will be described in accordance with the appended drawings.

First, words used in the following description will be described.

The abbreviation CPU stands for "Central Processing Unit". The abbreviation GPU stands for "Graphics Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory". The abbreviation LSI stands for "Large-Scale Integrated Circuit". The abbreviation ASIC stands for "Application Specific Integrated Circuit". The abbreviation PLD stands for "Programmable Logic Device". The abbreviation FPGA stands for "Field-Programmable Gate Array". The abbreviation SoC stands for "System-on-a-chip". The abbreviation SSD stands for "Solid State Drive". The abbreviation USB stands for "Universal Serial Bus". The abbreviation HDD stands for "Hard Disk Drive". The abbreviation EEPROM stands for "Electrically Erasable and Programmable Read Only Memory". The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation I/F stands for "Interface". The abbreviation UI stands for "User Interface". The abbreviation fps stands for "frame per second". The abbreviation INF stands for "Infinity". The abbreviation MOD stands for "Minimum Object Distance". The abbreviation AF stands for "Auto Focus". The abbreviation TOF stands for "Time-of-Flight". The abbreviation PCIe stands for "Peripheral Component Interconnect express".

In the following description, in a case an expression "image" instead of "image data" is used except "image" displayed on a display, "image" also includes a meaning of "data (image data) indicating the image". In addition, in the following description, for example, "detecting a subject" means "detecting image data indicating the subject from image data of a detection target". In addition, for example, "recognizing a subject" means "detecting image data indicating the subject from image data of a recognition target and recognizing that the detected image data is image data indicating a specific subject". In addition, in the following description, an imaging region refers to an imaging target region imaged by the imaging apparatus. For example, the imaging target region refers to a region (for example, an imaging region 200 of a rectangular shape illustrated in FIG. 15) imaged by an imaging element included in the imaging apparatus in an actual spatial domain that falls within an angle of view of the imaging apparatus.

First Embodiment

Figure 1:
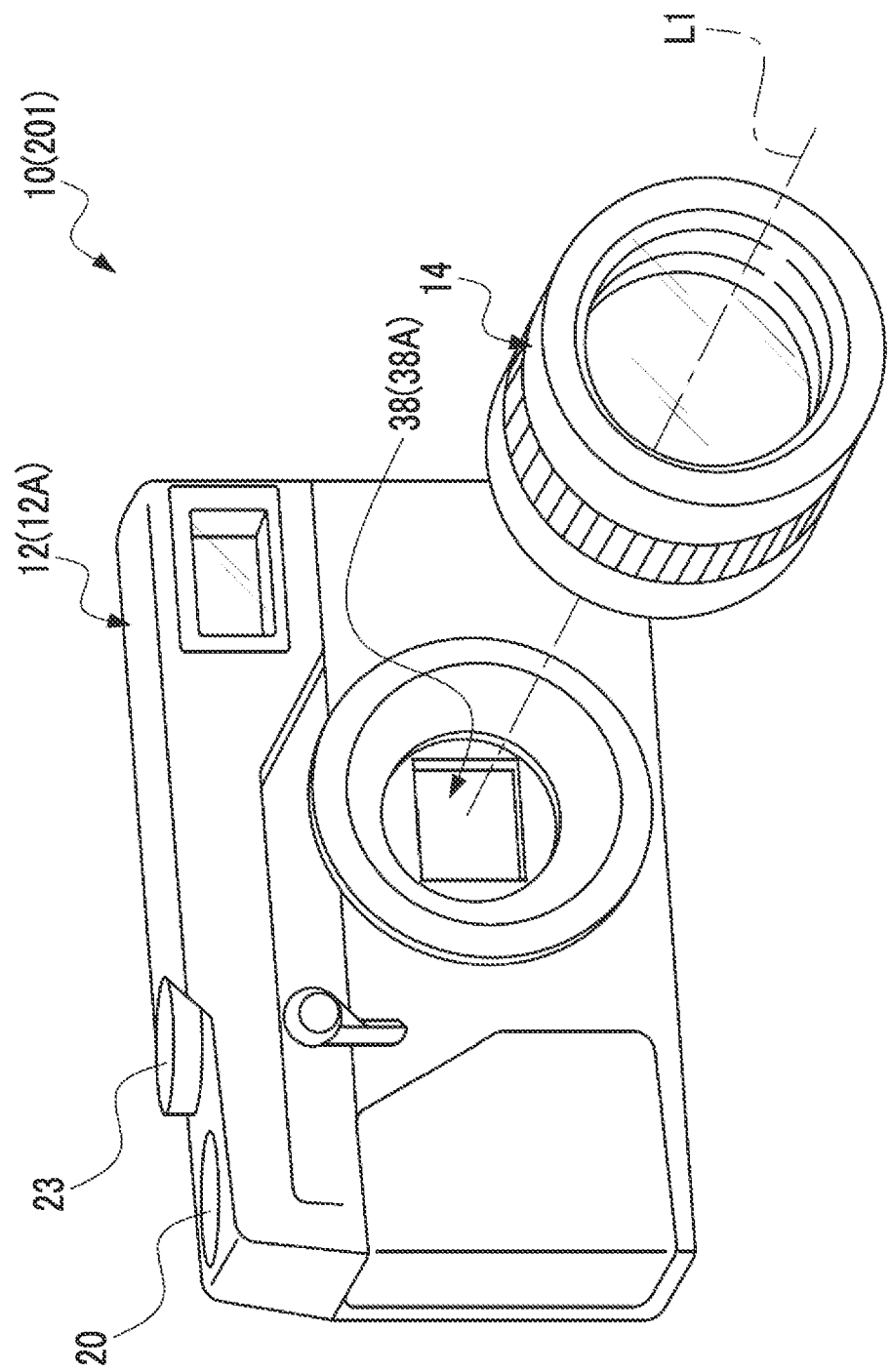
FIG. 1 is a perspective view illustrating an example of an exterior of an imaging apparatus according to each embodiment.

As illustrated in FIG. 1 as an example, an imaging apparatus 10 is a digital camera of an interchangeable lens type that does not include a reflex mirror. The imaging apparatus 10 comprises an imaging apparatus main body 12 and an interchangeable lens 14 that is interchangeably mounted on the imaging apparatus main body 12. Here, while the digital camera of the interchangeable lens type that does not include the reflex mirror is exemplified as an example of the imaging apparatus 10, the technology of the present disclosure is not limited thereto. The imaging apparatus 10 may be a digital camera of other types such as a fixed lens digital camera.

An imaging element 38 is disposed in the imaging apparatus main body 12. In a case where the interchangeable lens 14 is mounted on the imaging apparatus main body 12, subject light that shows a subject is transmitted through the interchangeable lens 14, and an image of the subject light is formed on the imaging element 38. Image data that indicates an image of the subject is generated by the imaging element 38.

A release button 20 and a dial 23 are disposed on an upper surface of the imaging apparatus main body 12. The dial 23 operates in a case of setting an operation mode of an imaging system, an operation mode of a playback system, and the like. Accordingly, an imaging mode and a playback mode are selectively set as an operation mode in the imaging apparatus 10.

The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state". Depending on a configuration of the imaging apparatus, the imaging preparation instruction state may be a state where a finger of an operating user is in contact with the release button 20, and the imaging instruction state may be a state after a transition from the state where the finger of the operating user is in contact with the release button 20 to a state where the finger is separated from the release button 20.

Figure 2:
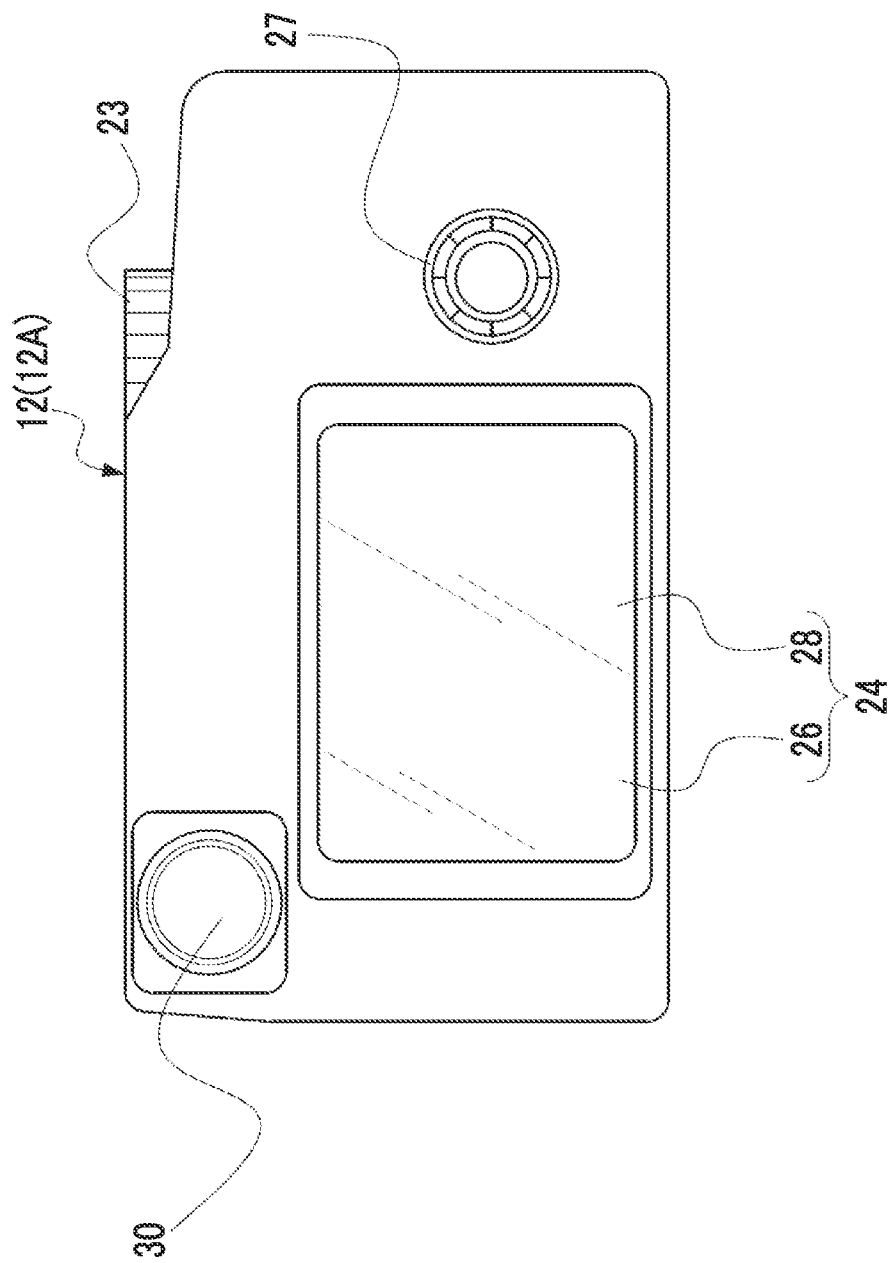
FIG. 2 is a rear view illustrating an example of the exterior on a rear surface side of the imaging apparatus illustrated in FIG. 1.

As illustrated in FIG. 2 as an example, a touch panel display 24, an instruction key 27, and a finder eyepiece portion 30 are disposed on a rear surface of the imaging apparatus main body 12.

Figure 3:
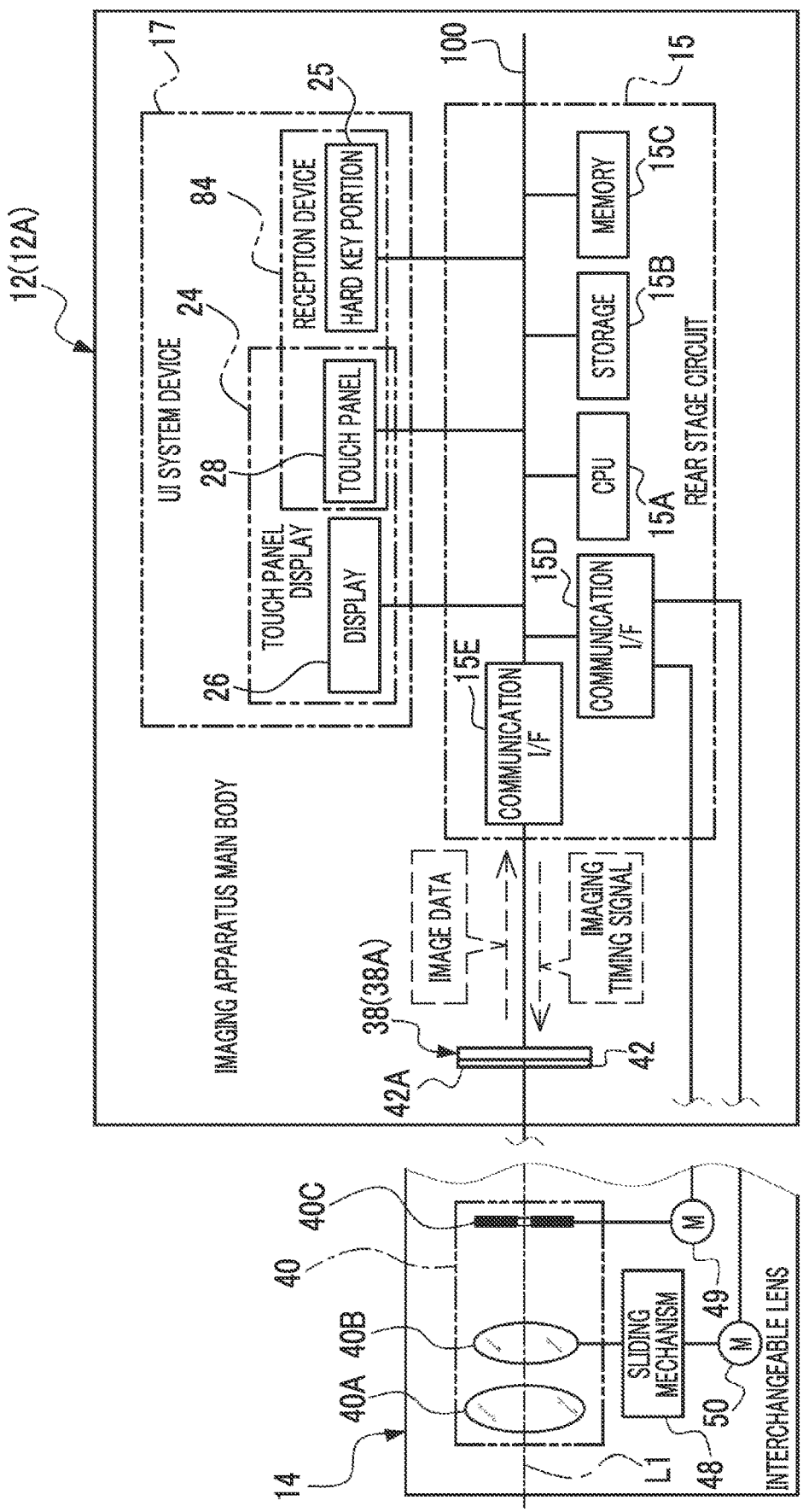
FIG. 3 is a block diagram illustrating an example of a hardware configuration of the imaging apparatus according to each embodiment.

The touch panel display 24 comprises a display 26 and a touch panel 28 (refer to FIG. 3). An organic EL display is exemplified as an example of the display 26. Instead of the organic EL display, the display 26 may be a display of other types such as a liquid crystal display.

The display 26 displays images and/or text information and the like. The display 26 is used for displaying the live view image obtained by consecutive imaging in a case where the imaging apparatus 10 is in the imaging mode. The "live view image" here refers to a display motion picture image based on the image data obtained by imaging using the imaging element 38. The live view image is generally referred to as a live preview image. In addition, the display 26 is used for displaying a superimposed image obtained by superimposing a result of image recognition processing, described later, on the live view image. In addition, the display 26 is used for displaying a still picture image obtained by imaging in a case where an imaging instruction for the still picture image is provided. Furthermore, the display 26 is used for displaying a playback image and displaying a menu screen and the like in a case where the imaging apparatus 10 is in the playback mode.

The touch panel 28 is a transmissive touch panel and is overlaid on a surface of a display region of the display 26. The touch panel 28 receives an instruction from a user by detecting a contact of an instruction object such as a finger or a stylus pen.

Here, while an out-cell touch panel display in which the touch panel 28 is overlaid on the surface of the display region of the display 26 is exemplified as an example of the touch panel display 24, the out-cell touch panel display is merely an example. For example, an on-cell or in-cell touch panel display can also be applied as the touch panel display 24.

The instruction key 27 receives various instructions. For example, the "various instructions" here refer to various instructions such as an instruction to display a menu screen on which various menus can be selected, an instruction to select one or a plurality of menus, an instruction to confirm a selected content, an instruction to delete the selected content, zoom in, zoom out, and frame advance. In addition, these instructions may be provided using the touch panel 28.

As illustrated in FIG. 3 as an example, the interchangeable lens 14 includes an imaging lens 40. The imaging lens 40 comprises an objective lens 40A, a focus lens 40B, and a stop 40C.

The objective lens 40A, the focus lens 40B, and the stop 40C are arranged in an order of the objective lens 40A, the focus lens 40B, and the stop 40C along an optical axis L1 from a subject side (object side) to an imaging apparatus main body 12 side (image side).

The focus lens 40B operates by receiving motive power from a motor 50. The stop 40C operates by receiving motive power from a motor 49. The focus lens 40B moves along the optical axis L1 in response to the provided motive power. The stop 40C adjusts exposure by operating in response to the provided motive power. However, constituents and/or an operation method of a configuration of the interchangeable lens 14 can be changed as necessary.

The imaging apparatus main body 12 comprises a rear stage circuit 15, a UI system device 17, and the imaging element 38.

The rear stage circuit 15 is a circuit positioned on a rear stage of the imaging element 38. The rear stage circuit 15 is connected to the imaging element 38 and exchanges various types of information such as image data with the imaging element 38.

The imaging element 38 is an example of an "image sensor" according to the embodiments of the technology of the present disclosure. The imaging element 38 comprises a photoelectric conversion element 42 having a light receiving surface 42A. In the present embodiment, the imaging element 38 is a CMOS image sensor. While the CMOS image sensor is illustrated here as the imaging element 38, the technology of the present disclosure is not limited thereto. For example, the technology of the present disclosure is also established in a case where the imaging element 38 is an image sensor of other types such as a CCD image sensor.

The UI system device 17 configured with the touch panel display 24 including the touch panel 28, a hard key portion 25 including the instruction key 27, and the like described above is connected to the rear stage circuit 15. As will be described in detail later, the UI system device 17 is a device that presents information to the user or receives the instruction from the user.

As illustrated in FIG. 3 as an example, the interchangeable lens 14 includes a sliding mechanism 48, the motor 49, and the motor 50. The focus lens 40B is attached to the sliding mechanism 48 in a slidable manner along the optical axis L1. In addition, the motor 50 is connected to the sliding mechanism 48, and the sliding mechanism 48 moves the focus lens 40B along the optical axis L1 by receiving the motive power of the motor 50. The motor 49 is connected to the stop 40C. The stop 40C adjusts the exposure by operating in response to the motive power of the motor 49.

The motors 49 and 50 are connected to the imaging apparatus main body 12 through a mount (not illustrated), and driving of the motors 49 and 50 is controlled in accordance with an instruction from the imaging apparatus main body 12. In the present embodiment, stepping motors are employed as an example of the motors 49 and 50. Accordingly, the motors 49 and 50 operate in synchronization with pulse signals in accordance with the instruction from the imaging apparatus main body 12. In addition, in the example illustrated in FIG. 3, while an example in which the motors 49 and 50 are disposed in the interchangeable lens 14 is illustrated, the technology of the present disclosure is not limited thereto. One of the motors 49 and 50 may be disposed in the imaging apparatus main body 12, or both of the motors 49 and 50 may be disposed in the imaging apparatus main body 12.

The rear stage circuit 15 comprises a CPU 15A, a storage 15B, a memory 15C, a communication I/F 15D, and a communication I/F 15E. The CPU 15A is an example of a "control device" according to the embodiments of the technology of the present disclosure. The CPU 15A, the storage 15B, the memory 15C, the communication I/F 15D, and the communication I/F 15E are connected through a bus 100.

In the example illustrated in FIG. 3, while one bus is illustrated as the bus 100 for convenience of illustration, a plurality of buses may be used. The bus 100 may be a serial bus or may be a parallel bus including a data bus, an address bus, a control bus, and the like.

The storage 15B stores various parameters and various programs. The storage 15B is a non-volatile storage device. Here, a flash memory is employed as an example of the storage 15B. The flash memory is merely an example. Instead of the flash memory or together with the flash memory, a non-volatile memory such as an EEPROM, an HDD, and/or an SSD or the like may be applied as the storage 15B. In addition, the memory 15C temporarily stores various types of information and is used as a work memory. A RAM is exemplified as an example of the memory 15C. However, the technology of the present disclosure is not limited thereto. A storage device of other types may be used.

The storage 15B stores various programs. The CPU 15A reads out a necessary program from the storage 15B and executes the read program on the memory 15C. The CPU 15A controls the entire imaging apparatus main body 12 in accordance with the program executed on the memory 15C.

The communication I/F 15D is connected to the motors 49 and 50. The communication I/F 15D controls the motors 49 and 50 under control of the CPU 15A.

The communication I/F 15E is connected to the imaging element 38 and controls exchange of various types of information between the imaging element 38 and the CPU 15A. The CPU 15A controls the imaging element 38 through the communication I/F 15E. For example, the CPU 15A controls a timing of imaging performed by the imaging element 38 by supplying an imaging timing signal for defining the timing of imaging to the imaging element 38 through the communication I/F 15E. The CPU 15A, the storage 15B, the memory 15C, the communication I/F 15D, the communication I/F 15E, and the like constituting the rear stage circuit 15 can also be configured as an integrated control circuit.

The UI system device 17 comprises the touch panel display 24 and a reception device 84. The display 26 and the touch panel 28 are connected to the bus 100. Accordingly, the CPU 15A displays various types of information on the display 26 and operates in accordance with various instructions received by the touch panel 28.

The reception device 84 comprises the hard key portion 25. The hard key portion 25 includes a plurality of hard keys and includes the release button 20 (refer to FIG. 1), the dial 23 (refer to FIG. 1 and FIG. 2), and the instruction key 27 (refer to FIG. 2). The hard key portion 25 is connected to the bus 100, and the CPU 15A acquires an instruction received by the hard key portion 25 and operates in accordance with the acquired instruction.

Figure 4A:
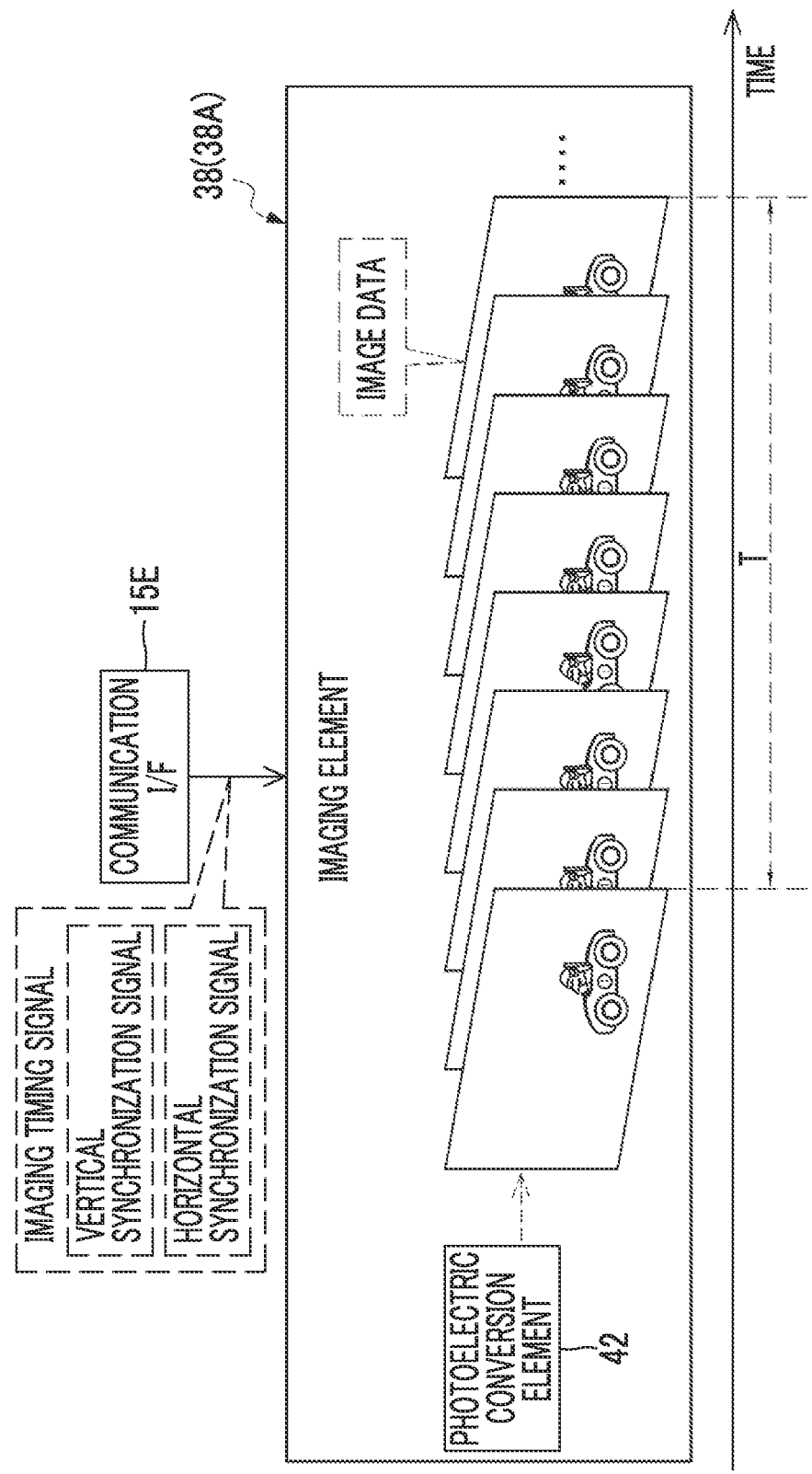
FIG. 4A is a conceptual diagram for describing an imaging frame rate of an imaging element included in the imaging apparatus according to each embodiment.

As illustrated in FIG. 4A as an example, the imaging timing signal is input into the imaging element 38 from the communication I/F 15E. The imaging timing signal includes a vertical synchronization signal and a horizontal synchronization signal. The vertical synchronization signal is a synchronization signal for defining a start timing of reading of the image data for each frame from the photoelectric conversion element 42. The horizontal synchronization signal is a synchronization signal for defining a start timing of reading of the image data for each horizontal line from the photoelectric conversion element 42.

In the imaging element 38, the image data is read out from the photoelectric conversion element 42 at an imaging frame rate decided in accordance with the vertical synchronization signal input from the communication I/F 15E. In addition, in the imaging element, the image data read out from the photoelectric conversion element 42 is processed, and the processed image data is output at an output frame rate. The imaging frame rate is an example of a "first frame rate" according to the embodiments of the technology of the present disclosure, and the output frame rate is an example of a "second frame rate" according to the embodiments of the technology of the present disclosure.

The imaging frame rate and the output frame rate have a relationship of "imaging frame rate>output frame rate". That is, the output frame rate is a frame rate lower than the imaging frame rate. For example, the imaging frame rate is a frame rate at which the image data of eight frames is read out from the photoelectric conversion element 42 within a period T as illustrated in FIG. 4A, and the output frame rate is a frame rate at which the image data of two frames is output within the period T as illustrated in FIG. 4B. Both of the imaging frame rate and the output frame rate are variable frame rates.

In the first embodiment, 240 fps is employed as an example of the imaging frame rate, and 60 fps is employed as an example of the output frame rate. A ratio of the imaging frame rate and the output frame rate is an integer (here, 4:1). The imaging frame rate and the output frame rate illustrated here are merely an example. For example, the imaging frame rate may be a frame rate exceeding 240 fps or may be a frame rate less than 240 fps. In addition, the output frame rate may be a frame rate exceeding 60 fps within a range not exceeding the imaging frame rate or may be a frame rate less than 60 fps within the range not exceeding the imaging frame rate. That is, both of the imaging frame rate and the output frame rate may be variable frame rates within a range satisfying the relationship "imaging frame rate>output frame rate". Here, while the imaging frame rate and the output frame rate have a relationship of "imaging frame rate>output frame rate", the technology of the present disclosure is not limited thereto, and the imaging frame rate and the output frame rate may be the same frame rate.

Figure 5:
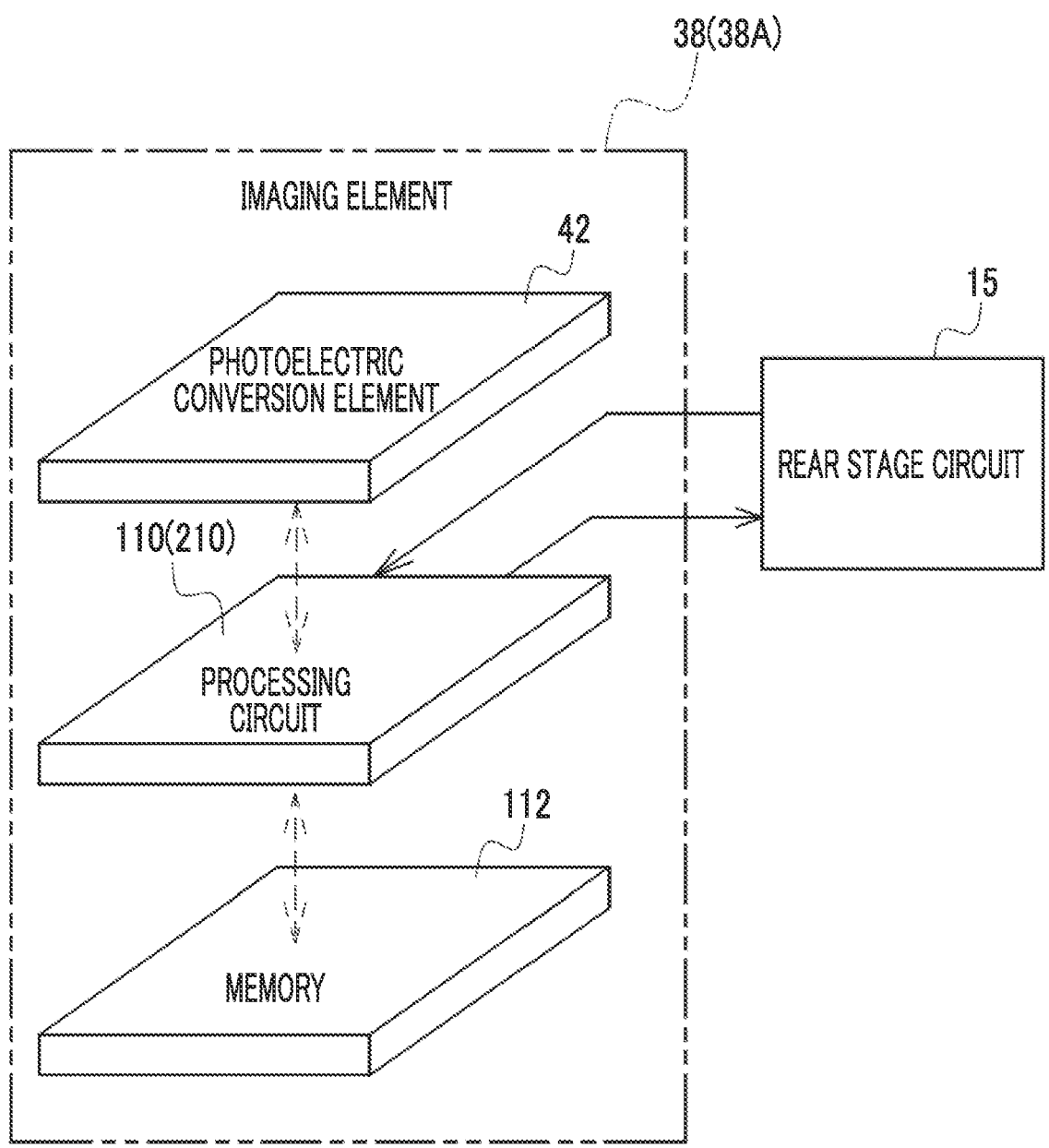
FIG. 5 is a conceptual diagram illustrating an example of a laminated structure of the imaging element included in the imaging apparatus according to each embodiment.

As illustrated in FIG. 5 as an example, the imaging element 38 incorporates the photoelectric conversion element 42, a processing circuit 110, and a memory 112. The imaging element 38 is an imaging element in which the photoelectric conversion element 42, the processing circuit 110, and the memory 112 are formed in one chip. That is, the photoelectric conversion element 42, the processing circuit 110, and the memory 112 are formed in one package. In the imaging element 38, the photoelectric conversion element 42 is laminated with the processing circuit 110 and the memory 112. Specifically, the photoelectric conversion element 42 and the processing circuit 110 are electrically connected to each other by a bump (not illustrated) of copper or the like having conductivity. The processing circuit 110 and the memory 112 are also electrically connected to each other by a bump (not illustrated) of copper or the like having conductivity. While a three-layer structure of the photoelectric conversion element 42, the processing circuit 110, and the memory 112 is illustrated here, the technology of the present disclosure is not limited thereto. A two-layer structure of the photoelectric conversion element 42 and a memory layer in which the processing circuit 110 and the memory 112 are formed in one layer may be used. The imaging element 38 is an example of a "laminated imaging element" according to the embodiments of the technology of the present disclosure.

For example, the processing circuit 110 is an LSI. The memory 112 is a memory of which a writing timing and a reading timing are different. Here, a DRAM is employed as an example of the memory 112. The technology of the present disclosure is also established in a case where the memory 112 is a storage device of other types such as an SRAM.

The processing circuit 110 is a device including an ASIC and an FPGA and controls the entire imaging element 38 in accordance with an instruction of the rear stage circuit 15. Here, while the device including the ASIC and the FPGA is illustrated as the processing circuit 110, the technology of the present disclosure is not limited thereto. For example, the processing circuit 110 may be a device including an ASIC, an FPGA, or a PLD, a device including an FPGA and a PLD, or a device including an ASIC and a PLD.

In addition, the processing circuit 110 may be a computer including a CPU, a storage, and a memory. The storage refers to a non-volatile storage device such as a flash memory. The memory temporarily stores various types of information and is used as a work memory. A RAM is exemplified as an example of the memory. However, the technology of the present disclosure is not limited thereto. A storage device of other types may be used. The number of CPUs included in the computer may be singular or plural. In addition, a GPU may be used instead of the CPU. In addition, the processing circuit 110 may be implemented by a combination of a hardware configuration and a software configuration.

Figure 6:
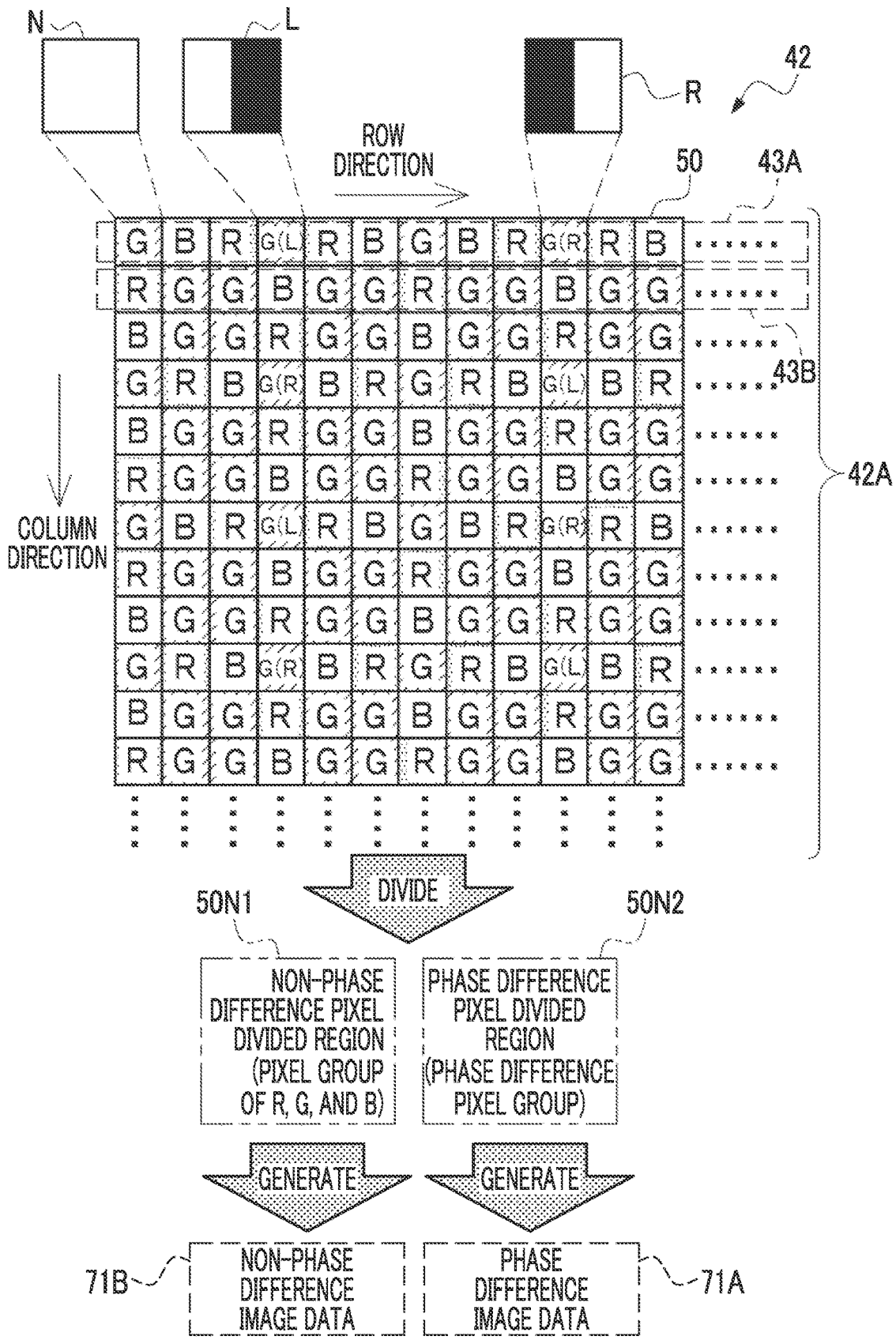
FIG. 6 is a schematic diagram illustrating an example of arrangement of each pixel included in a photoelectric conversion element of the imaging apparatus according to each embodiment.

As illustrated in FIG. 6 as an example, the photoelectric conversion element 42 includes multiple photodiodes arranged in a matrix form. Photodiodes of "4896×3265" pixels are exemplified as an example of the plurality of photodiodes.

Color filters are arranged in each photodiode included in the photoelectric conversion element 42. The color filters include a G filter corresponding to a green (G) wavelength range that most contributes to obtaining a brightness signal, an R filter corresponding to a red (R) wavelength range, and a B filter corresponding to a blue (B) wavelength range.

The photoelectric conversion element 42 is formed with two types of photosensitive pixels of phase difference pixels and non-phase difference pixels N that are pixels different from the phase difference pixels. Generally, the non-phase difference pixels N are also referred to as normal pixels. The photoelectric conversion element 42 includes three types of photosensitive pixels of R pixels, G pixels, and B pixels as the non-phase difference pixels. The R pixels, the G pixels, the B pixels, and the phase difference pixels are regularly arranged with predetermined periodicity in each of a row direction (horizontal direction) and a column direction (vertical direction). The R pixels are pixels corresponding to photodiodes in which the R filter is arranged. The G pixels and the phase difference pixels are pixels corresponding to photodiodes in which the G filter is arranged. The B pixels are pixels corresponding to photodiodes in which the B filter is arranged.

Hereinafter, for convenience of description, the G filter, the R filter, and the B filter will be referred to as "visible light filters" unless otherwise necessary to distinguish therebetween. In addition, hereinafter, for convenience of description, the R pixel, the G pixel, and the B pixel will be referred to as "visible light pixels" unless otherwise necessary to distinguish therebetween.

A plurality of phase difference pixel lines 43A and a plurality of non-phase difference pixel lines 43B are arranged on the light receiving surface 42A. The phase difference pixel lines 43A are horizontal lines including the phase difference pixels. Specifically, the phase difference pixel lines 43A are horizontal lines in which the phase difference pixels and the non-phase difference pixels N coexist. The non-phase difference pixel lines 43B are horizontal lines including only a plurality of non-phase difference pixels N.

The phase difference pixel lines 43A and a predetermined number of lines of the non-phase difference pixel lines 43B are alternately arranged in the column direction on the light receiving surface 42A. For example, the "predetermined number of lines" here refer to two lines. While two lines are illustrated here as the predetermined number of lines, the technology of the present disclosure is not limited thereto. The predetermined number of lines may be a few lines more than or equal to three lines, ten and a few lines, a few tens of lines, a few hundred lines, or the like.

The phase difference pixel lines 43A are arranged in the column direction by skipping two lines at a time from a first row to a last row. Pixels of a part of the phase difference pixel lines 43A are the phase difference pixels. Specifically, the phase difference pixel lines 43A are horizontal lines in which the phase difference pixels and the non-phase difference pixels N are periodically arranged. The phase difference pixels are broadly divided into first phase difference pixels L and second phase difference pixels R. In the phase difference pixel lines 43A, the first phase difference pixels L and the second phase difference pixels R are alternately arranged at intervals of a few pixels in a line direction as the G pixels.

The first phase difference pixels L and the second phase difference pixels R are arranged to alternately appear in the column direction. In the example illustrated in FIG. 6, in a fourth column, the first phase difference pixel L, the second phase difference pixel R, the first phase difference pixel L, and the second phase difference pixel R are arranged in this order in the column direction from the first row. That is, the first phase difference pixels L and the second phase difference pixels R are alternately arranged in the column direction from the first row. In addition, in the example illustrated in FIG. 6, in a tenth column, the second phase difference pixel R, the first phase difference pixel L, the second phase difference pixel R, and the first phase difference pixel L are arranged in this order in the column direction from the first row. That is, the second phase difference pixels R and the first phase difference pixels L are alternately arranged in the column direction from the first row.

The photoelectric conversion element 42 is divided into two regions. That is, the photoelectric conversion element 42 includes a non-phase difference pixel divided region 50N1 and a phase difference pixel divided region 50N2. The non-phase difference pixel divided region 50N1 and the phase difference pixel divided region 50N2 receive visible light and output electric signals corresponding to amounts of received light. The phase difference pixel divided region 50N2 is a phase difference pixel group of a plurality of phase difference pixels and generates phase difference image data 71A as the electric signal corresponding to the amount of received light. For example, the phase difference image data 71A is used for distance measurement. The non-phase difference pixel divided region 50N1 is a visible light pixel group of a plurality of visible light pixels having sensitivity to the visible light and generates non-phase difference image data 71B as the electric signal corresponding to the amount of received light. For example, the non-phase difference image data 71B is displayed on the display 26 (refer to FIG. 2 and FIG. 3) as a visible light image.

Figure 7:
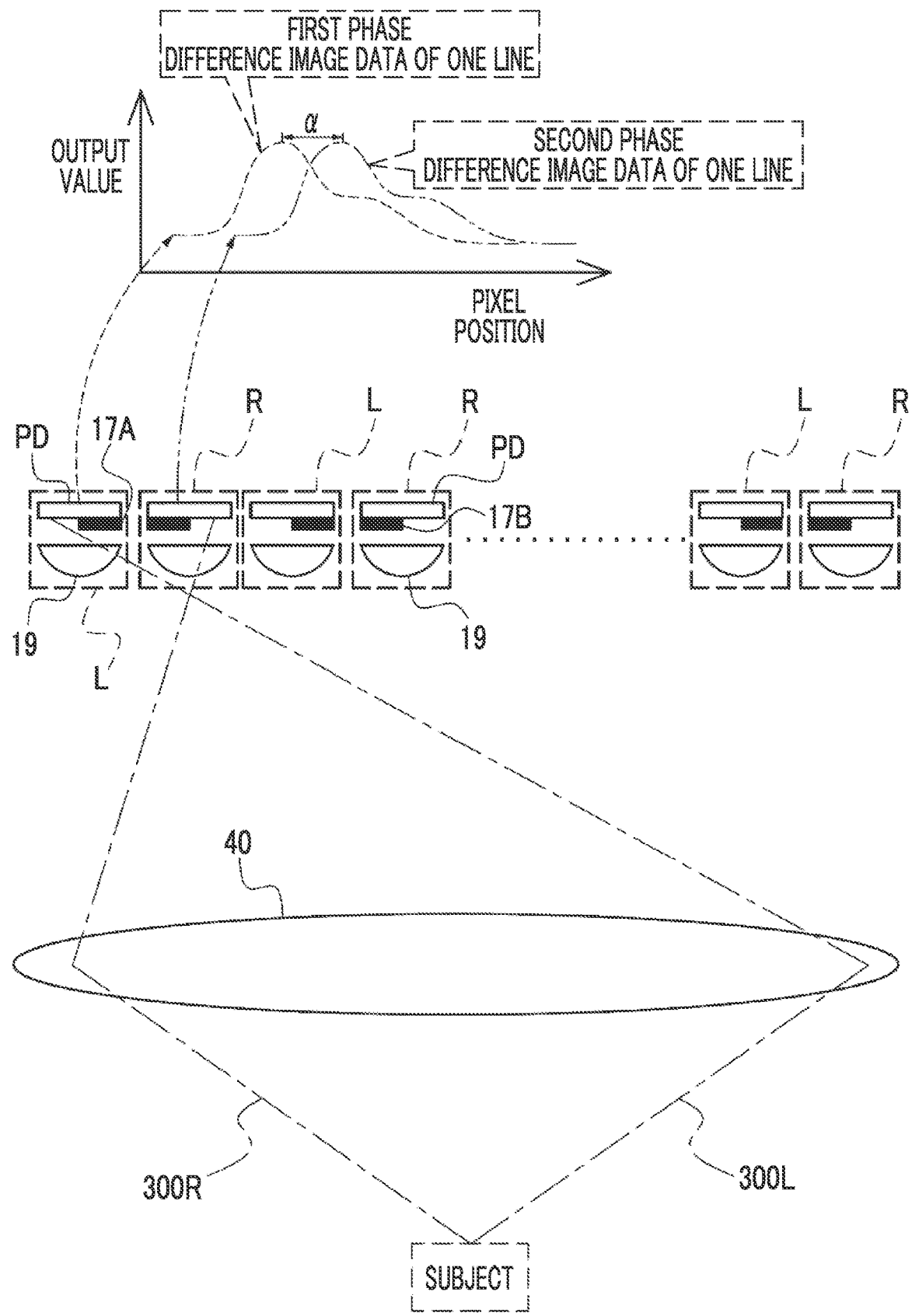
FIG. 7 is a conceptual diagram illustrating an example of incidence characteristics of subject light with respect to a first phase difference pixel and a second phase difference pixel included in the photoelectric conversion element illustrated in FIG. 6.

As illustrated in FIG. 7 as an example, each first phase difference pixels L comprises a microlens 19, a light shielding member 17A, and a photodiode PD. In the first phase difference pixel L, the light shielding member 17A is arranged between the microlens 19 and a light receiving surface of the photodiode PD. A left half (a left side in a case of facing the subject from the light receiving surface (in other words, a right side in a case of facing the light receiving surface from the subject)) of the light receiving surface of the photodiode PD in the row direction is shielded against light by the light shielding member 17A.

Each second phase difference pixel R comprises the microlens 19, a light shielding member 17B, and the photodiode PD. In the second phase difference pixel R, the light shielding member 17B is arranged between the microlens 19 and the light receiving surface of the photodiode PD. A right half (a right side in a case of facing the subject from the light receiving surface (in other words, a left side in a case of facing the light receiving surface from the subject)) of the light receiving surface of the photodiode PD in the row direction is shielded against light by the light shielding member 17B. Hereinafter, for convenience of description, the light shielding members 17A and 17B will be referred to as the "light shielding member" without the reference signs unless otherwise necessary to distinguish therebetween.

Luminous flux passing through an exit pupil of the imaging lens 40 is broadly divided into left region passing light 300L and right region passing light 300R. The left region passing light 300L refers to luminous flux of a left half of the luminous flux passing through the exit pupil of the imaging lens 40 in a case of facing the subject side from a phase difference pixel side. The right region passing light 300R refers to luminous flux of a right half of the luminous flux passing through the exit pupil of the imaging lens 40 in a case of facing the subject side from the phase difference pixel side. The luminous flux passing through the exit pupil of the imaging lens 40 is divided into left and right parts by the microlens 19, the light shielding member 17A, and the light shielding member 17B functioning as a pupil separation portion. The first phase difference pixel L receives the left region passing light 300L as the subject light, and the second phase difference pixel R receives the right region passing light 300R as the subject light. Consequently, first phase difference image data corresponding to a subject image corresponding to the left region passing light 300L and second phase difference image data corresponding to a subject image corresponding to the right region passing light 300R are generated by the photoelectric conversion element 42.

In the imaging apparatus 10, for example, a distance to the imaging region, that is, a subject distance, is measured by the processing circuit 110 based on a deviation amount α between the first phase difference image data of one line and the second phase difference image data of one line in the same phase difference pixel line 43A.

Figure 8:
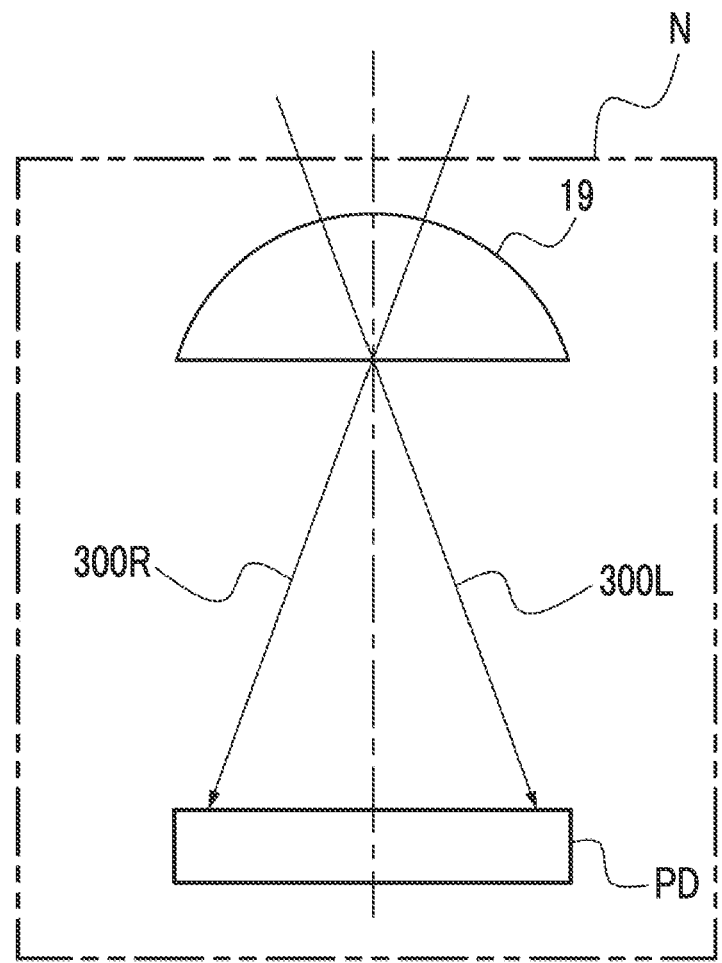
FIG. 8 is a schematic configuration diagram illustrating an example of a configuration of a non-phase difference pixel included in the photoelectric conversion element illustrated in FIG. 6.

As illustrated in FIG. 8 as an example, the non-phase difference pixel N is different from the phase difference pixel in that the light shielding member is not included. The photodiode PD of the non-phase difference pixel N receives the left region passing light 300L and the right region passing light 300R as the subject light.

Figure 9:
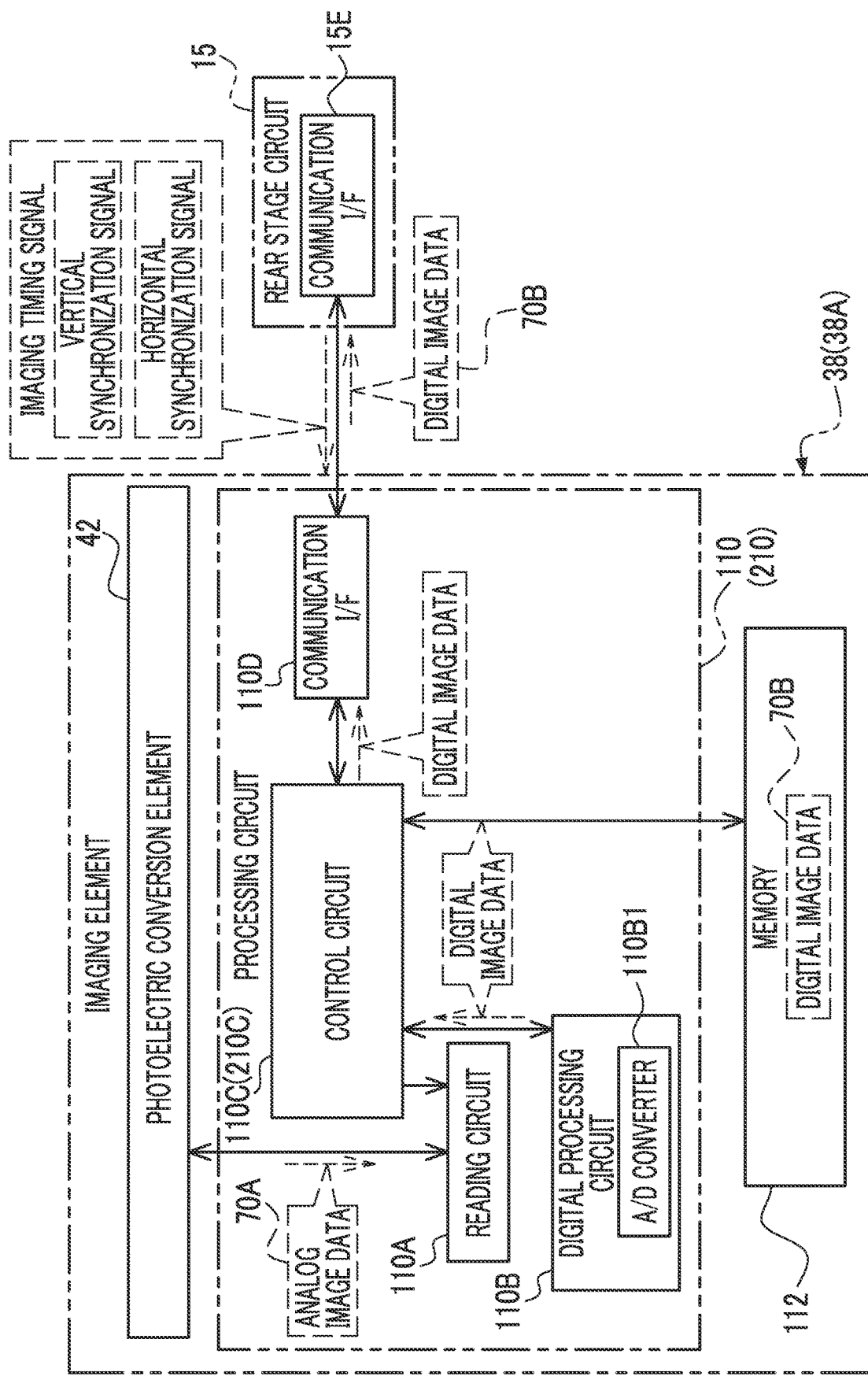
FIG. 9 is an operation conceptual diagram illustrating an example of exposure, reading, storage, and output of the imaging element according to each embodiment.

As illustrated in FIG. 9 as an example, the processing circuit 110 comprises a communication I/F 110D. The communication I/F 15E of the rear stage circuit 15 is connected to the communication I/F 110D of the processing circuit 110 and outputs the imaging timing signal to the communication I/F 110D. The communication I/F 110D receives the imaging timing signal output from the communication I/F 15E.

In the imaging element 38, the processing circuit 110 comprises, in addition to the communication I/F 110D, a reading circuit 110A, a digital processing circuit 110B, and a control circuit 110C.

The reading circuit 110A is connected to each of the photoelectric conversion element 42, the digital processing circuit 110B, and the control circuit 110C. The digital processing circuit 110B is connected to the control circuit 110C. The control circuit 110C is connected to each of the memory 112 and the communication I/F 110D.

As illustrated in FIG. 9 as an example, the image data is broadly divided into analog image data 70A and digital image data 70B. Hereinafter, for convenience of description, the analog image data 70A and the digital image data 70B will be referred to as the "image data" without the reference signs unless otherwise necessary to distinguish therebetween.

The communication I/F 110D of the processing circuit 110 is a communication device configured with a circuit. In addition, the communication I/F 15E of the rear stage circuit 15 is a communication device configured with a circuit.

The communication I/F 110D of the processing circuit 110 and the communication I/F 15E of the rear stage circuit 15 are connected in accordance with the PCIe connection standard. Hereinafter, the communication I/F 110D and the communication I/F 15E will be referred to as the "communication I/F" without the reference signs unless otherwise necessary to distinguish therebetween.

A device including an ASIC, an FPGA, and/or a PLD is exemplified as an example of the communication I/F. In addition, the communication I/F may be a computer including a CPU, a storage such as a flash memory, and a memory such as a RAM. In this case, the number of CPUs included in the computer may be singular or plural. A GPU may be used instead of the CPU. In addition, the communication I/F may be implemented by a combination of a hardware configuration and a software configuration.

The communication I/F 110D receives the imaging timing signal output from the communication I/F 15E of the rear stage circuit 15 and transfers the received imaging timing signal to the control circuit 110C.

The reading circuit 110A controls the photoelectric conversion element 42 and reads out the analog image data 70A obtained by imaging using the photoelectric conversion element 42, at the imaging frame rate from the photoelectric conversion element 42 under control of the control circuit 110C. Reading of the analog image data 70A from the photoelectric conversion element 42 is performed in accordance with the imaging timing signal which is input into the processing circuit 110 from the rear stage circuit 15.

Specifically, first, the communication I/F 110D receives the imaging timing signal from the rear stage circuit 15 and transfers the received imaging timing signal to the control circuit 110C. Next, the control circuit 110C transfers the imaging timing signal transferred from the communication I/F 110D to the reading circuit 110A. That is, the vertical synchronization signal and the horizontal synchronization signal are transferred to the reading circuit 110A. The reading circuit 110A starts reading out the analog image data 70A in units of frames from the photoelectric conversion element 42 in accordance with the vertical synchronization signal transferred from the control circuit 110C. In addition, the reading circuit 110A starts reading out the analog image data 70A in units of horizontal lines in accordance with the horizontal synchronization signal transferred from the control circuit 110C.

The reading circuit 110A performs analog signal processing on the analog image data 70A read out from the photoelectric conversion element 42. The analog signal processing includes well-known processing such as noise cancelation processing and analog gain processing. The noise cancelation processing is processing of canceling a noise caused by variations in characteristics between pixels included in the photoelectric conversion element 42. The analog gain processing is processing of applying a gain to the analog image data 70A. The analog image data 70A on which the analog signal processing is performed in such a manner is output to the digital processing circuit 110B by the reading circuit 110A.

The digital processing circuit 110B comprises an A/D converter 110B1. The A/D converter 110B1 performs A/D conversion on the analog image data 70A.

The digital processing circuit 110B performs digital signal processing on the analog image data 70A input from the reading circuit 110A. For example, the digital signal processing includes the A/D conversion performed by the A/D converter 110B1, and digital gain processing.

The A/D converter 110B1 performs the A/D conversion on the analog image data 70A. Accordingly, the analog image data 70A is digitized, and the digital image data 70B is obtained as RAW data. While the A/D conversion of the analog image data 70A by the A/D converter 110B1 is performed for each line of the photoelectric conversion element 42, the technology of the present disclosure is not limited thereto. The A/D conversion can also be performed for each pixel or for each screen. In this case, each of the reading circuit 110A and the digital processing circuit 110B including the A/D converter 110B1 has a different configuration. The digital gain processing is performed on the digital image data 70B by the digital processing circuit 110B. The digital gain processing refers to processing of applying a gain to the digital image data 70B. The digital image data 70B obtained by performing the digital signal processing in such a manner is output to the control circuit 110C by the digital processing circuit 110B.

The memory 112 is a memory that can store the digital image data 70B of a plurality of frames in units of frames. The control circuit 110C stores the digital image data 70B input from the digital processing circuit 110B in the memory 112. The memory 112 has a storage region in units of pixels. The digital image data 70B is stored in a corresponding storage region of the memory 112 in units of pixels by the control circuit 110C. The control circuit 110C can randomly access the memory 112 and acquires the digital image data 70B from the memory 112. As illustrated in FIG. 6 as an example, the digital image data 70B is broadly divided into two types of the phase difference image data 71A and the non-phase difference image data 71B.

Figure 10:
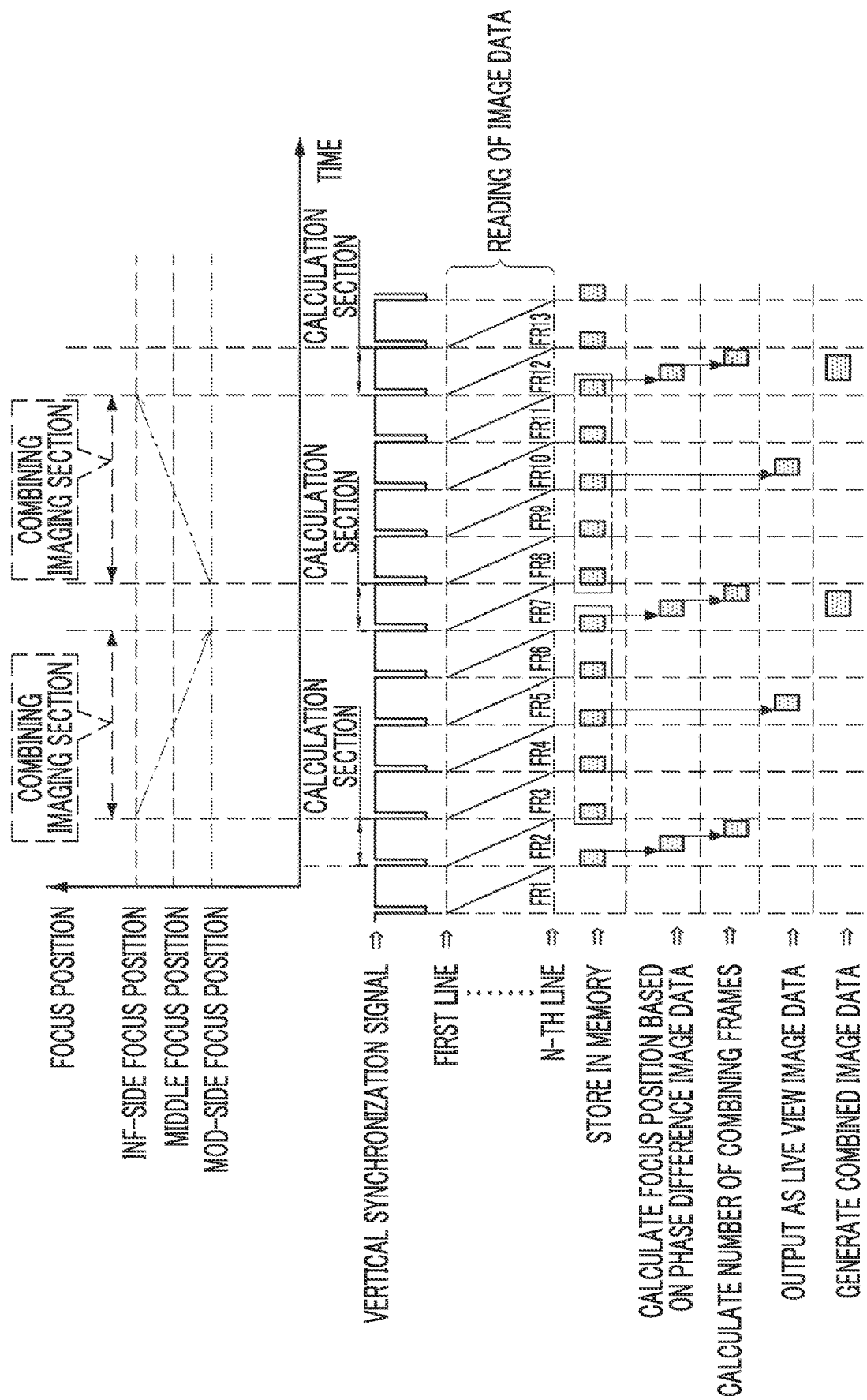
FIG. 10 is an operation conceptual diagram illustrating an example of generation of combined image data according to each embodiment.

As illustrated in FIG. 10 as an example, the focus lens 40B (refer to FIG. 3) reciprocates between an INF-side focus position and a MOD-side focus position along the optical axis L1 (refer to FIG. 3). The INF-side focus position is a focus position at which a close subject (not illustrated) positioned closest to the light receiving surface 42A (refer to FIG. 3) is focused in the imaging region. The MOD-side focus position is a focus position at which a far subject (not illustrated) positioned furthest from the light receiving surface 42A is focused in the imaging region. Here, the "focus position" refers to a position of the focus lens 40B on the optical axis L1 in a focused state.

The middle focus position is a focus position positioned between the INF-side focus position and the MOD-side focus position. Specifically, for example, the middle focus position is a focus position at which a middle subject positioned between the close subject and the far subject (for example, at a center between the close subject and the far subject) in a depth direction of the imaging region is focused. Here, the middle subject is an example of a "middle subject within an imaging region" according to the embodiments of the technology of the present disclosure. In addition, here, while the center between the close subject and the far subject is illustrated as an example of the middle focus position, the technology of the present disclosure is not limited thereto. The middle focus position may be a position other than the center between the close subject and the far subject.

A one-way section of the reciprocation of the focus lens 40B on the optical axis L1 includes a plurality of calculation sections and a plurality of combining imaging sections. In the one-way section, the calculation sections and the combining imaging sections are alternately reached. The combining imaging section is a section in which imaging for combining is performed. Here, "combining" refers to combining of the digital image data 70B of the plurality of frames. The digital image data 70B of the plurality of frames is obtained by performing the imaging for combining in the combining imaging section. That is, the combining imaging section is said to be a section in which the digital image data 70B of the plurality of frames used for combining is collected. In the example illustrated in FIG. 10, the digital image data 70B of five frames is collected in one combining imaging section. In addition, the combining imaging section is repeatedly reached for each constant time interval (in the example illustrated in FIG. 10, a time interval of one frame). In the example illustrated in FIG. 10, the constant time interval is illustrated as the calculation section. In one calculation section, calculation of the focus position used in the immediately succeeding combining imaging section, that is, the succeeding combining imaging section adjacent in time, and decision of the number of combining frames are performed. The number of combining frames refers to the number of frames of the non-phase difference image data 71B used for combining.

Here, a decision method of the number of combining frames will be described. The decision of the number of combining frames is performed based on the number of pulses (hereinafter, referred to as the "number of lens driving pulses") corresponding to a driving amount (advancing amount) of the focus lens 40B in an imaging frame interval and a focus position interval. Here, the number of pulses is a unit for specifying a position on a movement path of the focus lens 40B on the optical axis L1 and corresponds to the number of pulses of pulse power supplied to the motor 50. The number of pulses used in a case of specifying the position on the movement path of the focus lens 40B on the optical axis L1 is increased from the subject side toward the light receiving surface 42A side on the movement path of the focus lens 40B. That is, the number of pulses for specifying the position on the movement path of the focus lens 40B on the optical axis L1 has a minimum value (for example, "0") at a position closest to the subject on the movement path of the focus lens 40B and has a maximum value at a position closest to the light receiving surface 42A on the movement path of the focus lens 40B.

The imaging frame interval refers to a time interval, defined by the imaging frame rate, between frames adjacent in time. The focus position interval refers to a value corresponding to a difference between a focus position corresponding to a longest subject distance, that is, the INF-side focus position, and a focus position corresponding to a shortest subject distance, that is, the MOD-side focus position. The focus position interval is specified as a pulse width. For example, the pulse width for specifying the focus position interval is an absolute value of a difference between the number of pulses for specifying the INF-side focus position and the number of pulses for specifying the MOD-side focus position. For example, in a case where the number of pulses for specifying the INF-side focus position is 20 pulses, and the number of pulses for specifying the MOD-side focus position is 60 pulses, the pulse width for specifying the focus position interval is 40 pulses because of "60−20=40".

In the example illustrated in FIG. 10, the number of lens driving pulses is the number of pulses required for moving the focus lens 40B along the optical axis L1 (refer to FIG. 3) within an interval (an imaging period of one frame) between the vertical synchronization signals adjacent on a time axis. For example, the number of lens driving pulses is the number of pulses corresponding to three times the depth of field. The number of combining frames is a value of an integer part obtained by dividing the focus position interval by the number of lens driving pulses. For example, in a case where the focus position interval is 40 pulses, and the number of lens driving pulses is 3.33 pulses, the number of combining frames is "12" because of "40÷3.33≈12.01201". The number of lens driving pulses changes in accordance with the subject distance. Specifically, the number of lens driving pulses is increased from the INF-side focus position toward the MOD-side focus position. Accordingly, the pulse width is also increased from the MOD-side focus position toward the INF-side focus position. The number of combining frames is the value of the integer part obtained by dividing the focus position interval by the number of lens driving pulses. Thus, in a case where the pulse width changes, the number of combining frames also changes. The depth of field is decreased in a direction of approaching the MOD-side focus position. Thus, even in a case of combining the same distance sections, the number of combining frames is increased as imaging is performed further on the MOD side. The depth of field is decreased in a direction of approaching the MOD-side focus position. This change is generally exponential but may also be quadratic or cubic.

During the reciprocation of the focus lens 40B, in the processing circuit 110 of the imaging element 38, the analog image data 70A is read out for each frame in accordance with the vertical synchronization signal. Each digital image data 70B obtained by digitizing the analog image data 70A of each frame by the digital processing circuit 110B is stored in the memory 112.

As will be described in detail later, in the processing circuit 110, the subject distance is calculated based on the phase difference image data 71A (for example, the "deviation amount α" illustrated in FIG. 7). In addition, in the processing circuit 110, the focus position is calculated based on the calculated subject distance. In addition, in the processing circuit 110, as described above, the number of combining frames is calculated based on the INF-side focus position, the MOD-side focus position, and the depth of field of a specific subject. Here, for example, the specific subject is exemplified by the close subject, the middle subject, and/or the far subject.

In the processing circuit 110, in the combining imaging section, the digital image data 70B of the number of combining frames calculated in the immediately preceding calculation section, that is, the preceding calculation section adjacent in time, is read out from the memory 112. In the processing circuit 110, combined image data is generated by combining the read digital image data 70B of the number of combining frames and is output to the rear stage circuit 15.

The digital image data 70B of the number of combining frames obtained by imaging in one combining imaging section is a plurality of pieces of the digital image data 70B having different focus positions. That is, positions at which the imaging region is focused are different from each other in the digital image data 70B of the number of combining frames obtained by imaging in one combining imaging section.

In the example illustrated in FIG. 10, the digital image data 70B from a second frame to a sixth frame stored in the memory 112 in a preceding combining imaging section of two preceding and succeeding combining imaging sections in time (hereinafter, referred to as the "preceding combining imaging section") is the digital image data 70B obtained by imaging at different focus positions. In addition, in the example illustrated in FIG. 10, the digital image data 70B from a seventh frame to an eleventh frame stored in the memory 112 in a succeeding combining imaging section of two preceding and succeeding combining imaging sections in time (hereinafter, referred to as the "succeeding combining imaging section") is also the digital image data 70B obtained by imaging at different focus positions. In the example illustrated in FIG. 10, one combined image data is generated based on the digital image data 70B from the second frame to the sixth frame stored in the memory 112. In addition, in the example illustrated in FIG. 10, one combined image data is generated based on the digital image data 70B from the seventh frame to the eleventh frame stored in the memory 112. The abbreviation "FR" illustrated in FIG. 10 stands for "Frame".

In addition, in the processing circuit 110, the digital image data 70B obtained by imaging at the middle focus position in the combining imaging section is not only used for generating the combined image data but also is output to the rear stage circuit 15 as live view image data. In the example illustrated in FIG. 10, in the preceding combining imaging section, the digital image data 70B of the fourth frame is output to the rear stage circuit 15 as the live view image data. In the succeeding combining imaging section, the digital image data 70B of the ninth frame is output to the rear stage circuit 15 as the live view image data.

Here, while an example of a form of outputting the digital image data 70B obtained by imaging at the middle focus position as the live view image data is exemplified, this is merely an example, and the technology of the present disclosure is not limited thereto. For example, the digital image data 70B obtained by imaging at the INF-side focus position and/or the MOD-side focus position may be output as the live view image data together with the digital image data 70B obtained by imaging at the middle focus position or instead of the digital image data 70B obtained by imaging at the middle focus position. That is, the digital image data 70B of at least one or more frames obtained by imaging in the combining imaging section may be output as the live view image data.

Figure 11:
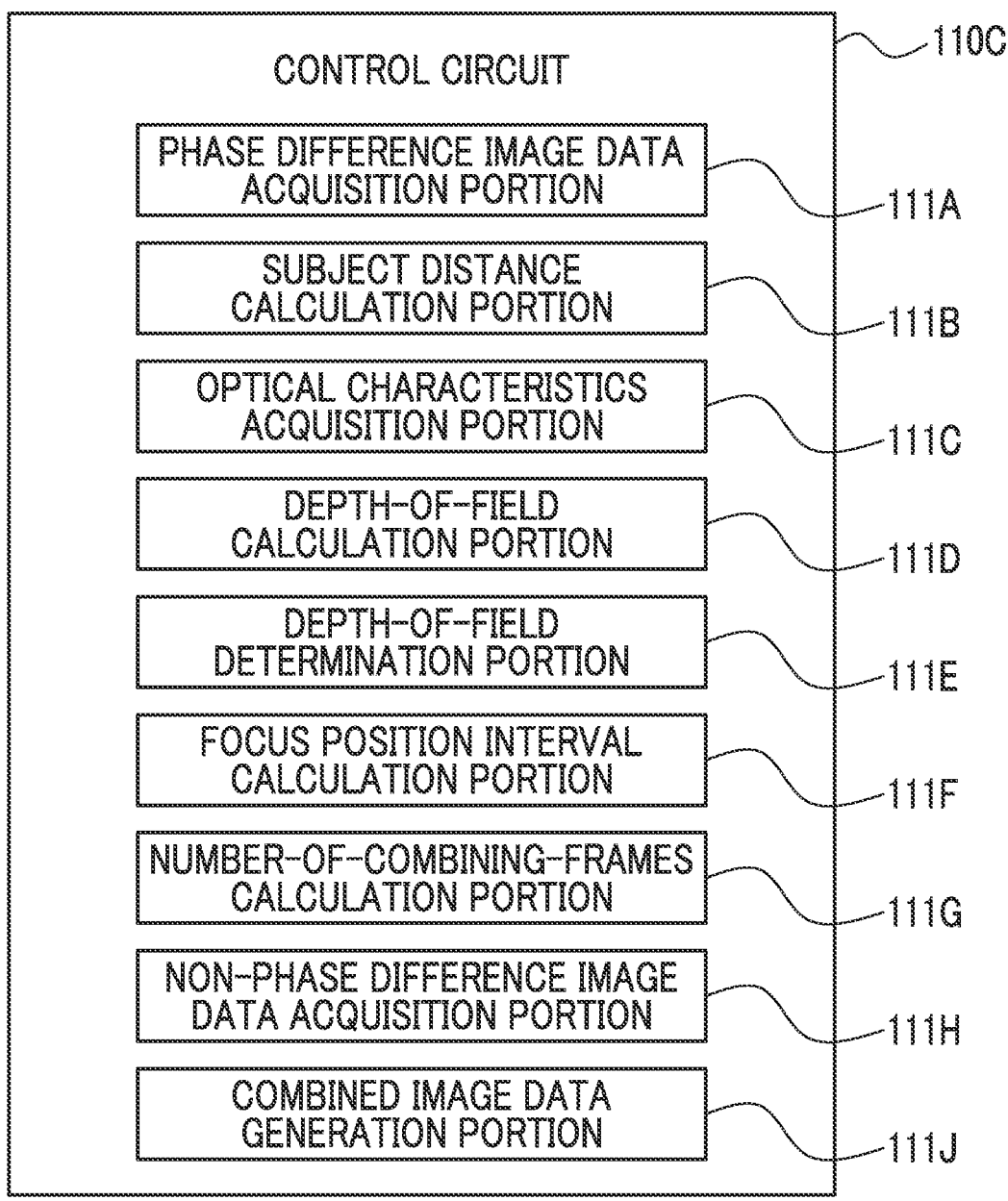
FIG. 11 is a block diagram illustrating an example of functions included in a control circuit illustrated in FIG. 9.

As illustrated in FIG. 11 as an example, the control circuit 110C includes a phase difference image data acquisition portion 111A, a subject distance calculation portion 111B, an optical characteristics acquisition portion 111C, a depth-of-field calculation portion 111D, a depth-of-field determination portion 111E, a focus position interval calculation portion 111F, a number-of-combining-frames calculation portion 111G, a non-phase difference image data acquisition portion 111H, and a combined image data generation portion 111J.

Figure 12:
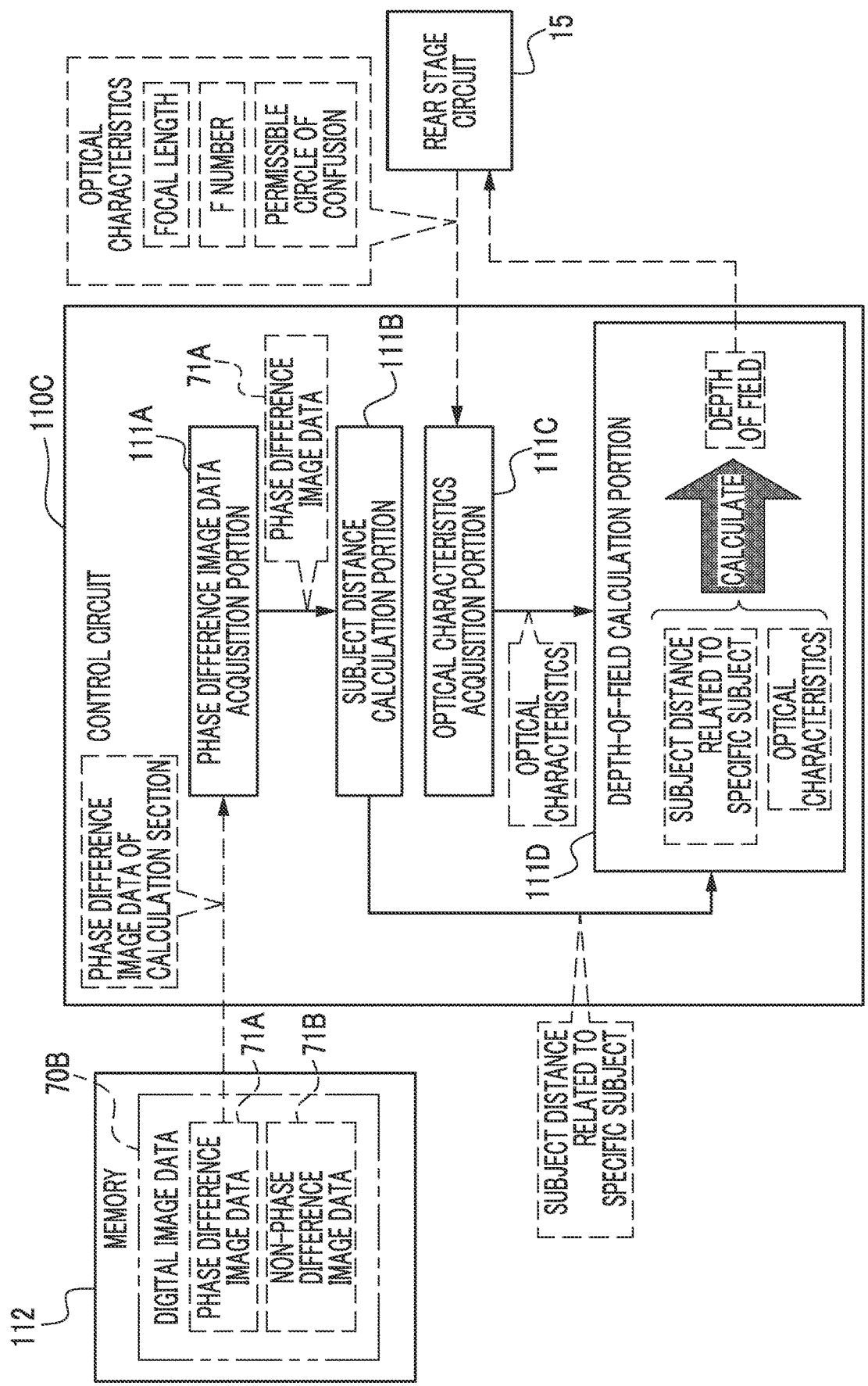
FIG. 12 is an operation conceptual diagram illustrating an example of a flow from acquisition of phase difference image data to depth-of-field calculation among the functions of the control circuit illustrated in FIG. 11.

As illustrated in FIG. 12 as an example, the memory 112 stores the phase difference image data 71A and the non-phase difference image data 71B as the digital image data 70B. In the calculation section, the phase difference image data acquisition portion 111A acquires the phase difference image data 71A from the memory 112.

The subject distance calculation portion 111B calculates the deviation amount α from the phase difference image data 71A and calculates the subject distance related to the specific subject included in the imaging region from the calculated deviation amount α. Specifically, the subject distance calculation portion 111B calculates the subject distance related to the specific subject using a subject distance calculation expression that takes the deviation amount α as an independent variable and takes the subject distance as a dependent variable.

The optical characteristics acquisition portion 111C acquires optical characteristics from the rear stage circuit 15. Here, a focal length, an F number, and a permissible circle of confusion are employed as an example of the optical characteristics. Here, the focal length is an example of a "focal length related to an optical system" according to the embodiments of the technology of the present disclosure.

The depth-of-field calculation portion 111D calculates the depth of field related to the specific subject based on the subject distance and the optical characteristics. Specifically, the depth-of-field calculation portion 111D calculates the depth of field related to the specific subject using a depth-of-field calculation expression that takes the subject distance and the optical characteristics as independent variables and takes the depth of field as a dependent variable. Here, the subject distance and the optical characteristics are an example of "characteristics of the optical system" according to the embodiments of the technology of the present disclosure.

The number of pulses (hereinafter, referred to as the "number of depth width pulses") obtained by converting the depth of field by the depth-of-field calculation portion 111D is the number of pulses for specifying a movement amount of the focus lens 40B corresponding to on one focal depth. The depth-of-field calculation portion 111D outputs the depth of field calculated as the number of depth width pulses to the rear stage circuit 15.

Figure 13:
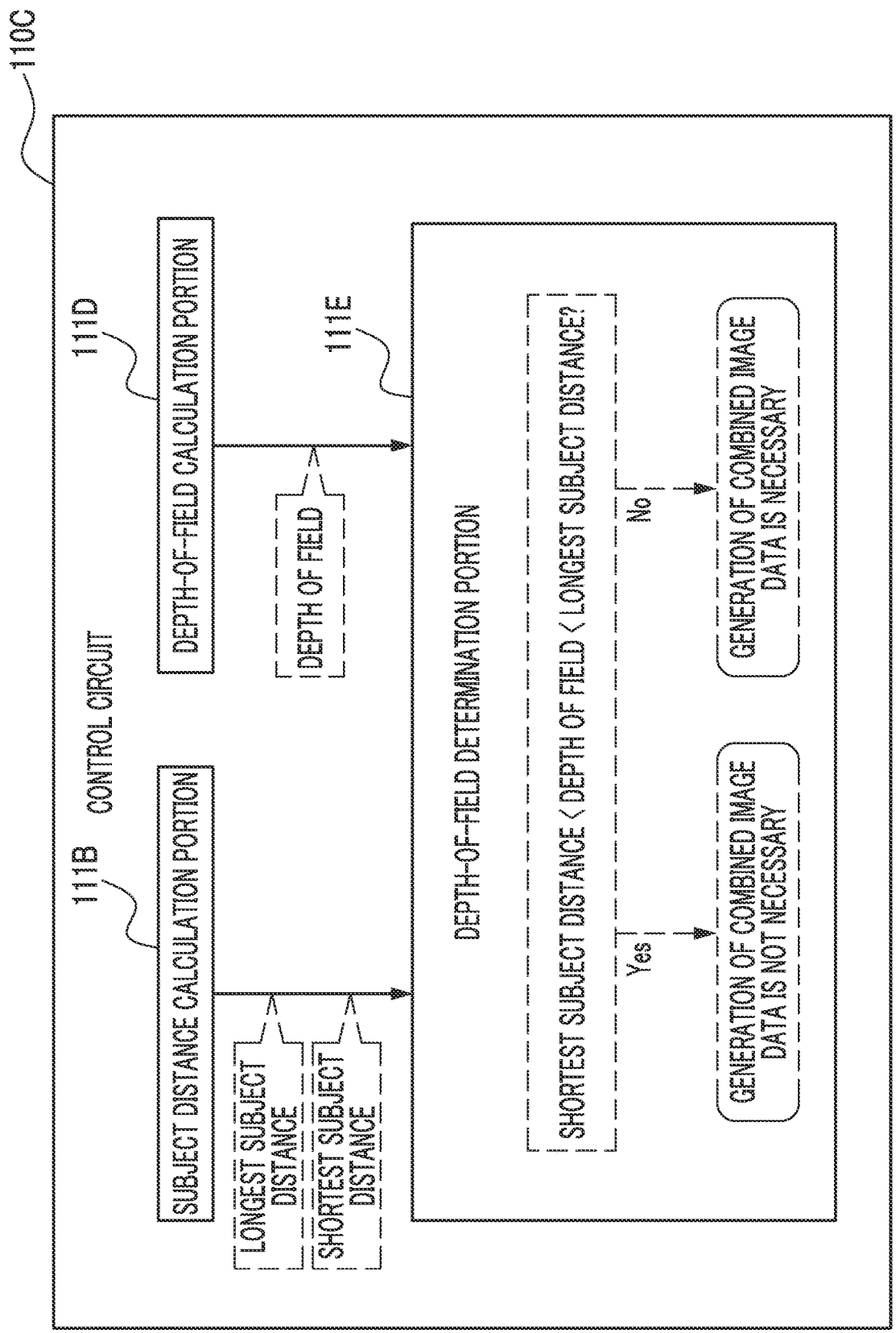
FIG. 13 is an operation conceptual diagram illustrating an example of a flow of depth-of-field determination of determining whether or not to generate the combined image data among the functions of the control circuit illustrated in FIG. 11.

As illustrated in FIG. 13 as an example, the depth-of-field determination portion 111E acquires the longest subject distance and the shortest subject distance as the number of pulses from the subject distance calculation portion 111B. The number of pulses indicating the subject distance is uniquely decided by a design value or the like of the imaging lens 40. The longest subject distance is a subject distance for the far subject focused at the INF-side focus position in the imaging region. The shortest subject distance is a subject distance for the close subject focused at the MOD-side focus position in the imaging region.

The depth-of-field determination portion 111E acquires the depth of field from the depth-of-field calculation portion 111D. The depth-of-field determination portion 111E determines whether or not the longest subject distance acquired from the subject distance calculation portion 111B and the shortest subject distance acquired from the subject distance calculation portion 111B fall within distances within the depth of field acquired from the depth-of-field calculation portion 111D. In a case where the longest subject distance and the shortest subject distance fall within the distances within the depth of field, the depth-of-field determination portion 111E determines that the generation of the combined image data is not necessary. Meanwhile, in a case where the longest subject distance and the shortest subject distance do not fall within the distances within the depth of field, the depth-of-field determination portion 111E determines that the generation of the combined image data is necessary.

Figure 14:
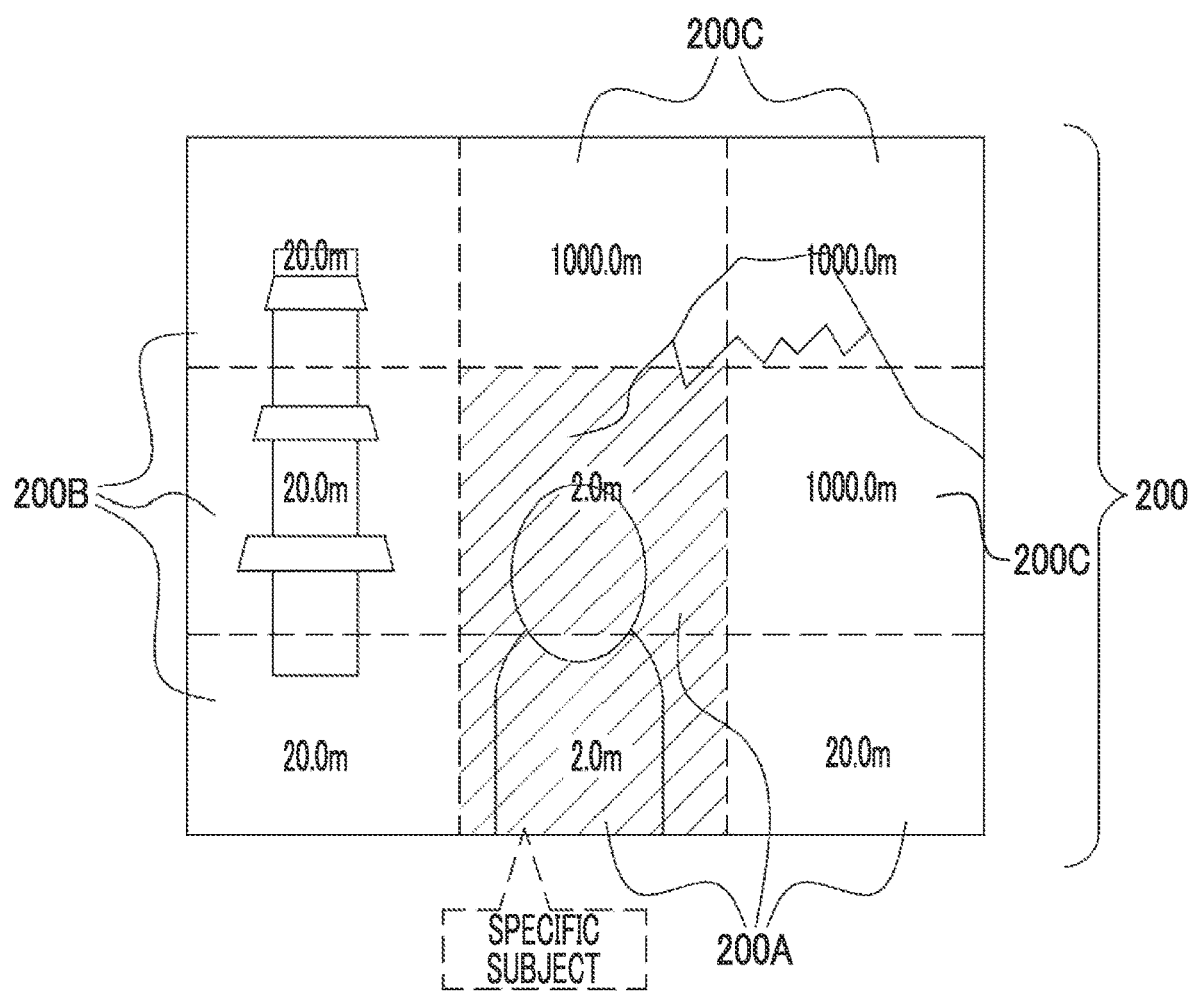
FIG. 14 is a conceptual diagram illustrating an example of a subject distance with respect to an imaging region according to each embodiment.

As illustrated in FIG. 14 as an example, an imaging region 200 imaged by the imaging apparatus 10 is divided into a plurality of areas. In the example illustrated in FIG. 14, a first imaging region 200A corresponding to the shortest subject distance (in the example illustrated in FIG. 14, 2.0 m), a second imaging region 200B corresponding to a middle subject distance (in the example illustrated in FIG. 14, 20.0 m), and a third imaging region 200C corresponding to the longest subject distance (in the example illustrated in FIG. 14, 1000.0 m) are illustrated as the plurality of areas. In the example illustrated in FIG. 14, while the first imaging region 200A illustrated by hatching as the specific subject, this is merely an example. The second imaging region 200B or the third imaging region 200C may be the specific subject. In addition, as will be described later, the specific subject may be changed in accordance with an instruction received by the reception device 84.

Figure 15:
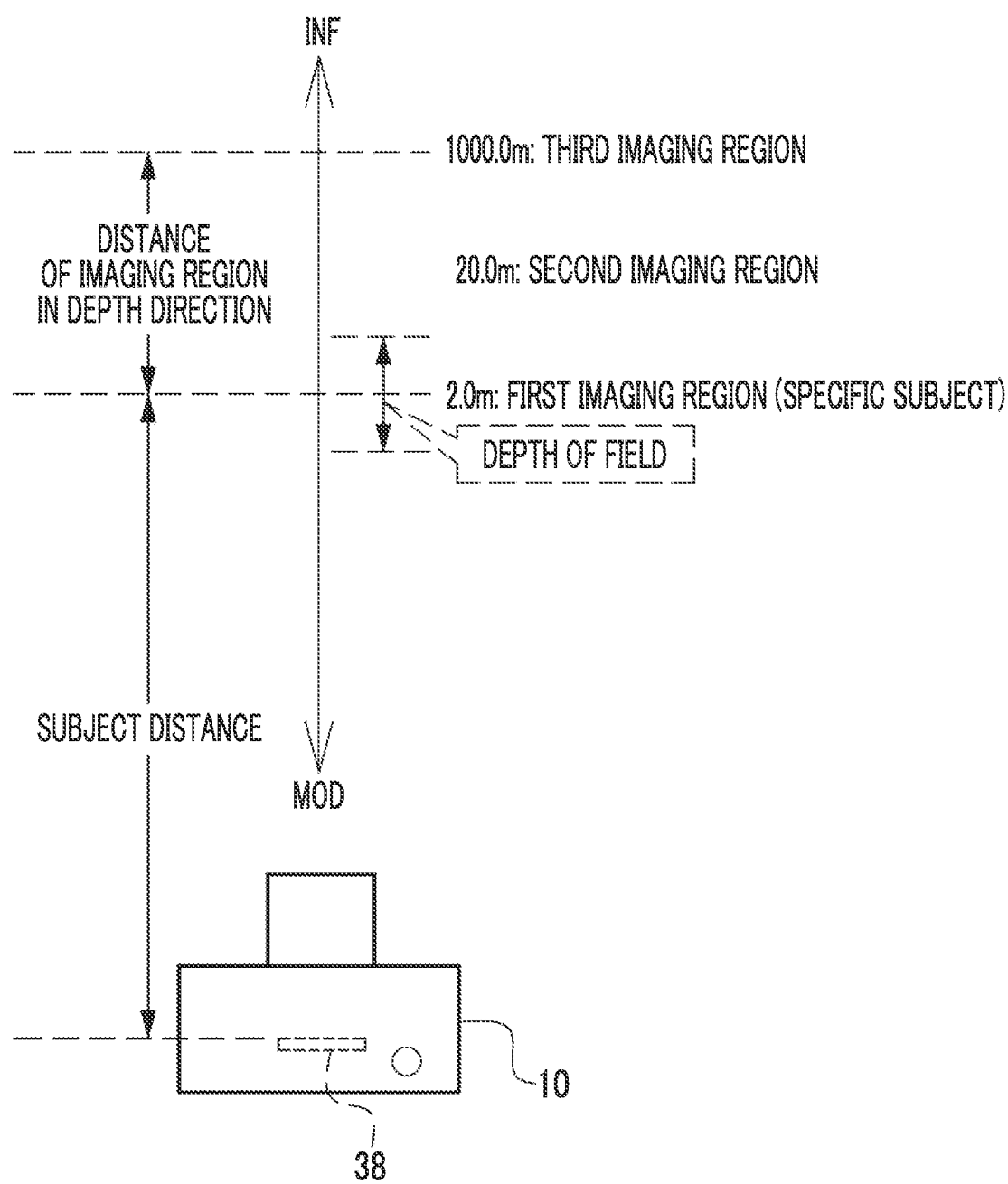
FIG. 15 is a detailed diagram illustrating a difference in subject distance illustrated in FIG. 14.

As illustrated in FIG. 15 as an example, the first imaging region 200A is positioned closer to an imaging apparatus 10 side than the second imaging region 200B and the third imaging region 200C. The third imaging region 200C is positioned further from the imaging apparatus 10 than the first imaging region 200A and the second imaging region 200B. The second imaging region 200B is positioned between the first imaging region 200A and the third imaging region 200C. The depth of field is a depth range that is allowed as a range within which the first imaging region 200A is focused in a direction from the imaging apparatus 10 side toward an infinity side, that is, an imaging direction of the imaging apparatus 10. Here, a center of the depth range is a position specified by the subject distance (in the example illustrated in FIG. 15, 2.0 m) related to the first imaging region 200A.

Figure 16:
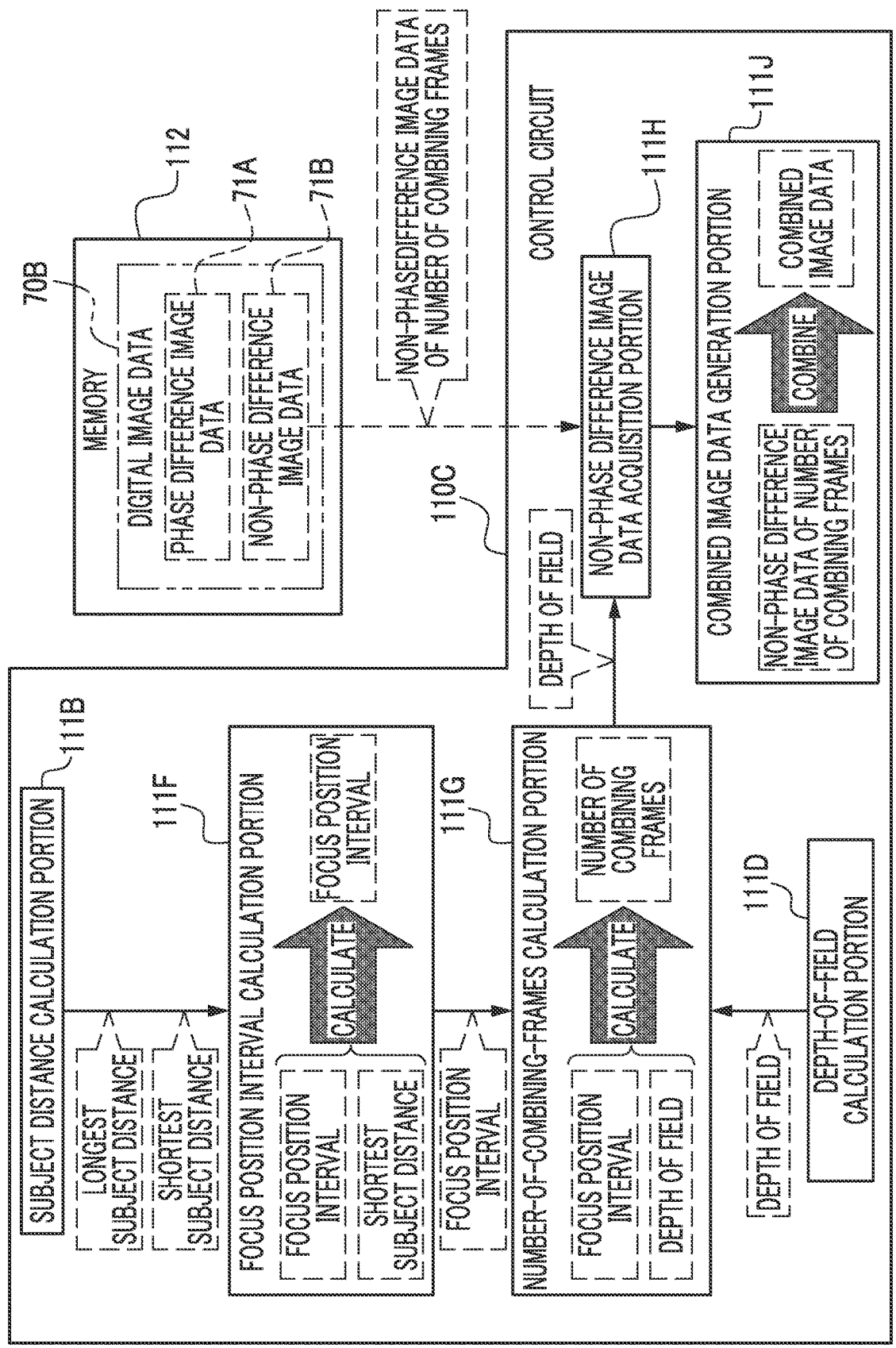
FIG. 16 is an operation conceptual diagram illustrating an example of a flow from calculation of the subject distance to the generation of the combined image data among the functions of the control circuit illustrated in FIG. 11.

As illustrated in FIG. 16 as an example, the focus position interval calculation portion 111F acquires a longest subject distance and a shortest subject distance from the subject distance calculation portion 111B and calculates the focus position interval.

The number-of-combining-frames calculation portion 111G acquires the depth of field from the depth-of-field calculation portion 111D and acquires the focus position interval from the focus position interval calculation portion 111F. The number-of-combining-frames calculation portion 111G calculates the number of combining frames based on the depth of field and the focus position interval. That is, as described above, the number-of-combining-frames calculation portion 111G decides the number of lens driving pulses as the depth of field and calculates the number of combining frames based on the decided number of lens driving pulses and the focus position interval.

The non-phase difference image data acquisition portion 111H acquires the non-phase difference image data 71B of the number of combining frames from the digital image data 70B stored in the memory 112. For example, as described above, in a case where the number of combining frames is "12", the non-phase difference image data 71B of 12 frames is acquired from the memory 112 by the non-phase difference image data acquisition portion 111H.

The combined image data generation portion 111J acquires the non-phase difference image data 71B of the number of combining frames from the non-phase difference image data acquisition portion 111H. The combined image data generation portion 111J generates the combined image data based on the non-phase difference image data 71B of the number of combining frames.

Figure 17:
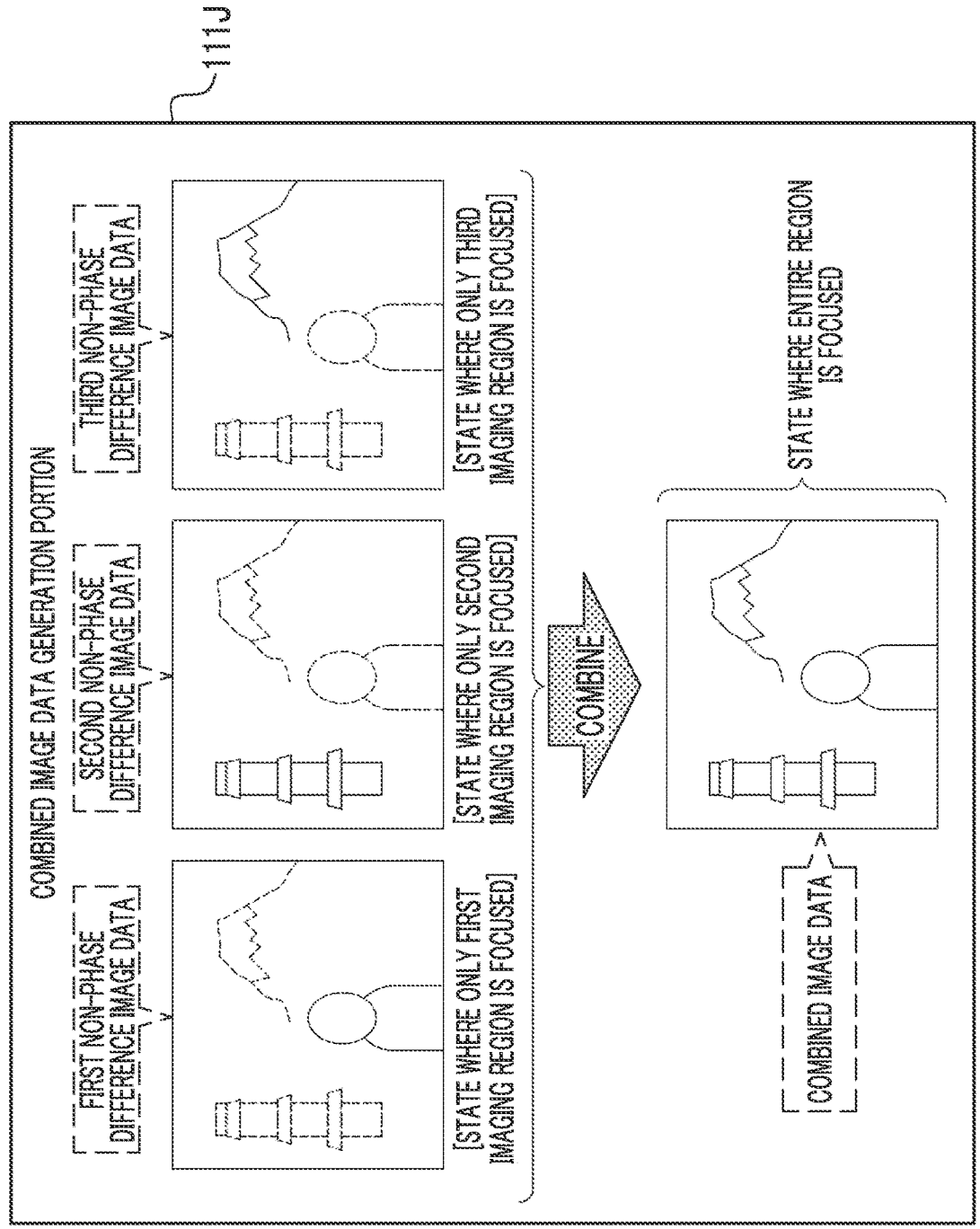
FIG. 17 is a conceptual diagram illustrating an example of the generation of the combined image data according to each embodiment.

In the example illustrated in FIG. 17, first non-phase difference image data, second non-phase difference image data, and third non-phase difference image data are illustrated as the non-phase difference image data 71B of the number of combining frames equal to "3". The first non-phase difference image data is the non-phase difference image data 71B obtained by imaging the imaging region 200 in a case where only the first imaging region 200A is in a focused state. The second non-phase difference image data is the non-phase difference image data 71B obtained by imaging the imaging region 200 in a case where only the second imaging region 200B is in a focused state. The third non-phase difference image data is the non-phase difference image data 71B obtained by imaging the imaging region 200 in a case where only the third imaging region 200C is in a focused state. Combined image data 124 is generated by combining the first non-phase difference image data, the second non-phase difference image data, and the third non-phase difference image data by the combined image data generation portion 111J. The combined image data 124 is image data corresponding to non-phase difference image data obtained by imaging in a case where the entire region of the imaging region 200 is in a focused state. Thus, the combined image data 124 is generated. For example, the specific subject is easily detected from the combined image data, compared to a case where the specific subject is detected based on the second non-phase difference image data or the third non-phase difference image data.

Figure 18:
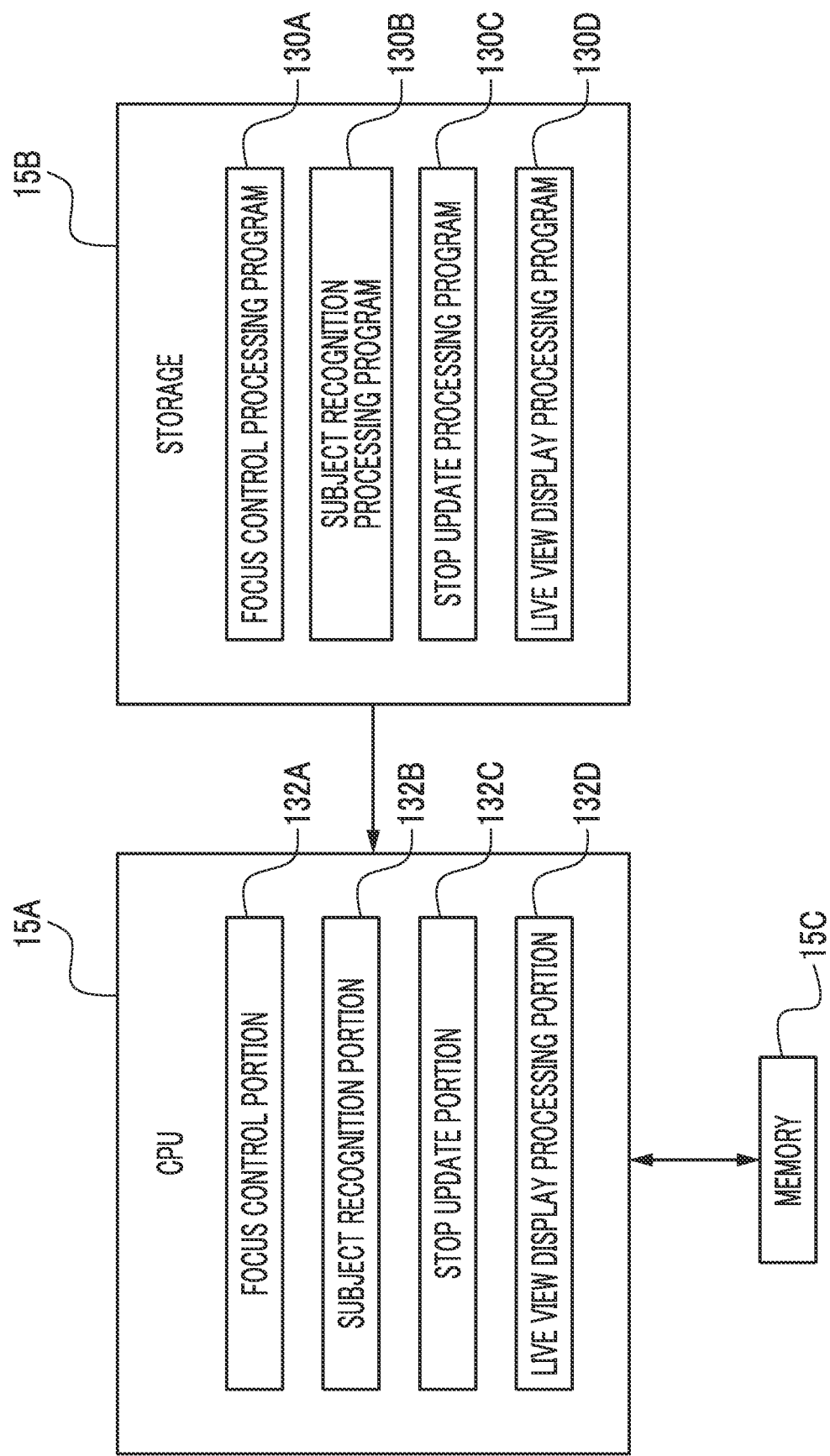
FIG. 18 is a block diagram illustrating an example of functions included in a rear stage circuit of the imaging apparatus according to each embodiment.

As illustrated in FIG. 18 as an example, the storage 15B stores a focus control processing program 130A, a subject recognition processing program 130B, a stop update processing program 130C, and a live view display processing program 130D. The CPU 15A operates as a focus control portion 132A by reading out the focus control processing program 130A from the storage 15B and executing the focus control processing program 130A on the memory 15C. In addition, the CPU 15A operates as a subject recognition portion 132B by reading out the subject recognition processing program 130B from the storage 15B and executing the subject recognition processing program 130B on the memory 15C. In addition, the CPU 15A operates as an F number update portion 132C by reading out the stop update processing program 130C from the storage 15B and executing the stop update processing program 130C on the memory 15C. Furthermore, the CPU 15A operates as a live view display processing portion 132D by reading out the live view display processing program 130D from the storage 15B and executing the live view display processing program 130D on the memory 15C.

Figure 19:
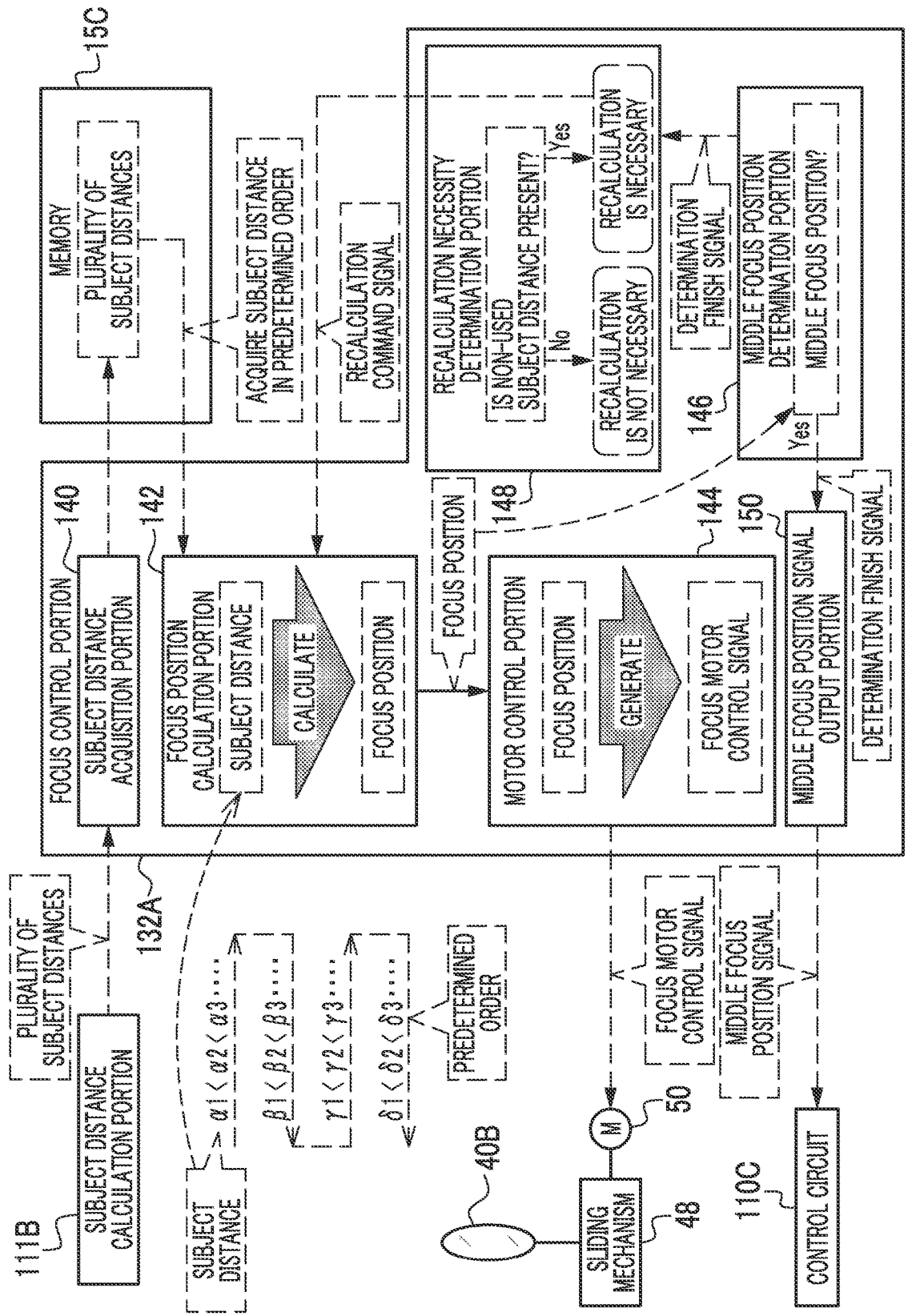
FIG. 19 is an operation conceptual diagram illustrating an example of a focus control portion illustrated in FIG. 18.

As illustrated in FIG. 19 as an example, the focus control portion 132A comprises a subject distance acquisition portion 140, a focus position calculation portion 142, a motor control portion 144, a middle focus position determination portion 146, a recalculation necessity determination portion 148, and a middle focus position signal output portion 150.

The subject distance acquisition portion 140 acquires a plurality of subject distances calculated by the subject distance calculation portion 111B. In the present embodiment, for example, the plurality of subject distances are a distance to the first imaging region 200A (in the example illustrated in FIG. 14, 2.0 m), a distance to the second imaging region 200B (in the example illustrated in FIG. 14, 20.0 m), and a distance to the third imaging region 200C (in the example illustrated in FIG. 14, 1000.0 m). The subject distance acquisition portion 140 stores the acquired plurality of subject distances in the memory 15C.

The focus position calculation portion 142 acquires the plurality of subject distances from the memory 15C in a predetermined order and calculates the focus position based on the subject distance in accordance with the predetermined order. Acquisition of second and later subject distances among the plurality of subject distances and calculation of the focus positions based on the second and later subject distances are performed by the focus position calculation portion 142 each time a recalculation command signal, described later, is input into the focus position calculation portion 142.

Here, the predetermined order refers to an order that is decided such that an ascending order of the subject distances and a descending order of the subject distances alternate in units of combining imaging sections each time the combining imaging section is repeatedly updated in time series (refer to FIG. 10).

In the example illustrated in FIG. 19, an order in which the subject distances are acquired by the focus position calculation portion 142 in first to fourth combining imaging sections is illustrated as the predetermined order. In the first combining imaging section, subject distances $\alpha 1$, a2, a3, . . . are calculated by the subject distance calculation portion 111B. In the second combining imaging section, subject distances $\beta 1$, $\beta 2$, $\beta 3$, . . . are calculated by the subject distance calculation portion 111B. In the third combining imaging section, $\gamma 1$, $\gamma 2$, $\gamma 3$, . . . are calculated by the subject distance calculation portion 111B. In the fourth combining imaging section, $\delta 1$, $\delta 2$, $\delta 3$, . . . are calculated by the subject distance calculation portion 111B.

In the first combining imaging section, the subject distances $\alpha 1$, $\alpha 2$, $\alpha 3$, . . . satisfy a magnitude relationship "$\alpha 1 < \alpha 2 < \alpha 3 < \ldots$". The focus position calculation portion 142 acquires the subject distances $\alpha 1$, $\alpha 2$, $\alpha 3$, . . . in an ascending order and, each time the subject distance is acquired, calculates the focus position corresponding to the acquired subject distance. In addition, in the second combining imaging section, the subject distances $\beta 1$, $\beta 2$, $\beta 3$, . .

. satisfy a magnitude relationship "$\beta1<\beta2<\beta3<\ldots$". The focus position calculation portion 142 acquires the subject distances $\beta1, \beta2, \beta3, \ldots$ in a descending order and, each time the subject distance is acquired, calculates the focus position corresponding to the acquired subject distance. In addition, in the third combining imaging section, the subject distances $\gamma1, \gamma2, \gamma3, \ldots$ satisfy a magnitude relationship "$\gamma1<\gamma2<\gamma3<\ldots$". The focus position calculation portion 142 acquires the subject distances $\gamma1, \gamma2, \gamma3, \ldots$ in an ascending order and, each time the subject distance is acquired, calculates the focus position corresponding to the acquired subject distance. Furthermore, in the fourth combining imaging section, the subject distances $\delta1, \delta2, \delta3, \ldots$ satisfy a magnitude relationship "$\delta1<\delta2<\delta3<\ldots$". The focus position calculation portion 142 acquires the subject distances $\delta1, \delta2, \delta3, \ldots$ in a descending order and, each time the subject distance is acquired, calculates the focus position corresponding to the acquired subject distance.

Each time the focus positions are calculated by the focus position calculation portion 142, the motor control portion 144 generates a focus motor control signal corresponding to the most recent focus position and outputs the focus motor control signal to the motor 50 (refer to FIG. 3). The focus motor control signal is a signal for controlling the motor 50 such that the focus lens 40B is moved to the most recent focus position. In a case where the focus motor control signal corresponding to the most recent focus position is output to the motor 50 by the motor control portion 144 each time the focus positions are calculated by the focus position calculation portion 142, the focus lens 40B reciprocates between the INF-side focus position and the MOD-side focus position along the optical axis L1 (refer to FIG. 3) by receiving the motive power of the motor 50 (refer to FIG. 10).

The middle focus position determination portion 146 determines whether or not the most recent focus position calculated by the focus position calculation portion 142 is the middle focus position (refer to FIG. 10). In a case where the most recent focus position calculated by the focus position calculation portion 142 is the middle focus position, the middle focus position determination portion 146 outputs an output command signal for instructing the middle focus position signal output portion 150 to output a signal. In a case where the determination as to whether or not the most recent focus position calculated by the focus position calculation portion 142 is the middle focus position (refer to FIG. 10) is finished, the middle focus position determination portion 146 outputs a determination finish signal to the recalculation necessity determination portion 148 regardless of a determination result.

In a case where the output command signal is input from the middle focus position determination portion 146, the middle focus position signal output portion 150 outputs a middle focus position signal indicating that the focus lens 40B has reached the middle focus position to the control circuit 110C.

In a case where the determination finish signal is input from the middle focus position determination portion 146, the recalculation necessity determination portion 148 determines whether or not a non-used subject distance is present in the memory 15C. Here, the non-used subject distance refers to a subject distance that has not been used yet for calculating the focus positions by the focus position calculation portion 142 among the plurality of subject distances stored in the memory 15C. In a case where the non-used subject distance is present in the memory 15C, the recalculation necessity determination portion 148 determines that recalculation of the focus positions is necessary, and outputs a recalculation command signal to the focus position calculation portion 142. The recalculation command signal is a signal for instructing the focus position calculation portion 142 to acquire the subject distance from the memory 15C in accordance with the predetermined order and recalculate the focus position. In a case where the non-used subject distance is not present in the memory 15C, the focus position calculation portion 142 determines that the recalculation of the focus position is not necessary, and does not output the recalculation command signal. In a case where the recalculation command signal is input from the recalculation necessity determination portion 148, the focus position calculation portion 142 acquires one subject distance from the memory 15C in accordance with the predetermined order and recalculates the focus position corresponding to the acquired subject distance.

Figure 20:
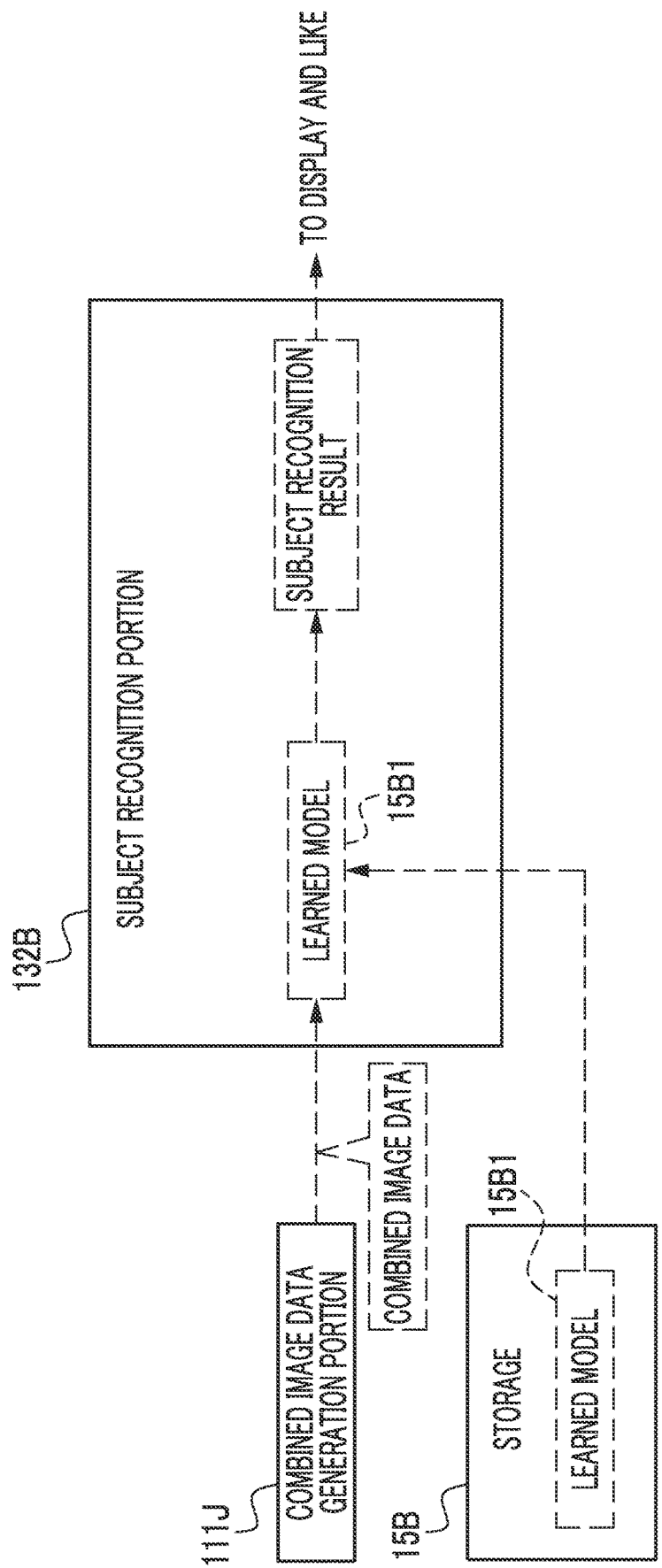
FIG. 20 is an operation conceptual diagram illustrating an example of a subject recognition portion illustrated in FIG. 18.

As illustrated in FIG. 20 as an example, the storage 15B stores a learned model 15B1. The learned model 15B1 is a model obtained in advance by performing machine learning based on a learning model (for example, a neural network) using a plurality of pieces of known data for subject recognition as training data. The subject recognition portion 132B acquires the combined image data from the combined image data generation portion 111J and performs image recognition for recognizing the specific subject on the acquired combined image data. Here, the image recognition is image recognition using the learned model 15B1 in the storage 15B. A result (for example, specifying information for specifying an image region recognized as the specific subject in a combined image indicated by the combined image data and information indicating a type of the specific subject) corresponding to the provided combined image data is derived from the learned model 15B1. The subject recognition portion 132B generates a specific subject recognition result based on the result derived using the learned model 15B1 and outputs the specific subject recognition result to the display 26 and the like. For example, the information indicating the type of the specific subject, the image region showing the specific subject in the combined image, and/or a processed combined image obtained by processing the combined image in an aspect in which a specific subject image can be distinguished from the other image region is exemplified as the specific subject recognition result.

Figure 21:
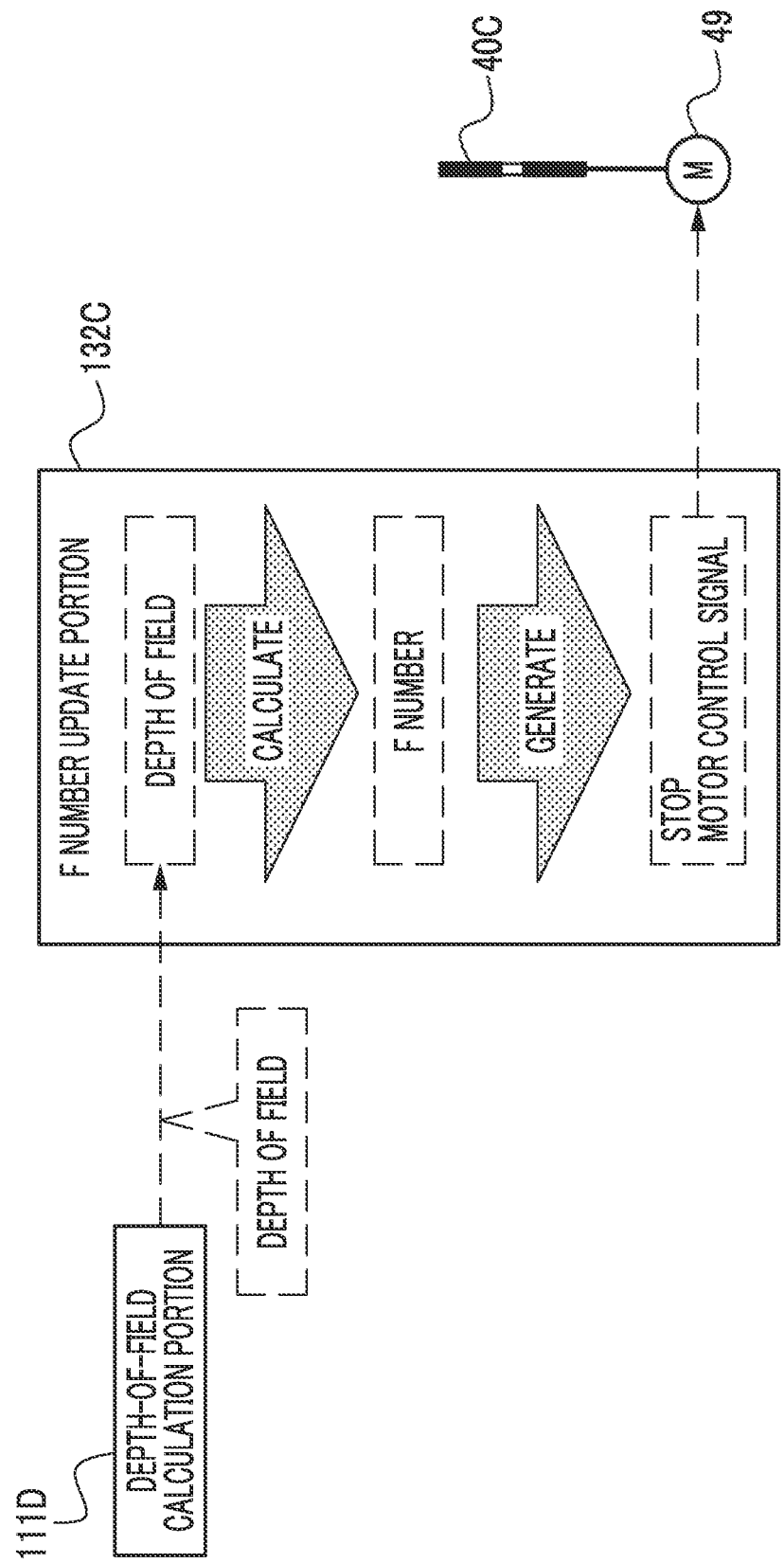
FIG. 21 is an operation conceptual diagram illustrating an example of an F number update portion illustrated in FIG. 18.

As illustrated in FIG. 21 as an example, the F number update portion 132C acquires the depth of field from the depth-of-field calculation portion 111D and calculates the F number for causing the entire imaging region 200 to fall within the depth of field. The F number update portion 132C generates a stop motor control signal for implementing the calculated F number and outputs the stop motor control signal to the motor 49. The stop 40C operates by receiving the motive power generated by the motor 49 in accordance with the stop motor control signal.

Figure 22:
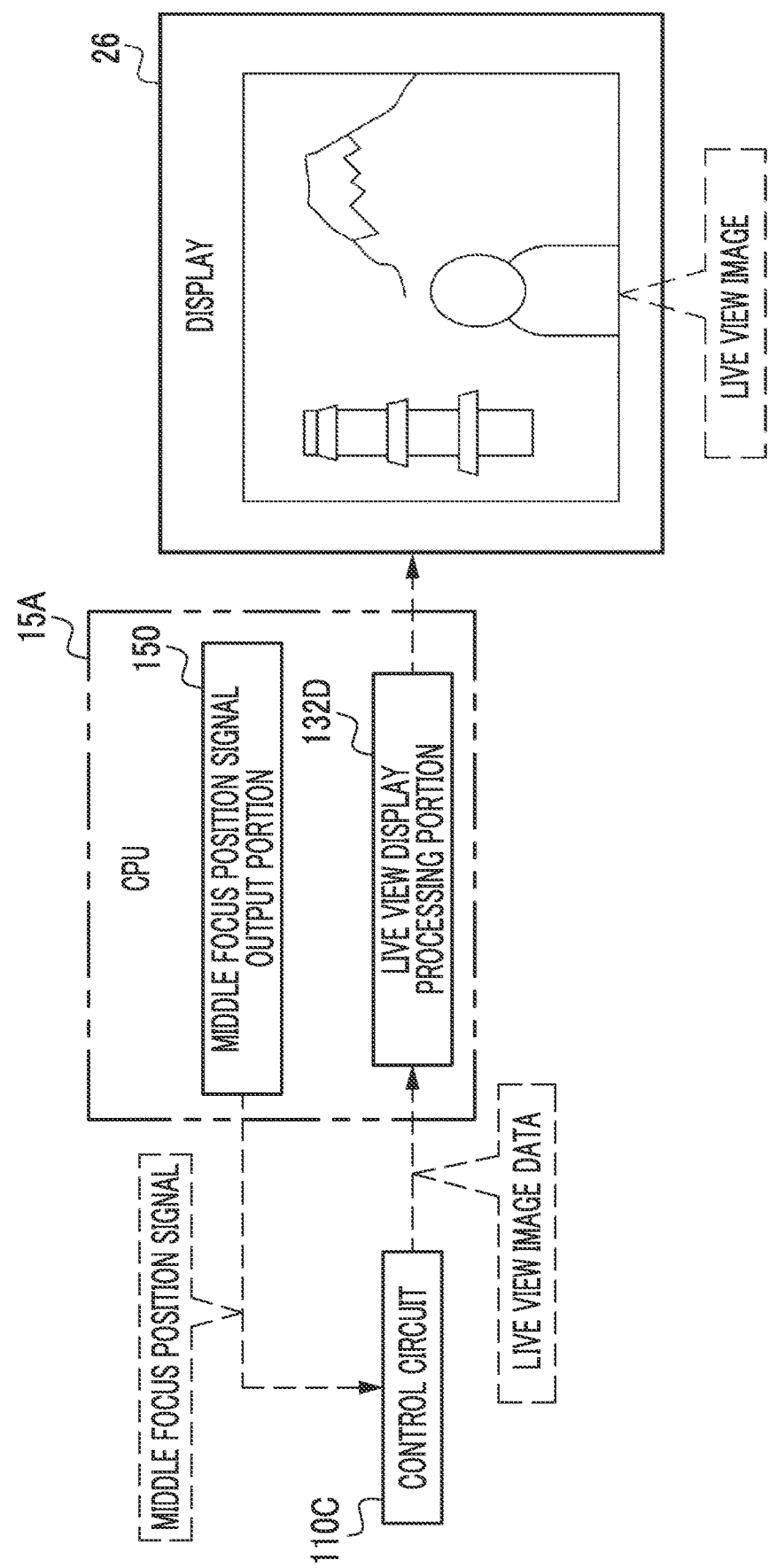
FIG. 22 is an operation conceptual diagram illustrating an example of a live view display processing portion illustrated in FIG. 18.

As illustrated in FIG. 22 as an example, in a case where the middle focus position signal is input from the middle focus position signal output portion 150, the control circuit 110C outputs the non-phase difference image data 71B of the most recent one frame to the live view display processing portion 132D as the live view image data. The live view display processing portion 132D receives the live view image data from the control circuit 110C and displays an image indicated by the received live view image data on the display 26 as a live view image.

Figure 23:
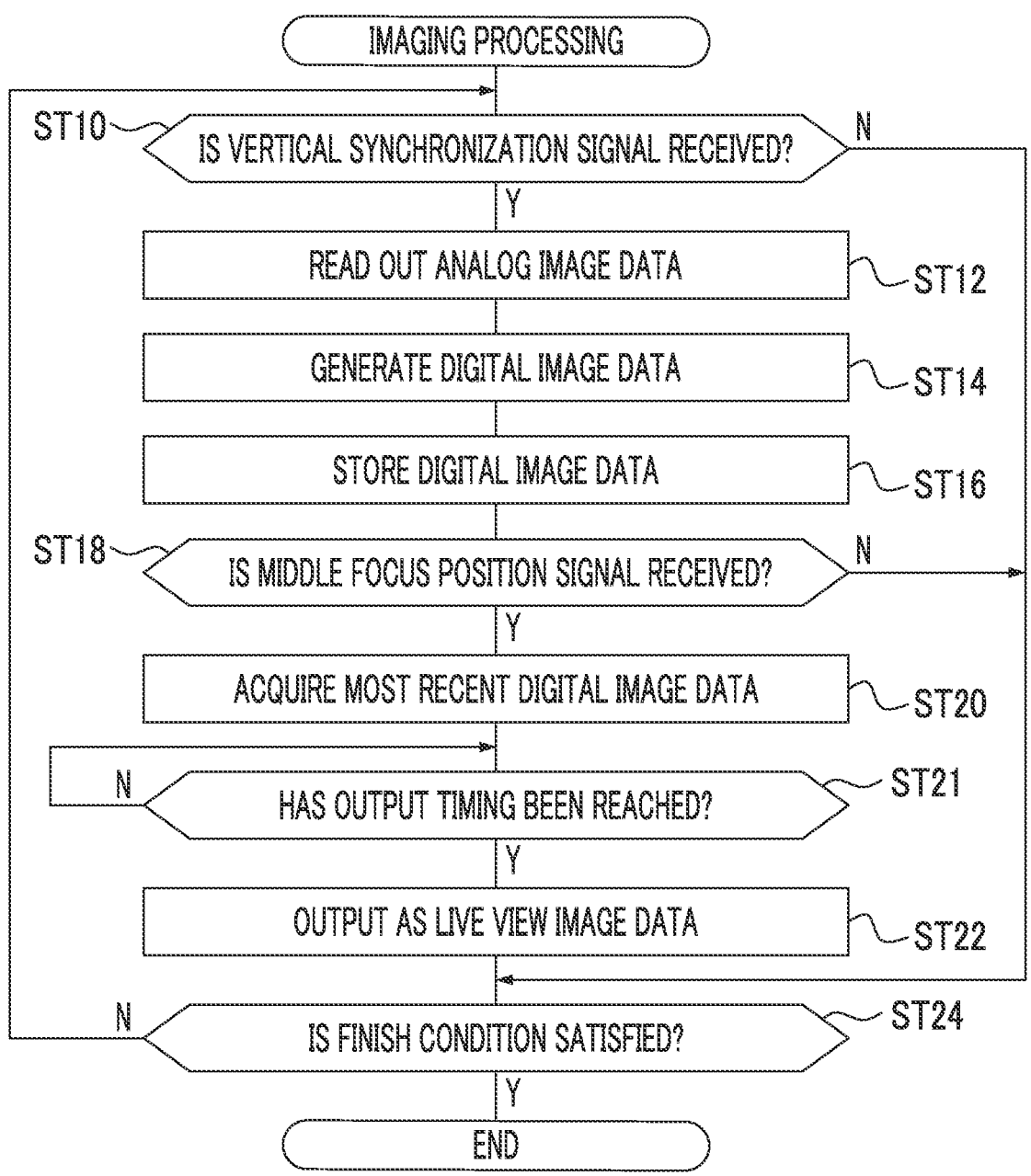
FIG. 23 is a flowchart illustrating an example of a flow of imaging processing according to a first embodiment.

Next, an action of the imaging apparatus 10 according to the first embodiment will be described with reference to FIG. 23 to FIG. 28. FIG. 23 illustrates an example of a flow of imaging processing executed by the processing circuit 110. In the imaging processing illustrated in FIG. 23, first, in step ST10, the control circuit 110C determines whether or not the vertical synchronization signal is received by the communication I/F 110D. In step ST10, in a case where the vertical synchronization signal is not received, a negative determination is made, and the control circuit 110C performs the determination of step ST10 again. In step ST10, in a case where the vertical synchronization signal is received, a positive determination is made, and the imaging processing transitions to step ST12.

In step ST12, the reading circuit 110A reads out the analog image data 70A of one frame from the photoelectric conversion element 42 in accordance with the vertical synchronization signal received in step ST10. Then, the imaging processing transitions to step ST14.

In step ST14, the digital processing circuit 110B generates the digital image data 70B by digitizing the analog image data 70A read out by the reading circuit 110A in step ST12. Then, the imaging processing transitions to step ST16.

In step ST16, the control circuit 110C stores the digital image data 70B generated in step ST14 in the memory 112. Then, the imaging processing transitions to step ST18.

In step ST18, the control circuit 110C determines whether or not the middle focus position signal is received from the rear stage circuit 15 by the communication I/F 110D. In step ST18, in a case where the middle focus position signal is not received, a negative determination is made, and the control circuit 110C performs the determination of step ST10 again. In step ST18, in a case where the middle focus position signal is received, a positive determination is made, and the imaging processing transitions to step ST20.

In step ST20, the control circuit 110C acquires the most recent digital image data 70B from the memory 112 by performing imaging in a state where the focus lens 40B is positioned at the middle focus position. Then, the imaging processing transitions to step ST22.

In step ST21, the control circuit 110C determines whether or not an output timing of the digital image data 70B has been reached. Here, the output timing of the digital image data 70B refers to a timing that is reached for each time interval defined by the output frame rate of the imaging element 38. In step ST21, in a case where the output timing of the digital image data 70B has not been reached, a negative determination is made, and the control circuit 110C performs the determination of step ST21 again. In step ST21, in a case where the output timing of the digital image data 70B has been reached, the imaging processing transitions to step ST22.

In step ST22, the control circuit 110C outputs the digital image data 70B acquired in step ST18 to the rear stage circuit 15 through the communication I/F 110D as live view image data. Then, the imaging processing transitions to step ST24.

In step ST24, the control circuit 110C determines whether or not a condition (hereinafter, referred to as an "imaging processing finish condition") under which the imaging processing is finished is satisfied. A condition that an instruction to finish the imaging processing is received by the reception device 84 is exemplified as an example of the imaging processing finish condition. In step ST24, in a case where the imaging processing finish condition is not satisfied, a negative determination is made, and the imaging processing transitions to step ST10. In step ST24, in a case where the imaging processing finish condition is satisfied, a positive determination is made, and the imaging processing is finished.

Figure 24A:
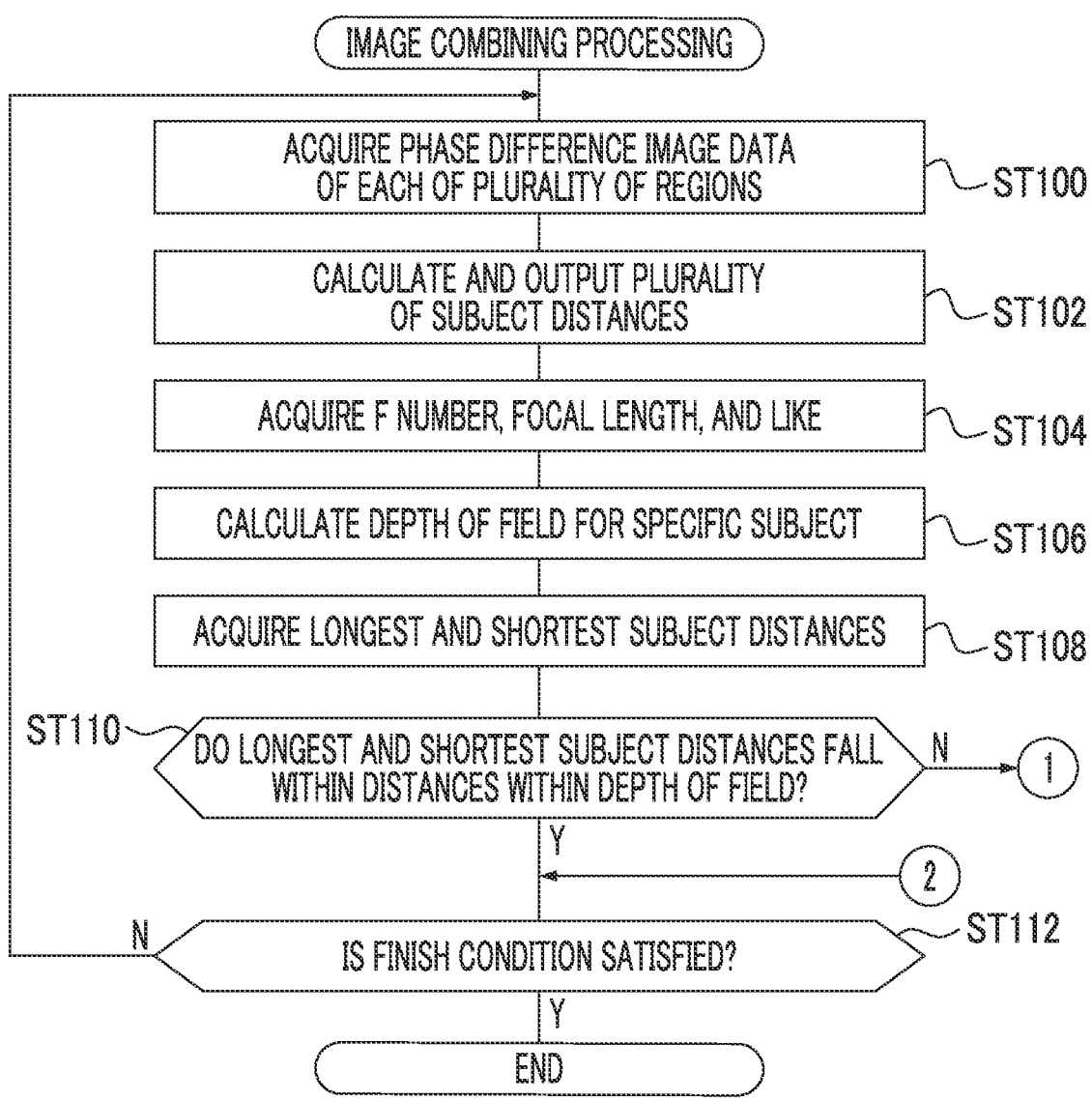
FIG. 24A is a flowchart illustrating an example of a flow of image combining processing according to the first embodiment.
Figure 24B:
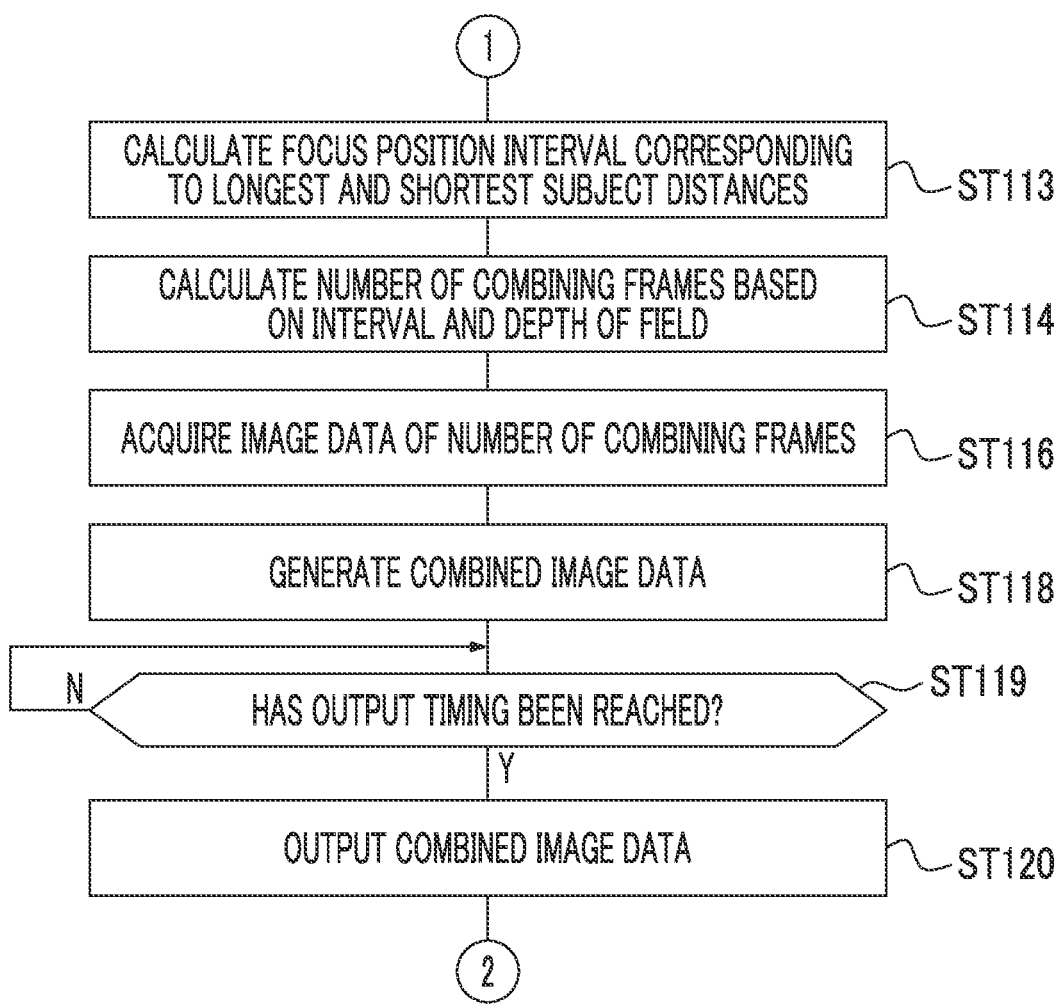
FIG. 24B is a continuation of the flowchart illustrated in FIG. 24A.

FIG. 24A and FIG. 24B illustrate an example of a flow of image combining processing executed by the control circuit 110C. In the image combining processing illustrated in FIG. 24A, first, in step ST100, the phase difference image data acquisition portion 111A acquires the phase difference image data 71A corresponding to each of a plurality of regions from the digital image data 70B stored in the memory 112. Here, for example, the plurality of regions refer to the first imaging region 200A, the second imaging region 200B, and the third imaging region 200C. After the processing of step ST110 is executed, the image combining processing transitions to step ST102.

In step ST102, the subject distance calculation portion 111B calculates the subject distance of each of the plurality of regions (hereinafter, referred to as the "plurality of subject distances") based on the phase difference image data 71A acquired for each of the plurality of regions in step ST100, and outputs the subject distances to the depth-of-field calculation portion 111D, the depth-of-field determination portion 111E (refer to FIG. 13), the focus position interval calculation portion 111F (refer to FIG. 14), and the focus control portion 132A (refer to FIG. 19). Then, the image combining processing transitions to ST104.

In step ST104, the optical characteristics acquisition portion 111C acquires the optical characteristics such as the F number and the focal length from the rear stage circuit 15. Then, the image combining processing transitions to step ST106.

In step ST106, the depth-of-field calculation portion 111D calculates the depth of field for the specific subject based on the subject distances calculated in step ST102 and the optical characteristics. Then, the image combining processing transitions to step ST108.

In step ST108, the depth-of-field determination portion 111E acquires the longest subject distance and the shortest subject distance from the plurality of subject distances calculated in step ST102. Then, the flow of image combining processing transitions to step ST110.

In step ST110, the depth-of-field determination portion 111E determines whether or not the longest subject distance and the shortest subject distance acquired in step ST108 fall within the distances within the depth of field calculated in step ST106. In step ST110, in a case where the longest subject distance and the shortest subject distance do not fall within the distances within the depth of field, a negative determination is made, and the image combining processing transitions to step ST113. In step ST110, in a case where the longest subject distance and the shortest subject distance fall within the distances within the depth of field, a positive determination is made, and the image combining processing transitions to step ST112.

In step ST113 illustrated in FIG. 24B, the focus position interval calculation portion 111F calculates the focus position interval corresponding to the longest subject distance and the shortest subject distance. Then, the image combining processing transitions to step ST114.

In step ST114, the number-of-combining-frames calculation portion 111G calculates the number of combining frames based on the focus position interval calculated in step ST113 and the depth of field calculated in step ST106. That is, the number-of-combining-frames calculation portion 111G decides the number of lens driving pulses based on the depth of field calculated in step ST106. The number-of-combining-frames calculation portion 111G calculates the number of combining frames based on the decided number of lens driving pulses and the focus position interval calculated in step ST113. Specifically, the number-of-combiningframes calculation portion 111G decides the value of the integer part obtained by dividing the focus position interval by the number of lens driving pulses as the number of combining frames. In a case where the processing of step ST114 is finished, the image combining processing transitions to step ST116.

In step ST116, the non-phase difference image data acquisition portion acquires the non-phase difference image data 71B of the number of combining frames from the memory 112. Then, the image combining processing transitions to step ST118.

In step ST118, the combined image data generation portion 111J generates the combined image data by combining the non-phase difference image data 71B of the number of combining frames acquired in step ST116. Then, the image combining processing transitions to step ST120.

In step ST119, the combined image data generation portion 111J determines whether or not an output timing has been reached. In step ST119, in a case where the output timing has not been reached, a negative determination is made, and the control circuit 110C performs the determination of step ST119 again. In step ST119, in a case where the output timing has been reached, the image combining processing transitions to step ST120.

In step ST120, the combined image data generation portion 111J outputs the combined image data to the rear stage circuit 15 through the communication I/F 110D. Then, the image combining processing transitions to step ST112.

In step ST112, the combined image data generation portion 111J determines whether or not a condition (hereinafter, referred to as an "image combining processing finish condition") under which the image combining processing is finished is satisfied. A condition that an instruction to finish the image combining processing is received by the reception device 84 is exemplified as an example of the image combining processing finish condition. In step ST112, in a case where the image combining processing finish condition is not satisfied, a negative determination is made, and the image combining processing transitions to step ST100. In step ST112, in a case where the image combining processing finish condition is satisfied, a positive determination is made, and the image combining processing is finished.

Figure 25:
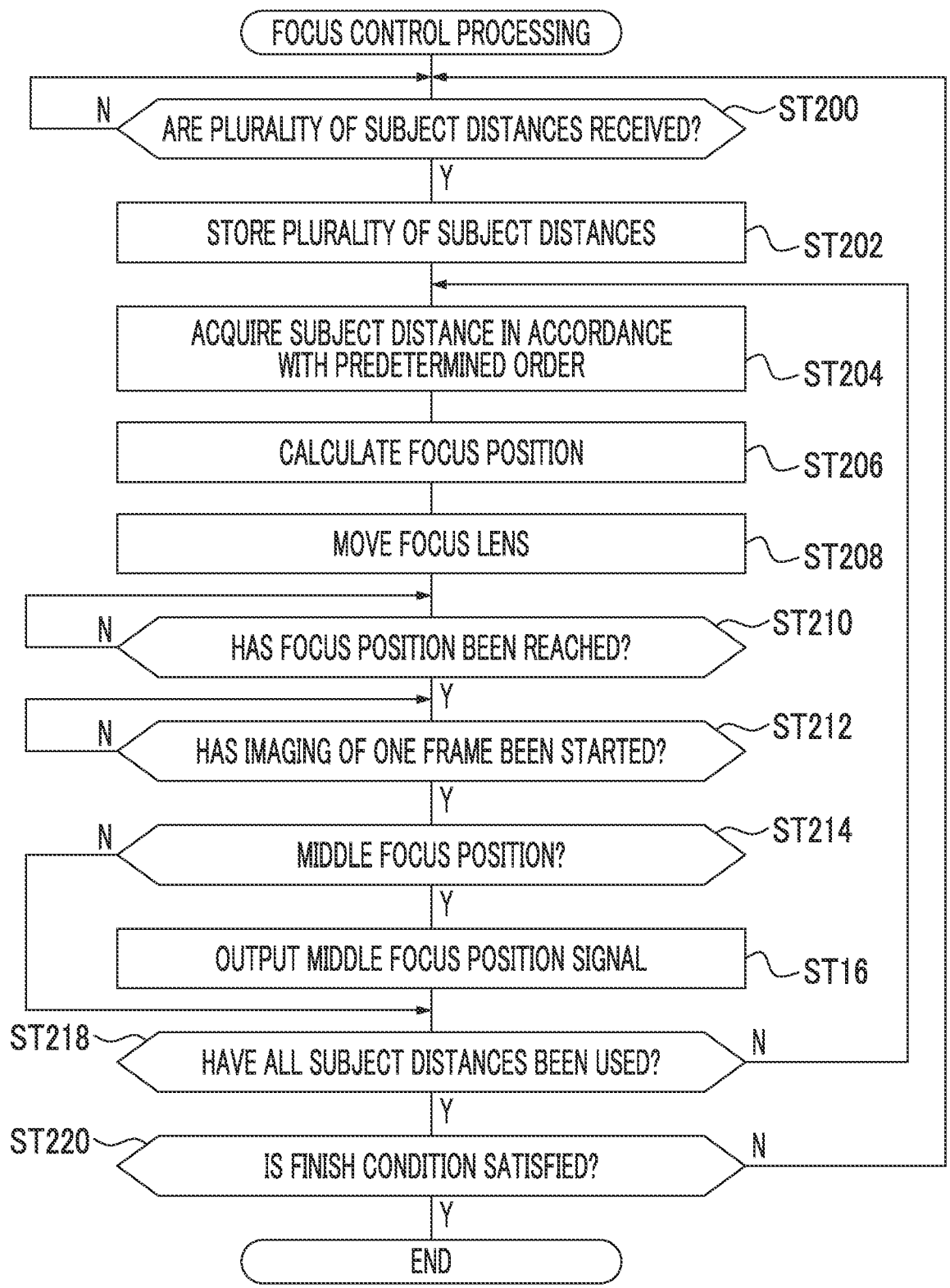
FIG. 25 is a flowchart illustrating an example of a flow of focus control processing according to the first embodiment.

FIG. 25 illustrates an example of a flow of focus control processing executed by the focus control portion 132A. In the focus control processing illustrated in FIG. 25, first, in step ST200, the subject distance acquisition portion 140 determines whether or not the plurality of subject distances are received from the subject distance calculation portion 111B. In step ST200, in a case where the plurality of subject distances are not received, a negative determination is made, and the subject distance acquisition portion 140 performs the determination of step ST200 again. In step ST200, in a case where the plurality of subject distances are received, a positive determination is made, and the focus control processing transitions to step ST202.

In step ST202, the subject distance acquisition portion 140 stores the plurality of subject distances received in step ST200 in the memory 15C. Then, the focus control processing transitions to step ST204.

In step ST204, the focus position calculation portion 142 acquires the subject distance from the memory 15C in the predetermined order. Then, the focus control processing transitions to step ST206.

In step ST206, the focus position calculation portion 142 calculates the focus position using the subject distance acquired in step ST204. Then, the focus control processing transitions to step ST208.

In step ST208, the motor control portion 144 moves the focus lens 40B to the focus position calculated in step ST206 through the sliding mechanism 48 by controlling the motor 50. Then, the focus control processing transitions to step ST210.

In step ST210, the focus control portion 132A determines whether or not the focus lens 40B has reached the focus position calculated in step ST206. In a case where the focus lens 40B has not reached the focus position, a negative determination is made, and the rear stage circuit 15 executes step ST210 again. In a case where the focus lens 40B has reached the focus position, a positive determination is made, and the flow of focus control processing transitions to step ST212.

In step ST212, the focus control portion 132A determines whether or not imaging of one frame has been started by the imaging element 38. In step ST212, in a case where imaging of one frame has not been started, a negative determination is made, and the determination of step ST212 is performed again in the focus control processing. In step ST212, in a case where imaging of one frame has been started, a positive determination is made, and the focus control processing transitions to step ST214.

In step ST214, the middle focus position determination portion 146 determines whether or not the current focus position is the middle focus position. In step ST214, in a case where the current focus position is not the middle focus position, a negative determination is made, and the focus control processing transitions to step ST218. In step ST214, in a case where the current focus position is the middle focus position, a positive determination is made, and the focus control processing transitions to step ST216.

In step ST216, the middle focus position signal output portion 150 outputs the middle focus position signal to the control circuit 110C. Then, the focus control processing transitions to step ST218.

In step ST218, the recalculation necessity determination portion 148 determines whether or not all subject distances stored in the memory 15C have been used for calculating the focus position in step ST206. In a case where not all subject distances stored in the memory 15C have been used for calculating the focus position in step ST206, a negative determination is made, and the focus control processing transitions to step ST204. In a case where all subject distances stored in the memory 15C have been used for calculating the focus position in step ST206, a positive determination is made, and the focus control processing transitions to step ST220.

In step ST220, the focus control portion 132A determines whether or not a condition (hereinafter, referred to as a "focus control processing finish condition") under which the focus control processing is finished is satisfied. A condition that an instruction to finish the focus control processing is received by the reception device 84 is exemplified as an example of the focus control processing finish condition. In step ST220, in a case where the focus control processing finish condition is not satisfied, a negative determination is made, and the focus control processing transitions to step ST200. In step ST220, in a case where the focus control processing finish condition is satisfied, a positive determination is made, and the focus control processing is finished.

Figure 26:
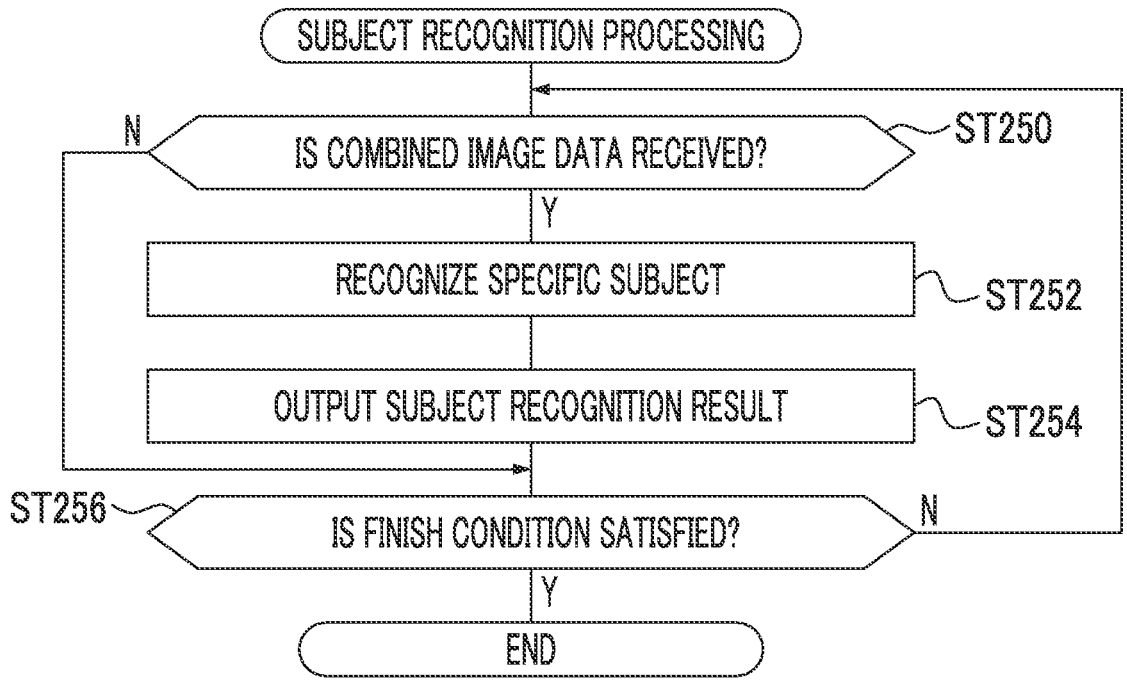
FIG. 26 is a flowchart illustrating an example of a flow of subject recognition processing according to the first embodiment.

FIG. 26 illustrates an example of a flow of subject recognition processing executed by the subject recognition portion 132B. In the subject recognition processing illustrated in FIG. 26, first, in step ST250, the subject recognition portion 132B determines whether or not the combined image data is received from the combined image data generation portion 111J. In step ST250, in a case where the combined image data is not received from the combined image data generation portion 111J, a negative determination is made, and the subject recognition processing transitions to step ST256. In step ST250, in a case where the combined image data is received from the combined image data generation portion 111J, a positive determination is made, and the subject recognition processing transitions to step ST252.

In step ST252, the subject recognition portion 132B recognizes the specific subject by performing the image recognition on the combined image data received in step ST250 using the learned model 15B1. Then, the subject recognition processing transitions to step ST254.

In step ST254, the subject recognition portion 132B outputs a subject recognition result in step ST252 to the display and the like. Then, the subject recognition processing transitions to step ST256.

In step ST256, the subject recognition portion 132B determines whether or not a condition (hereinafter, referred to as a "subject recognition processing finish condition") under which the subject recognition processing is finished is satisfied. A condition that an instruction to finish the subject recognition processing is received by the reception device 84 is exemplified as an example of the subject recognition processing finish condition. In step ST256, in a case where the subject recognition processing finish condition is not satisfied, a negative determination is made, and the subject recognition processing transitions to step ST250. In step ST256, in a case where the subject recognition processing finish condition is satisfied, a positive determination is made, and the subject recognition processing is finished.

Figure 27:
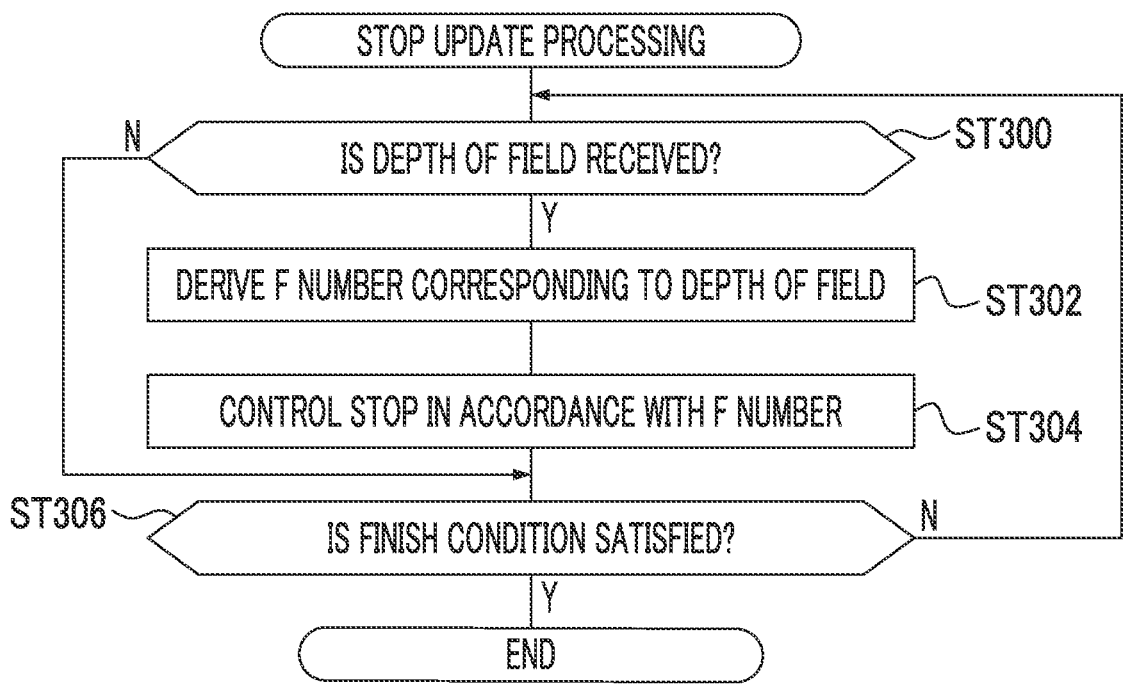
FIG. 27 is a flowchart illustrating an example of a flow of stop update processing according to the first embodiment.

FIG. 27 illustrates an example of a flow of stop update processing executed by the F number update portion 132C. In the stop update processing illustrated in FIG. 27, first, in step ST300, the F number update portion 132C determines whether or not the depth of field is received from the depth-of-field calculation portion 111D. In step ST300, in a case where the depth of field is not received from the depth-of-field calculation portion 111D, a negative determination is made, and the stop update processing transitions to step ST306. In step ST300, in a case where the depth of field is received from the depth-of-field calculation portion 111D, a positive determination is made, and the stop update processing transitions to step ST302.

In step ST302, the F number update portion 132C derives the F number corresponding to the depth of field received in step ST300. Then, the stop update processing transitions to step ST304.

In step ST304, the F number update portion 132C controls the stop 40C in accordance with the F number derived in step ST302. Then, the stop update processing transitions to step ST306.

In step ST306, the F number update portion 132C determines whether or not a condition (hereinafter, referred to as a "stop update processing finish condition") under which the stop update processing is finished is satisfied. A condition that an instruction to finish the stop update processing is received by the reception device 84 is exemplified as an example of the stop update processing finish condition. In step ST306, in a case where the stop update processing finish condition is not satisfied, a negative determination is made, and the stop update processing transitions to step ST300. In step ST256, in a case where the stop update processing finish condition is satisfied, a positive determination is made, and the stop update processing is finished.

Figure 28:
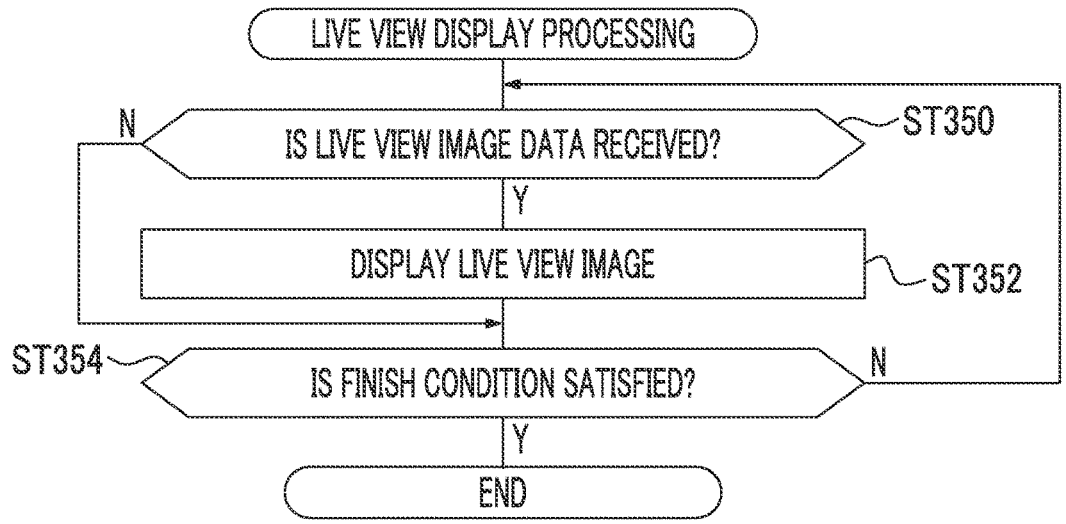
FIG. 28 is a flowchart illustrating an example of a flow of live view display processing according to the first embodiment.

FIG. 28 illustrates an example of a flow of live view display processing executed by the live view display processing portion 132D. In the live view display processing illustrated in FIG. 28, first, in step ST350, the live view display processing portion 132D determines whether or not the live view image data is received from the control circuit 110C. In step ST350, in a case where the live view image data is not received from the control circuit 110C, a negative determination is made, and the live view display processing transitions to step ST354. In a case where the live view image data is received from the control circuit 110C, a positive determination is made, and the live view display processing transitions to step ST352.

In step ST352, the live view display processing portion 132D displays an image indicated by the live view image data received in step ST350 on the display as the live view image. Then, the live view display processing transitions to step ST354.

In step ST354, the live view display processing portion 132D determines whether or not a condition (hereinafter, referred to as a "live view display processing finish condition") under which the live view display processing is finished is satisfied. A condition that an instruction to finish the live view display processing is received by the reception device 84 is exemplified as an example of the live view display processing finish condition. In step ST354, in a case where the live view display processing finish condition is not satisfied, a negative determination is made, and the live view display processing transitions to step ST350. In step ST354, in a case where the live view display processing finish condition is satisfied, a positive determination is made, and the live view display processing is finished.

As described above, in the imaging apparatus 10 according to the first embodiment, the control circuit 110C included in the imaging element 38 generates the combined image data. The combined image data is generated based on the non-phase difference image data 71B of the number of combining frames decided in accordance with the depth of field with respect to the imaging region 200 out of the non-phase difference image data 71B of the plurality of frames stored in the memory 112 by imaging the imaging region 200 at different focus positions. Thus, according to the present configuration, an image having a deep depth of field can be quickly obtained, compared to a case of performing imaging by increasing the depth of field using only the stop.

In addition, in the imaging apparatus 10 according to the first embodiment, positions at which the imaging region 200 is focused are different from each other in each non-phase difference image data 71B used for generating the combined image data. In the example illustrated in FIG. 17, the first non-phase difference image data is image data in which the first imaging region 200A is focused. The second non-phase difference image data is image data in which the second imaging region 200B is focused. The third non-phase difference image data is image data in which the third imaging region 200C is focused. Thus, according to the present configuration, an image having a deep depth of field can be obtained, compared to a case where positions at which the imaging region 200 is focused are the same in each non-phase difference image data 71B used for generating the combined image data.

In addition, in the imaging apparatus 10 according to the first embodiment, the depth of field is derived in accordance with the subject distance related to the specific subject and the optical characteristics (refer to FIG. 12). Thus, according to the present configuration, a depth of field having high reliability can be derived, compared to a case of deriving the depth of field without considering the subject distance related to the specific subject and the optical characteristics.

In addition, in the imaging apparatus 10 according to the first embodiment, the focal length, the F number, and the permissible circle of confusion are employed as the optical characteristics. Thus, according to the present configuration, a depth of field having high reliability can be derived, compared to a case of deriving the depth of field without considering the focal length, the F number, and the permissible circle of confusion. Only the focal length and the F number may be employed as the optical characteristics. In this case, a depth of field having high reliability can be derived, compared to a case of deriving the depth of field without considering the focal length and the F number.

In addition, in the imaging apparatus 10 according to the first embodiment, distance measurement with respect to the imaging region 200 is performed, and the subject distance is derived in accordance with a distance measurement result. Thus, according to the present configuration, a subject distance having high reliability can be derived, compared to a case of deriving the subject distance without performing the distance measurement with respect to the imaging region 200.

In addition, in the imaging apparatus 10 according to the first embodiment, the distance measurement is performed based on the phase difference image data 71A obtained from the phase difference pixel divided region 50N2 (refer to FIG. 6), and the subject distance is derived in accordance with the distance measurement result. Thus, according to the present configuration, the subject distance can be quickly derived, compared to a case of deriving the subject distance based on a result of contrast AF.

In addition, in the imaging apparatus 10 according to the first embodiment, the F number is updated in accordance with the depth of field derived based on the distance measurement result. Thus, according to the present configuration, an effort for updating the F number can be reduced.

In addition, in the imaging apparatus 10 according to the first embodiment, the non-phase difference image data 71B obtained by imaging the imaging region 200 in a state where the focus lens 40B has reached the middle focus position is output as the live view image data. The image indicated by the live view image data is displayed on the display 26 as the live view image. Thus, according to the present configuration, the user can visually recognize a change in state of the imaging region.

In addition, in the imaging apparatus 10 according to the first embodiment, the specific subject is recognized based on the combined image data in the rear stage circuit 15. Thus, according to the present configuration, the specific subject can be accurately recognized, compared to a case where the specific subject is recognized based on the digital image data 70B of one frame. In the first embodiment, while the type of the specific subject is specified by performing the image recognition processing by the rear stage circuit 15, the technology of the present disclosure is not limited thereto. Whether or not the specific subject is present may be detected.

In addition, in the imaging apparatus 10 according to the first embodiment, the ratio of the imaging frame rate and the output frame rate is an integer. According to the present configuration, processing of matching an imaging frame rate and an output timing can be easily performed, compared to a case where the ratio of the imaging frame rate and the output frame rate is not an integer.

In addition, in the imaging apparatus 10 according to the first embodiment, the imaging element in which the photoelectric conversion element 42, the processing circuit 110, and the memory 112 are formed in one chip is employed as the imaging element 38. Accordingly, portability of the imaging element 38 is increased, compared to an imaging element in which the photoelectric conversion element 42, the processing circuit 110, and the memory 112 are not formed in one chip. In addition, a degree of design freedom can be increased, compared to a case of the imaging element in which the photoelectric conversion element 42, the processing circuit 110, and the memory 112 are not formed in one chip. Furthermore, it is possible to contribute to size reduction of the imaging apparatus 10, compared to a case of the imaging element in which the photoelectric conversion element 42, the processing circuit 110, and the memory 112 are not formed in one chip.

In addition, in the imaging apparatus 10 according to the first embodiment, as illustrated in FIG. 5 as an example, the laminated imaging element in which the photoelectric conversion element 42 is laminated with the memory 112 is employed as the imaging element 38. Accordingly, since a wire that connects the photoelectric conversion element 42 to the memory 112 can be shortened, a wire delay can be reduced. Consequently, a transfer speed of the image data from the photoelectric conversion element 42 to the memory 112 can be increased, compared to a case where the photoelectric conversion element 42 and the memory 112 are not laminated. Improving the transfer speed contributes to high-speed processing in the entire processing circuit 110. In addition, the degree of design freedom can be increased, compared to a case of not laminating the photoelectric conversion element 42 and the memory 112. Furthermore, it is possible to contribute to size reduction of the imaging apparatus 10, compared to a case of not laminating the photoelectric conversion element 42 and the memory 112.

In the first embodiment, while an example of a form of generating the combined image data related to the imaging region 200 is illustratively described, the technology of the present disclosure is not limited thereto. For example, the combined image data may be related to the first imaging region 200A and the second imaging region 200B, or the combined image data may be related to the second imaging region 200B and the third imaging region 200C. The control circuit 110C may generate the combined image data related to a partial region of the image obtained by imaging the first imaging region 200A. Accordingly, a processing load on the generation of the combined image data can be reduced, compared to a case where the combined image data is generated with respect to the entire region of the image obtained by imaging the first imaging region 200A.

In addition, in the first embodiment, while the first imaging region 200A is employed as the specific subject, the technology of the present disclosure is not limited thereto, and the specific subject may be changed. In this case, for example, processing of step ST126 to step ST136 illustrated in FIG. 29 is executed instead of the processing of step ST113 to step ST120 included in the image combining processing.

Figure 29:
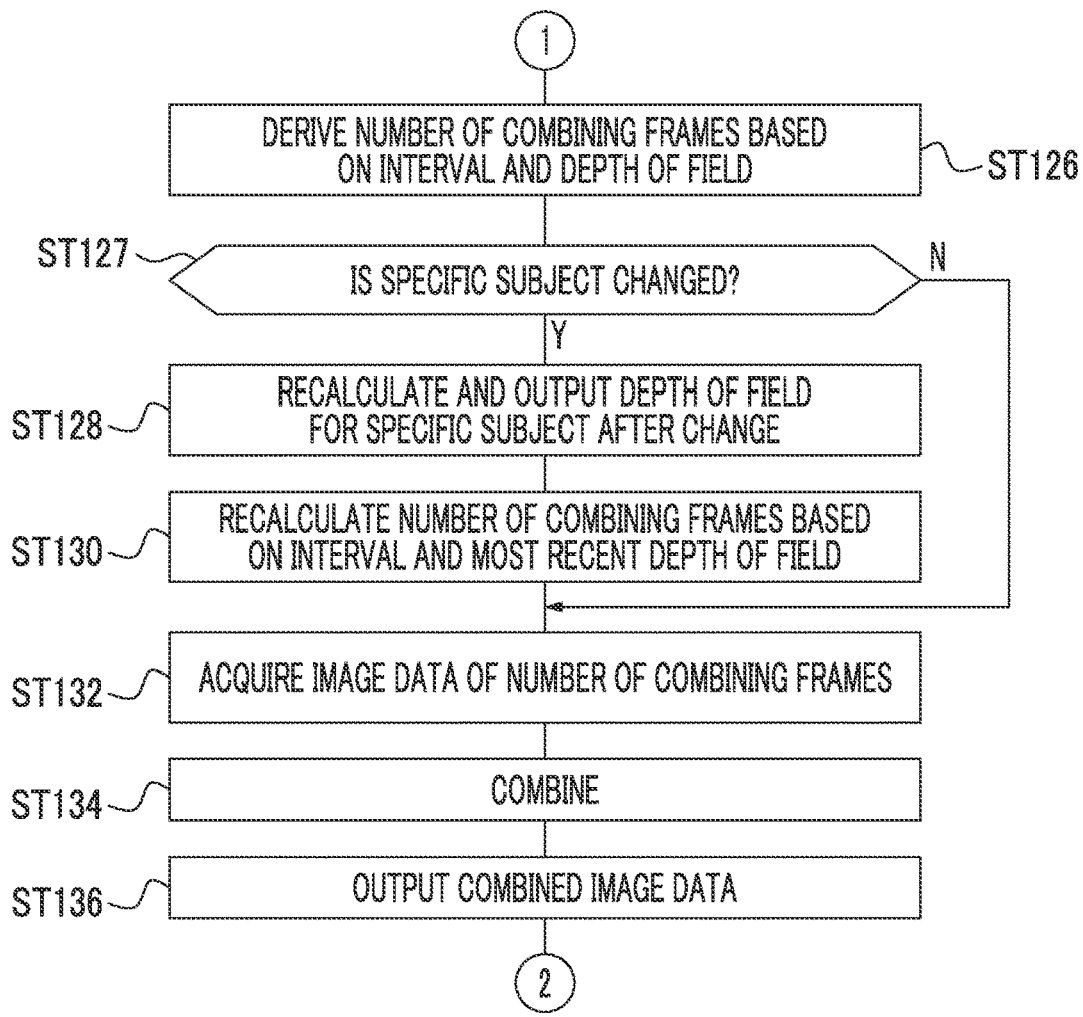
FIG. 29 is a flowchart illustrating a modification example of the flow of image combining processing according to the first embodiment.

In step ST126 illustrated in FIG. 29, the number-of-combining-frames calculation portion 111G calculates the number of combining frames based on the focus position interval and the depth of field as in the processing of step ST114 illustrated in FIG. 24B. Then, the flow of image combining processing transitions to step ST127.

In step ST127, the control circuit 110C determines whether or not the specific subject is changed. For example, the specific subject is changed by the control circuit 110C in accordance with the instruction received by the reception device 84. In step ST127, in a case where the specific subject is not changed, a negative determination is made, and the image combining processing transitions to step ST132. In step ST127, in a case where the specific subject is changed, a positive determination is made, and the image combining processing transitions to step ST128.

In step ST128, the depth-of-field calculation portion 111D recalculates the depth of field from the subject distance related to the specific subject after change and the optical characteristics and outputs the recalculated depth of field to the rear stage circuit 15. Then, the image combining processing transitions to step ST130.

In step ST130, the number-of-combining-frames calculation portion 111G recalculates the number of combining frames based on the most recent focus position interval (here, as an example, the focus position interval used in step ST126) and the most recent depth of field (here, as an example, the depth of field used in step ST128). Then, the image combining processing transitions to step ST132.

In step ST132, the non-phase difference image data acquisition portion acquires the non-phase difference image data 71B of the number of combining frames recalculated in step ST130 from the memory 112. Then, the image combining processing transitions to step ST130.

In step ST134, the combined image data generation portion 111J generates the combined image data by combining the non-phase difference image data 71B of the number of combining frames acquired in step ST132. Then, the image combining processing transitions to step ST132.

In step ST132, the combined image data generation portion 111J outputs the combined image data generated in step ST134 to the rear stage circuit 15 through the communication I/F 110D. Then, the image combining processing transitions to step ST112.

Since the specific subject is changed, and the combined image data is generated from the non-phase difference image data 71B of the number of combining frames decided based on the depth of field for the specific subject after change, the same effect as the first embodiment can be obtained even in a case where specific subject is changed.

Second Embodiment

In the first embodiment, an example of a form of generating the combined image data based on the non-phase difference image data 71B of the number of combining frames decided by the number-of-combining-frames calculation portion 111G is illustratively described. In a second embodiment, an example of a form of generating the combined image data based on the non-phase difference image data 71B of the number of combining frames corresponding to a depth of field with which the specific subject can be detected will be described. In the second embodiment, the constituents described in the first embodiment will be designated by the same reference signs and will not be described.

As illustrated in FIG. 1 to FIG. 3 as an example, an imaging apparatus 201 according to the second embodiment is different from the first embodiment in that an imaging apparatus main body 12A is included instead of the imaging apparatus main body 12. As illustrated in FIG. 1 and FIG. 3 as an example, the imaging apparatus main body 12A is different from the imaging apparatus main body 12 in that an imaging element 38A is included instead of the imaging element 38. As illustrated in FIG. 5 and FIG. 9 as an example, the imaging element 38A is different from the imaging element 38 in that a processing circuit 210 is included instead of the processing circuit 110. The processing circuit 210 is different from the processing circuit 110 in that a control circuit 210C is included instead of the control circuit 110C.

Figure 30:
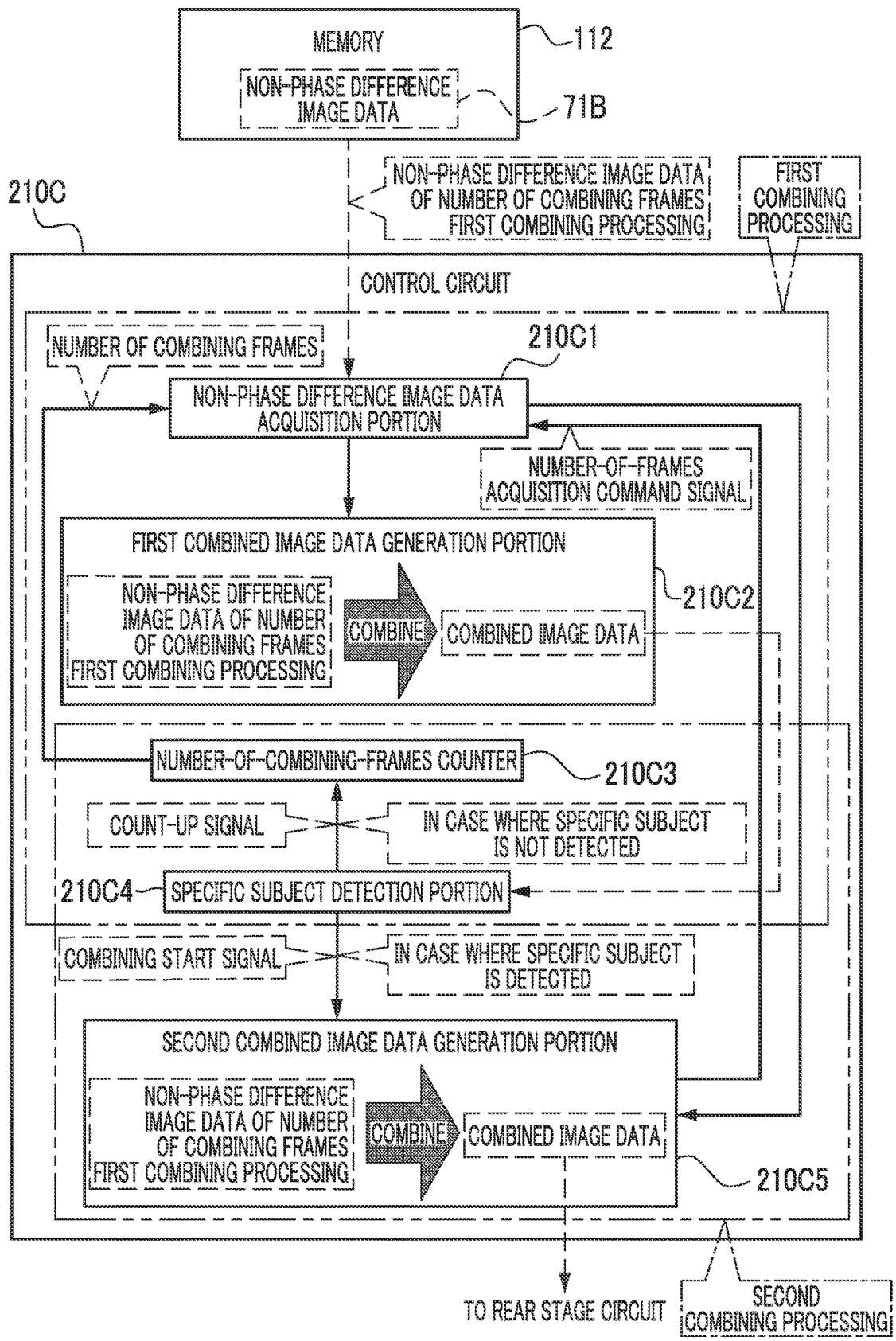
FIG. 30 is a block diagram illustrating an example of functions of a control circuit according to a second embodiment.

As illustrated in FIG. 30 as an example, the control circuit 210C is different from the control circuit 110C in that combining processing is performed. The combining processing is processing including first combining processing and second combining processing. The first combining processing is processing of setting the number of combining frames and generating the combined image data in accordance with the set number of combining frames. The control circuit 210C performs the first combining processing until the specific subject is detected based on the combined image data generated by the first combining processing. The second combining processing is processing of generating the combined image data in accordance with the number of combining frames related to the combined image data used for detecting the specific subject in a case where the specific subject is detected. Here, the number of combining frames is an example of a "combining condition" according to the embodiments of the technology of the present disclosure.

The control circuit 210C includes a non-phase difference image data acquisition portion 210C1, a first combined image data generation portion 210C2, a number-of-combining-frames counter 210C3, a specific subject detection portion 210C4, and a second combined image data generation portion 21005.

The combining processing is implemented by the non-phase difference image data acquisition portion 210C1, the first combined image data generation portion 210C2, the number-of-combining-frames counter 210C3, the specific subject detection portion 210C4, and the second combined image data generation portion 21005. The first combining processing is implemented by the non-phase difference image data acquisition portion 210C1, the first combined image data generation portion 210C2, the number-of-combining-frames counter 210C3, and the specific subject detection portion 210C4. The second combining processing is implemented by the non-phase difference image data acquisition portion 210C1, the number-of-combining-frames counter 210C3, the specific subject detection portion 210C4, and the second combined image data generation portion 21005.

The number-of-combining-frames counter 210C3 is a counter that counts the number of combining frames. In the number-of-combining-frames counter 210C3, "2" is set as an initial value of the number of combining frames. In a case where a count-up signal for providing an instruction to count up is input, the number-of-combining-frames counter 210C3 adds 1 to a count value indicating the number of combining frames.

The non-phase difference image data acquisition portion 210C1 acquires the non-phase difference image data 71B of the number of combining frames indicated by the most recent count value of the number-of-combining-frames counter 210C3 from the memory 112.

In the second embodiment, for example, the non-phase difference image data 71B of the number of combining frames is acquired by the non-phase difference image data acquisition portion 210C1 in the predetermined order (refer to FIG. 19) out of the non-phase difference image data 71B of the plurality of frames (in the example illustrated in FIG. 10, five frames) obtained by imaging in the combining imaging section (refer to FIG. 10). An acquisition order of the non-phase difference image data 71B is not limited thereto. For example, the non-phase difference image data 71B of the number of combining frames may be acquired by the non-phase difference image data acquisition portion 210C1 in an order opposite to the predetermined order. Alternately, a frame obtained by imaging at the middle focus position may be acquired, and then, a frame obtained by imaging at the focus position on the INF-side focus position side and a frame obtained by imaging at the MOD-side focus position may be alternately acquired.

In this case, for example, after the frame obtained by imaging at the middle focus position is acquired, a frame obtained by imaging at a focus position closest to the middle focus position to a frame obtained by imaging at a focus position furthest from the middle focus position may be acquired. Specifically, in a case where a frame obtained by imaging at the INF-side focus position to a frame obtained by imaging at the MOD-side focus position in performing imaging of five frames in the combining imaging section are referred to as first to fifth frames, the non-phase difference image data 71B is acquired by the non-phase difference image data acquisition portion 210C1 in an order of the third frame, the second frame, the fourth frame, the first frame, and the fifth frame.

In addition, the acquisition order of the non-phase difference image data 71B of the number of combining frames is not limited thereto. For example, after the frame obtained by imaging at the middle focus position is acquired, frames obtained by imaging in an order from a focus position furthest from the middle focus position to a focus position closest to the middle focus position may be acquired. In this case, for example, the non-phase difference image data 71B is acquired by the non-phase difference image data acquisition portion 210C1 in an order of the third frame, the first frame, the fifth frame, the second frame, and the fourth frame in which the non-phase difference image data 71B is acquired by the non-phase difference image data acquisition portion 210C1 in the first to fifth frames.

The first combined image data generation portion 210C2 generates the combined image data based on the non-phase difference image data 71B of the number of combining frames acquired by the non-phase difference image data acquisition portion 210C1.

The specific subject detection portion 210C4 executes specific subject detection processing. The specific subject detection processing is processing of detecting the specific subject based on the combined image data generated by the first combined image data generation portion 210C2. In the second embodiment, a face of an unspecified person is employed as the specific subject. The face of the unspecified person is merely an example. For example, eyes of the unspecified person, a car type of at least one predetermined automobile, at least one predetermined animal, at least one predetermined insect, and/or at least one predetermined specific person may be used as the specific subject.

In a case where the specific subject is not detected by the specific subject detection processing, the specific subject detection portion 210C4 outputs the count-up signal to the number-of-combining-frames counter 210C3. Accordingly, 1 is added to the count value of the number-of-combining-frames counter 210C3. In a case where the specific subject is detected by the specific subject detection processing, the specific subject detection portion 210C4 outputs a combining start signal for providing an instruction to start generating the combined image data to the second combined image data generation portion 210␣5.

In a case where the combining start signal is input, the second combined image data generation portion 210␣5 outputs a number-of-frames acquisition command signal for providing an instruction to acquire the most recent count value to the non-phase difference image data acquisition portion 210C1. In a case where the number-of-frames acquisition command signal is input, the non-phase difference image data acquisition portion 210C1 acquires the non-phase difference image data 71B of the number of combining frames indicated by the most recent count value of the number-of-combining-frames counter 210C3 from the memory 112.

The second combined image data generation portion 210␣5 generates the combined image data based on the non-phase difference image data 71B of the number of combining frames acquired by the non-phase difference image data acquisition portion 210C1 in accordance with the number-of-frames acquisition command signal, and outputs the generated combined image data to the rear stage circuit 15.

Next, an action of the imaging apparatus 201 according to the second embodiment will be described with reference to FIG. 31 to FIG. 33. In the description using FIG. 31 to FIG. 33, it is assumed that the non-phase difference image data 71B of the plurality of frames (in the example illustrated in FIG. 10, five frames) obtained by imaging in at least one combining imaging section (refer to FIG. 10) is stored in the memory 112.

Figure 31:
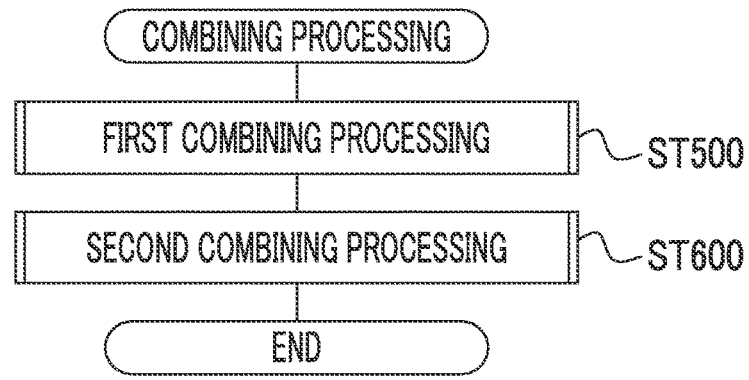
FIG. 31 is a flowchart illustrating an example of a flow of combining processing executed by the control circuit according to the second embodiment.

The combining processing illustrated in FIG. 31 as an example is performed by the control circuit 210C in a case where the non-phase difference image data 71B of the plurality of frames (in the example illustrated in FIG. 10, five frames) is read out from the memory 112 in the combining imaging section (refer to FIG. 10).

Figure 32:
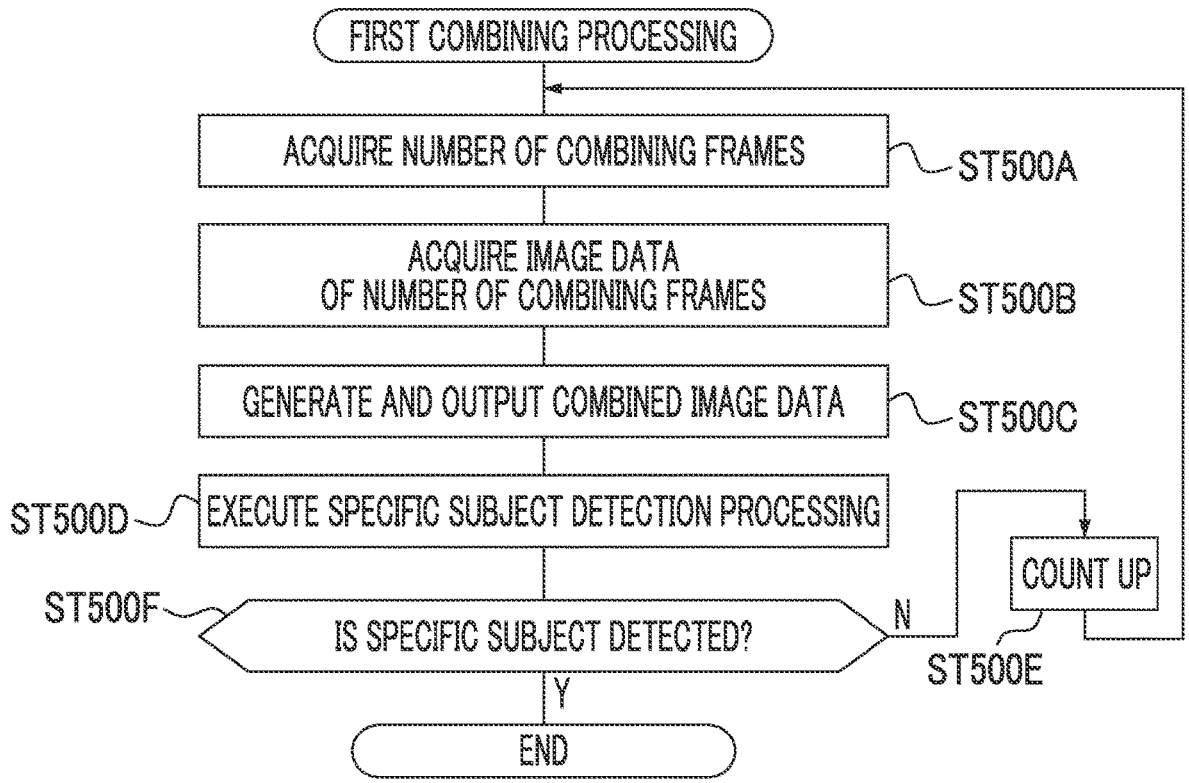
FIG. 32 is a flowchart illustrating an example of a flow of first combining processing included in the combining processing illustrated in FIG. 31.

In the combining processing illustrated in FIG. 31, first, in step ST500, the control circuit 210C executes the first combining processing (refer to FIG. 32). Then, the combining processing transitions to step ST600.

As illustrated in FIG. 32 as an example, in the first combining processing, first, in step ST500A, the non-phase difference image data acquisition portion 210C1 acquires the number of combining frames indicated by the most recent count value of the number-of-combining-frames counter 210C3. Then, the first combining processing transitions to step ST500B.

In step ST500B, the non-phase difference image data acquisition portion 210C1 acquires the non-phase difference image data 71B of the number of combining frames acquired in step ST500A from the memory 112. Then, the first combining processing transitions to step ST500C.

In step ST500C, the first combined image data generation portion 210C2 generates the combined image data based on the non-phase difference image data 71B of the number of combining frames acquired in step ST500B and outputs the generated combined image data to the rear stage circuit 15. Then, the first combining processing transitions to step ST500D.

In step ST500D, the specific subject detection portion 210C4 executes the specific subject detection processing. Then, the first combining processing transitions to step ST500F.

In step ST500F, the specific subject detection portion 210C4 determines whether or not the specific subject is detected by the specific subject detection processing. In step ST500F, in a case where the specific subject is not detected by the specific subject detection processing, a negative determination is made, and the first combining processing transitions to step ST500E.

In step ST500E, the number-of-combining-frames counter 210C3 counts up the count value by 1. Then, the first combining processing transitions to step ST500A.

Meanwhile, in step ST500F, in a case where the specific subject is detected by the specific subject detection processing, a positive determination is made, and the first combining processing is finished.

Figure 33:
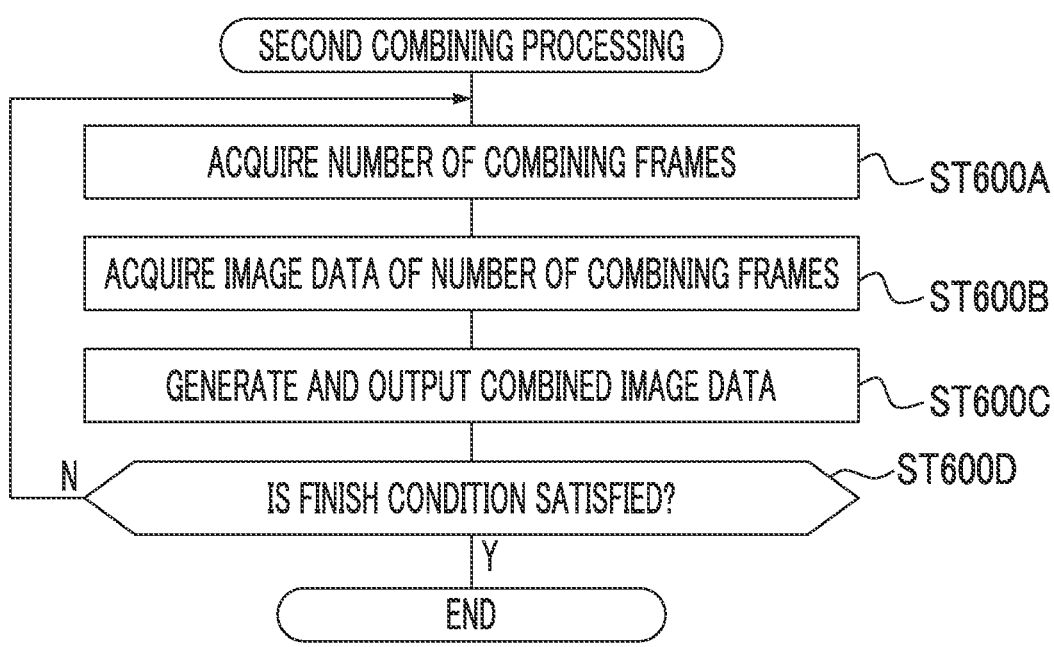
FIG. 33 is a flowchart illustrating an example of a flow of second combining processing included in the combining processing illustrated in FIG. 31.

In the combining processing illustrated in FIG. 31, in step ST600, the control circuit 210C executes the second combining processing (refer to FIG. 33). Then, the combining processing is finished.

As illustrated in FIG. 33 as an example, in the second combining processing, first, in step ST600A, the non-phase difference image data acquisition portion 210C1 acquires the number of combining frames indicated by the most recent count value of the number-of-combining-frames counter 210C3. Then, the second combining processing transitions to step ST600B.

In step ST600B, the non-phase difference image data acquisition portion 210C1 acquires the non-phase difference image data 71B of the number of combining frames acquired in step ST600A from the memory 112. Then, the second combining processing transitions to step ST600C.

In step ST600C, the second combined image data generation portion 21005 generates the combined image data based on the non-phase difference image data 71B of the number of combining frames acquired in step ST600B and outputs the generated combined image data to the rear stage circuit 15. Then, the second combining processing transitions to step ST600D.

In step ST600D, the second combined image data generation portion 21005 determines whether or not a condition (hereinafter, referred to as a "combining processing finish condition") under which the combining processing is finished is satisfied. A condition that an instruction to finish the combining processing is received by the reception device 84 (refer to FIG. 3) is exemplified as an example of the combining processing finish condition. A condition that the combined image data of a predetermined number of frames (for example, 30 frames) is generated and output to the rear stage circuit 15 by executing step ST600C is exemplified as another example of the combining processing finish condition.

In step ST600D, in a case where the combining processing finish condition is not satisfied, a negative determination is made, and the second combining processing transitions to step ST600A. In step ST600D, in a case where the combining processing finish condition is satisfied, a positive determination is made, and the second combining processing is finished.

As described above, in the imaging apparatus 201 according to the second embodiment, by executing the first combining processing by the control circuit 210C, the number of combining frames is set, and the combined image data is generated in accordance with the set number of combining frames. The first combining processing is repeatedly executed until the specific subject is detected based on the combined image data. In a case where the specific subject is detected based on the combined image data, by executing the second combining processing by the control circuit 210C, the combined image data is generated in accordance with the number of combining frames used for generating the combined image data used for detecting the specific subject. Accordingly, the combined image data can be generated based on the non-phase difference image data 71B of the minimum number of combining frames with which the specific subject can be detected.

In the second embodiment, while an example of a form of setting the number of combining frames is illustrated, the technology of the present disclosure is not limited thereto. For example, a resolution of the non-phase difference image data 71B and/or the number of bits in units of pixels of the non-phase difference image data 71B may be set. That is, the control circuit 210C may change not only the number of combining frames but also the resolution (for example, the number of thinned-out pixels) of the non-phase difference image data 71B and generate the combined image data based on the changed number of combining frames and the non-phase difference image data 71B of the changed resolution. In addition, together with the resolution of the non-phase difference image data 71B used for generating the combined image data or instead of the resolution of the non-phase difference image data 71B used for generating the combined image data, the control circuit 210C may change the number of bits in units of pixels of the non-phase difference image data 71B used for generating the combined image data.

In addition, in each of the embodiments, reading of the analog image data 70A of each of the plurality of frames is sequentially performed by the reading circuit 110A within an output period defined by the output frame rate as a period in which one frame of the digital image data 70B is output (hereinafter, simply referred to as the "output period"). That is, after reading of the analog image data 70A of one frame is completed, reading of the analog image data 70A of the subsequent one frame is started by the reading circuit 110A. However, the technology of the present disclosure is not limited thereto. The reading of the analog image data 70A of the subsequent one frame may be started without waiting for the reading of the analog image data 70A of one frame.

Figure 34:
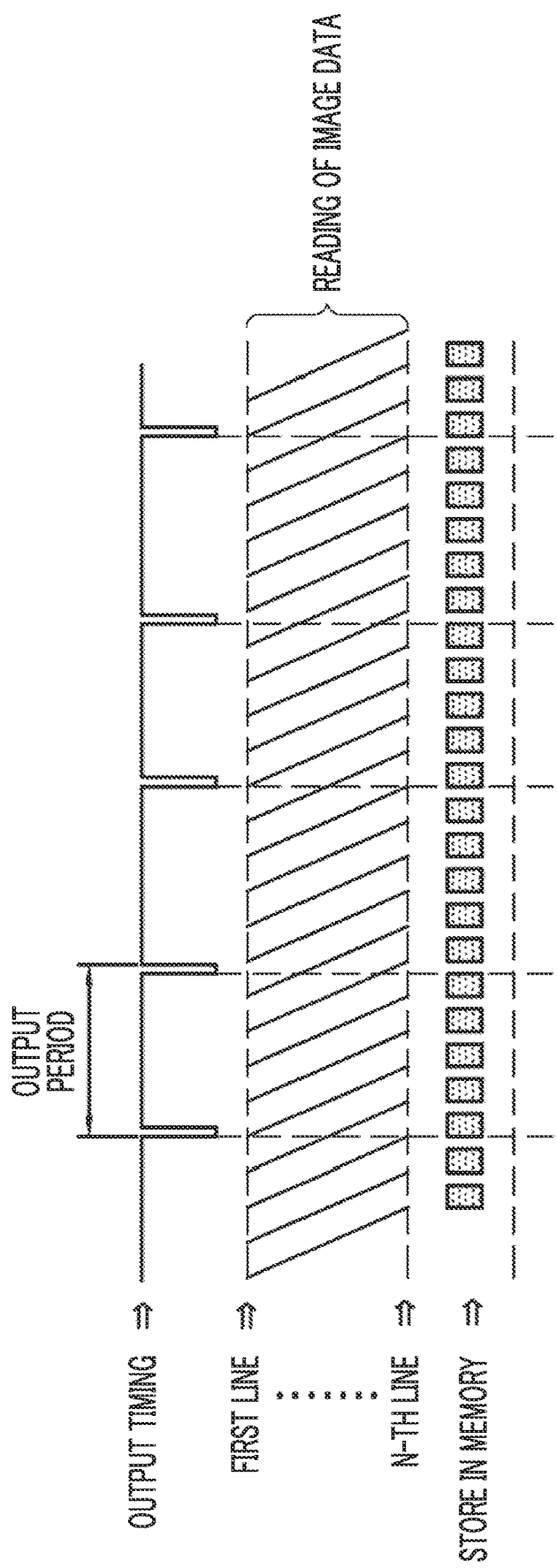
FIG. 34 is a time chart illustrating a modification example of a reading method of analog image data.

For example, as illustrated in FIG. 34, the analog image data 70A of the plurality of frames may be read out in parallel by the reading circuit 110A within the output period. In this case, the digital processing circuit 110B converts the analog image data 70A into the digital image data 70B, and each digital image data 70B corresponding to each analog image data 70A read out in parallel by the reading circuit 110A is stored in parallel in the memory 112 by the control circuit 110C. Accordingly, the number of frames with which the combined image data is generated per unit time period can be increased, compared to a case where the reading of the analog image data 70A of each of the plurality of frames is sequentially performed.

In addition, in each of the embodiments, while an example of a form of using the non-phase difference pixel divided region 50N1 and the phase difference pixel divided region 50N2 together is illustratively described, the technology of the present disclosure is not limited thereto. For example, an area sensor from which the phase difference image data 71A and the non-phase difference image data 71B are selectively generated and read out may be used instead of the non-phase difference pixel divided region 50N1 and the phase difference pixel divided region 50N2. In this case, a plurality of photosensitive pixels are arranged in two dimensions in the area sensor. For example, a pair of independent photodiodes not including a light shielding member are used in the photosensitive pixels included in the area sensor. In a case where the non-phase difference image data 71B is generated and read out, photoelectric conversion is performed by the entire region of the photosensitive pixels (the pair of photodiodes). In a case where the phase difference image data 71A is generated and read out (for example, in a case of performing the distance measurement using a passive method), the photoelectric conversion is performed by one photodiode of the pair of photodiodes. Here, the one photodiode of the pair of photodiodes is a photodiode corresponding to the first phase difference pixel L described in the first embodiment, and the other photodiode of the pair of photodiodes corresponding to the second phase difference pixel R described in the first embodiment. While the phase difference image data 71A and the non-phase difference image data 71B may be selectively generated and read out by all photosensitive pixels included in the area sensor, the technology of the present disclosure is not limited thereto. The phase difference image data 71A and the non-phase difference image data 71B may be selectively generated and read out by a part of the photosensitive pixels included in the area sensor.

In addition, in each of the embodiments, while an AF method using the distance measurement result based on the phase difference image data 71A, that is, a phase difference AF method, is illustrated, the technology of the present disclosure is not limited thereto. For example, a contrast AF method may be employed instead of the phase difference AF method. In addition, an AF method based on a distance measurement result using parallax between a pair of images obtained from a stereo camera, or an AF method using a distance measurement result of a TOF method based on laser light or the like may be employed.

In addition, in each of the embodiment, while an imaging method based on a rolling shutter method is illustrated, the technology of the present disclosure is not limited thereto. An imaging method based on a global shutter method may be used.

In addition, while an example of a form of implementing the processing circuit 110 by the device including the ASIC and the FPGA is illustratively described in each of the embodiments, the technology of the present disclosure is not limited thereto. For example, at least one device included in the processing circuit 110 may be implemented by a software configuration using a computer.

Figure 35:
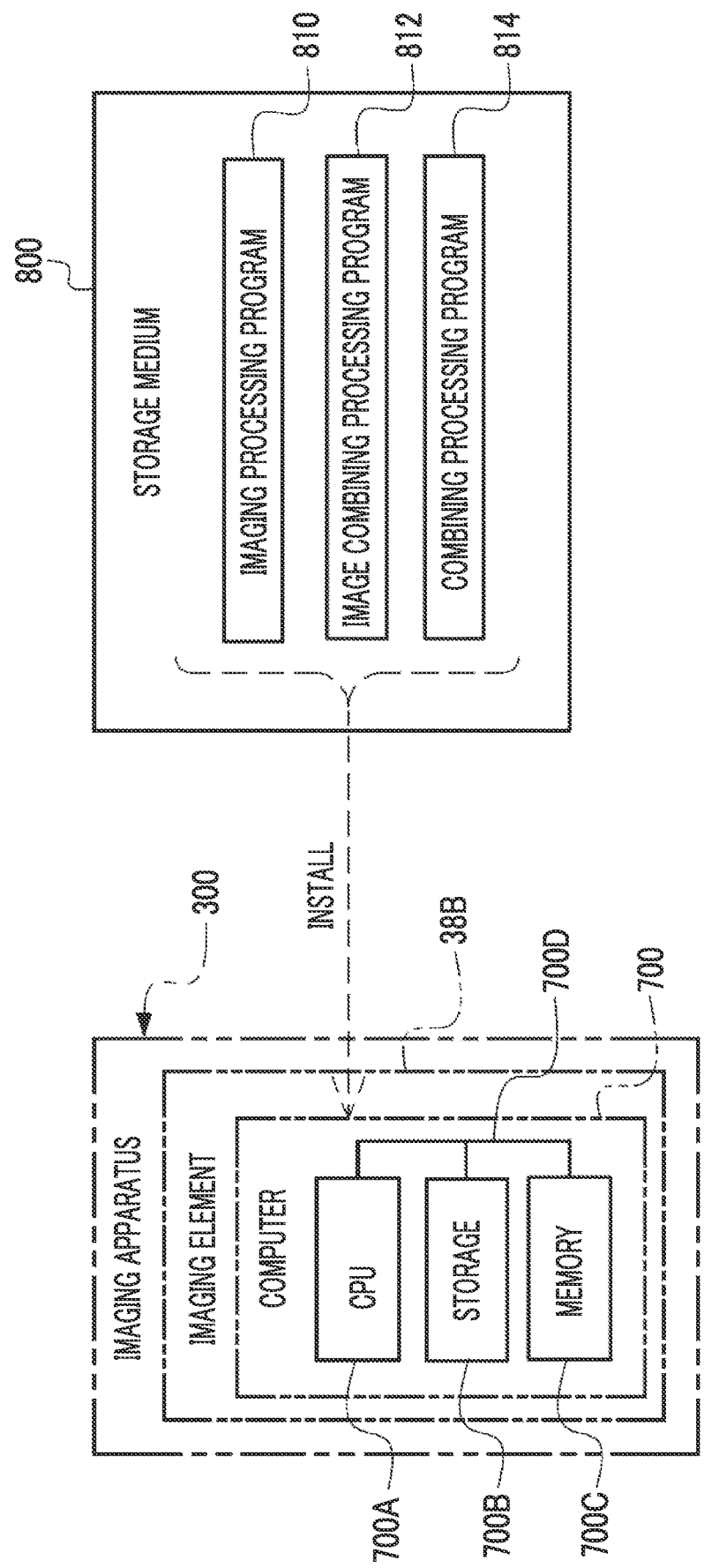
FIG. 35 is a conceptual diagram illustrating an example of an aspect in which an imaging element-side processing program is installed on a computer of the imaging element.

As illustrated in FIG. 35 as an example, an imaging apparatus 300 is different from each of the embodiments in that an imaging element 38B is included instead of the imaging element 38 (38A). The imaging element 38B is different from the imaging element 38 (38A) in that a computer 700 is included instead of the control circuit 110C (210C). The computer 700 is an example of a "computer" according to the embodiments of the technology of the present disclosure. The computer 700 comprises a CPU 700A, a storage 700B, and a memory 700C. The CPU 700A, the storage 700B, and the memory 700C are connected to a bus 700D.

In the example illustrated in FIG. 35, a storage medium 800 stores an imaging processing program 810, an image combining processing program 812, and a combining processing program 814. The storage medium 800 is a non-temporary storage medium. Any portable storage medium such as an SSD or a USB memory is exemplified as an example of the storage medium 800. Hereinafter, the imaging processing program 810, the image combining processing program 812, and the combining processing program 814 will be referred to as an imaging element-side processing program unless otherwise necessary to distinguish therebetween. The imaging element-side processing program is an example of a "program" according to the embodiments of the technology of the present disclosure.

The imaging element-side processing program stored in the storage medium 800 is installed on the computer 700. In addition, the imaging element-side processing program may be stored in a storage (for example, a non-volatile storage device) of another computer, a server apparatus, or the like connected to the computer 700 through a communication network (not illustrated), and the imaging element-side processing program may be downloaded to the computer 700 in response to a request from the imaging apparatus 300 and be installed on the computer 700.

The CPU 700A executes the imaging processing in accordance with the imaging processing program 810, executes the image combining processing in accordance with the image combining processing program 812, and executes the combining processing in accordance with the combining processing program 814. Hereinafter, the imaging processing, the image combining processing, and the combining processing will be referred to as imaging element-side processing unless otherwise necessary to distinguish therebetween.

In the example illustrated in FIG. 35, while an example of a form of incorporating the computer 700 in the imaging element 38B is illustrated, the technology of the present disclosure is not limited thereto. For example, the computer 700 may be disposed on an outside of the imaging element 38B. In addition, in the example illustrated in FIG. 35, the CPU 700A may be a single CPU or include a plurality of CPUs. In addition, a GPU may be applied instead of the CPU 700A. In addition, while an example of a form of implementing the imaging element-side processing using a software configuration is illustrated in FIG. 35, the technology of the present disclosure is not limited thereto. A combination of a software configuration and a hardware configuration such as an ASIC, an FPGA, and/or a PLD may be used.

Figure 36:
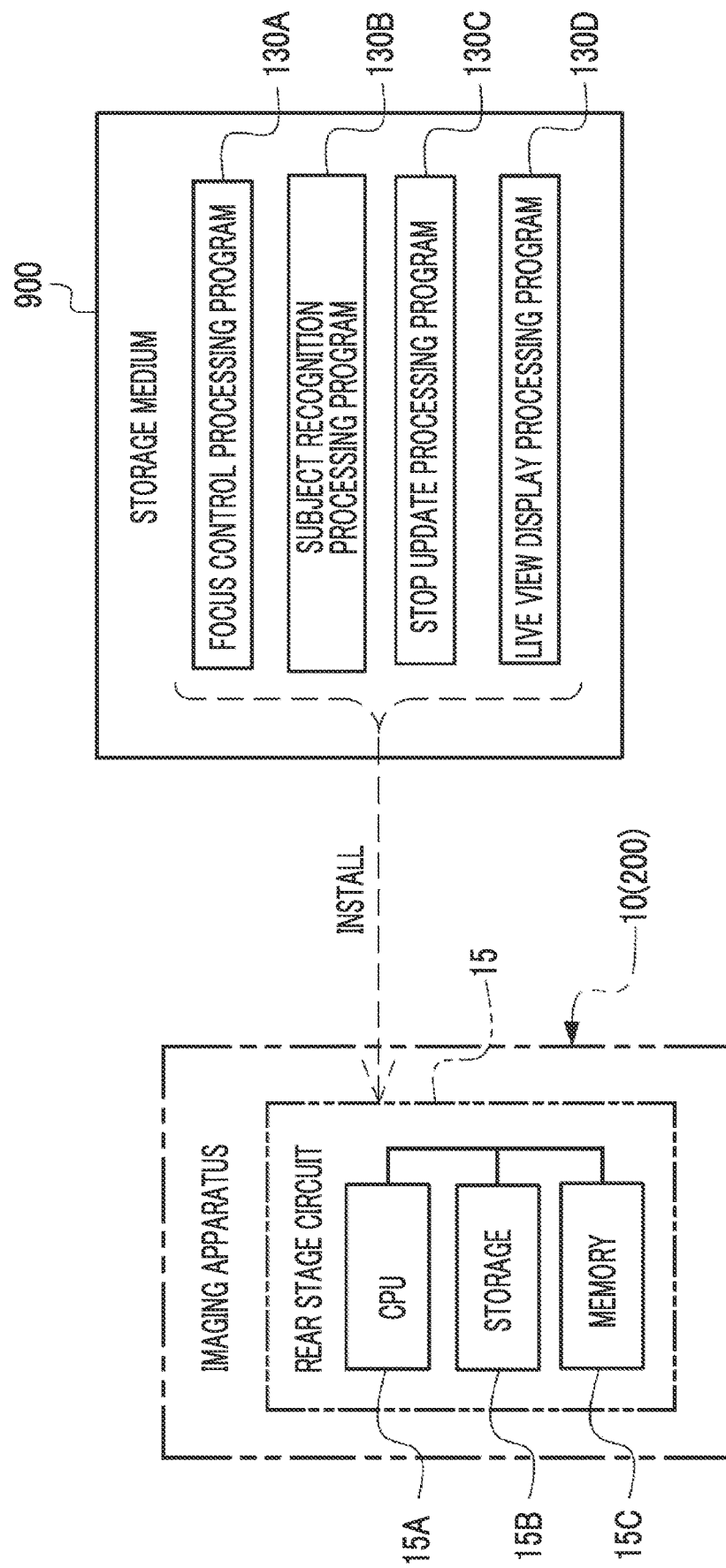
FIG. 36 is a conceptual diagram illustrating an example of an aspect in which a rear stage circuit-side processing program is installed on the rear stage circuit of the imaging apparatus.

In addition, in each of the embodiments, while an example of a form in which the focus control processing program 130A, the subject recognition processing program 130B, the stop update processing program 130C, and the live view display processing program 130D are stored in the storage 15B is illustratively described (refer to FIG. 18), the technology of the present disclosure is not limited thereto. For example, as illustrated in FIG. 36, a distance measurement imaging processing program may be stored in a storage medium 800. The storage medium 800 is a non-temporary storage medium. Any portable storage medium such as an SSD or a USB memory is exemplified as an example of the storage medium 800.

Hereinafter, the focus control processing program 130A, the subject recognition processing program 130B, the stop update processing program 130C, and the live view display processing program 130D will be referred to as a "rear stage circuit-side processing program" unless otherwise necessary to distinguish therebetween. In addition, hereinafter, the focus control processing, the subject recognition processing, the stop update processing, and the live view display processing will be referred to as "rear stage circuit-side processing" unless otherwise necessary to distinguish therebetween. In addition, hereinafter, the imaging apparatuses 10 and 200 will be referred to as the "imaging apparatus" without the reference signs unless otherwise necessary to distinguish therebetween. In addition, hereinafter, the imaging element-side processing and the rear stage circuit-side processing will be referred to as "imaging apparatus processing" unless otherwise necessary to distinguish therebetween.

The rear stage circuit-side processing program stored in the storage medium 800 is installed on the rear stage circuit 15. The CPU 15A executes the rear stage circuit-side processing in accordance with the rear stage circuit-side processing program.

In addition, the rear stage circuit-side processing program may be stored in a storage portion of another computer, a server apparatus, or the like connected to the rear stage circuit 15 through a communication network (not illustrated), and the rear stage circuit-side processing program may be downloaded to the rear stage circuit 15 in response to a request from the imaging apparatus and be installed on the rear stage circuit 15.

The entire rear stage circuit-side processing program does not need to be stored in the storage portion of the other computer, the server apparatus, or the like connected to the rear stage circuit 15 or the storage 15B. A part of the rear stage circuit-side processing program may be stored.

In the example illustrated in FIG. 36, the CPU 15A may be a single CPU or include a plurality of CPUs. In addition, a GPU may be applied instead of the CPU 15A.

In the example illustrated in FIG. 36, while the rear stage circuit 15 is illustrated, the technology of the present disclosure is not limited thereto. A device including an ASIC, an FPGA, and/or a PLD may be applied instead of the rear stage circuit 15. In addition, a combination of a hardware configuration and a software configuration may be used instead of the rear stage circuit 15.

Various processors illustrated below can be used as a hardware resource for executing the imaging apparatus processing described in each of the embodiments. For example, as described above, a CPU that is a general-purpose processor functioning as the hardware resource for executing image data processing by executing software, that is, the program, is exemplified as a processor. In addition, a dedicated electric circuit such as an FPGA, a PLD, or an ASIC that is a processor having a circuit configuration dedicatedly designed to execute a specific type of processing is exemplified as a processor. A memory is incorporated in or connected to any of the processors, and any of the processors executes the imaging apparatus processing using the memory.

The hardware resource for executing the imaging apparatus processing may be configured with one of those various processors or may be configured with a combination of two or more processors of the same type or different types (for example, a combination of a plurality of FPGAs or a combination of a CPU and an FPGA). In addition, the hardware resource for executing the imaging apparatus processing may be one processor.

As an example of a configuration with one processor, first, as represented by a computer such as a client and a server, a form in which one processor is configured with a combination of one or more CPUs and software, and in which this processor functions as a hardware resource for executing the imaging apparatus processing is available. Second, as represented by an SoC or the like, a form of using a processor that implements, by one IC chip, a function of the entire system including a plurality of hardware resources for executing the imaging apparatus processing is available. In such a manner, the imaging apparatus processing is implemented using one or more of the various processors as the hardware resource.

Furthermore, as a hardware structure of those various processors, more specifically, an electric circuit in which circuit elements such as semiconductor elements are combined can be used.

In addition, the various types of processing are merely an example. Accordingly, unnecessary steps may be deleted, new steps may be added, or a processing order may be rearranged without departing from a gist of the technology of the present disclosure.

In addition, in each of the embodiments, while the digital camera of the interchangeable lens type is illustrated as the imaging apparatus, this is merely an example. The technology of the present disclosure can also be applied to electronic apparatuses such as a fixed lens camera, a smart device with an imaging function, a personal computer with an imaging function, or a wearable terminal apparatus with an imaging function. Even in a case where the technology of the present disclosure is applied to these electronic apparatuses, the same actions and effects as the imaging apparatus are obtained.

In addition, while the display 26 is illustrated in each of the embodiments, the technology of the present disclosure is not limited thereto. For example, a separate display that is connected to the imaging apparatus may be used instead of the display 26 or together with the display 26.

Above described contents and illustrated contents are detailed description for parts according to the embodiment of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An imaging apparatus comprising:
an image sensor that incorporates a memory which stores image data obtained by imaging an imaging region at a first frame rate, and a first processor configured to output the image data at a second frame rate less than or equal to the first frame rate; and
an imaging lens including a focus lens,
wherein the first processor is configured to generate combined image data based on the image data of the number of frames calculated in accordance with a depth of field with respect to the imaging region and the focus position interval out of the image data of a plurality of frames obtained by imaging the imaging region at different positions of the focus lens; and
wherein the number of frames is calculated by decoded a number of lens driving pulses as the depth of field and calculating the number of frames based on the decided number of lens driving pulses and the focus position interval.

2. The imaging apparatus according to claim 1, wherein positions at which the imaging region is focused are different from each other in each of a plurality of pieces of the image data used for generating the combined image data.

3. The imaging apparatus according to claim 1, wherein the first processor is configured to generate the combined image data with respect to a partial region of the imaging region from the image data.

4. The imaging apparatus according to claim 1, further comprising:
an optical system including the focus lens,
wherein the first processor is configured to derive the depth of field in accordance with a subject distance with respect to the imaging region and characteristics of the optical system.

5. The imaging apparatus according to claim 4, wherein the characteristics include a focal length and an F number related to the optical system.

6. The imaging apparatus according to claim 5, wherein the first processor is configured to
perform distance measurement with respect to the imaging region, and
derive the subject distance in accordance with a distance measurement result.

7. The imaging apparatus according to claim 6, further comprising:
a plurality of phase difference pixels,
wherein the first processor is configured to perform the distance measurement based on a phase difference image obtained from the plurality of phase difference pixels.

8. The imaging apparatus according to claim 5, wherein the first processor is configured to update the F number in accordance with the derived depth of field.

9. The imaging apparatus according to claim 1, wherein the first processor is configured to perform first combining processing and second combining processing,
the first combining processing is processing of setting a combining condition and generating the combined image data in accordance with the set combining condition,
the first processor is configured to perform the first combining processing until a specific subject is detected based on the combined image data generated by the first combining processing, and
the second combining processing is processing of generating the combined image data in accordance with the combining condition related to the combined image data used for detecting the specific subject in a case where the specific subject is detected.

10. The imaging apparatus according to claim 1, wherein the first processor is configured to output image data of which a focused position decided by a position of the focus lens corresponds to a subject distance of a middle subject within the imaging region out of the image data of the plurality of frames, as live view image data.

11. The imaging apparatus according to claim 1, further comprising:
a second processor configured to receive an input of at least one of the image data output from the first processor or the combined image data,
wherein the second processor is configured to detect a subject based on the combined image data.

12. The imaging apparatus according to claim 1, wherein the first processor is configured to read out the image data of each of the plurality of frames in parallel within an output period defined by the second frame rate as a period in which one frame of the image data is output, and
the memory stores each image data read out in parallel by the first processor in parallel.

13. The imaging apparatus according to claim 1, wherein a ratio of the first frame rate and the second frame rate is an integer.

14. The imaging apparatus according to claim 1, wherein at least a photoelectric conversion element and the memory are formed in one chip in the image sensor.

15. The imaging apparatus according to claim 14, wherein the image sensor is a laminated image sensor in which the photoelectric conversion element and the memory are laminated.

16. An operation method of an imaging apparatus, the operation method comprising:
storing image data obtained by imaging an imaging region at a first frame rate in a memory;
performing processing of combining the image data of a plurality of frames;
acquiring the image data of the number of frames calculated in accordance with a depth of field with respect to the imaging region and the focus position interval out of the image data of the plurality of frames obtained by imaging the imaging region at different positions of a focus lens included in an imaging lens; and
outputting combined image data obtained by performing combining based on the image data at a second frame rate;
wherein the number of frames is calculated by deciding a number of lens driving pulses as the depth of field and calculating the number of frames based on the decided number of lens driving pulses and the focus position interval.

17. A non-transitory recording medium recording a program causing a computer to execute a process comprising:
storing image data obtained by imaging an imaging region at a first frame rate in a memory;
performing processing of combining the image data of a plurality of frames;
acquiring the image data of the number of frames calculated in accordance with a depth of field with respect to the imaging region and the focus position interval out of the image data of the plurality of frames obtained by imaging the imaging region at different positions of a focus lens included in an imaging lens; and
outputting combined image data obtained by performing combining based on the image data at a second frame rate;
wherein the number of frames is calculated by deciding a number of lens driving pulses as the depth of field and calculating the number of frames based on the decided number of lens driving pulses and the focus position interval.

18. The imaging apparatus according to claim 1, wherein in a case where the longest subject distance and the shortest subject distance fall within the distances within the depth of field, the first processor is configured not to generate the combined image data, and
in a case where the longest subject distance and the shortest subject distance do not fall within the distances within the depth of field, the first processor is configured to generate the combined image data.

19. The operation method of the imaging apparatus according to claim 16,
wherein in a case where the longest subject distance and the shortest subject distance fall within the distances within the depth of field, the combined image data is not generated, and
in a case where the longest subject distance and the shortest subject distance do not fall within the distances within the depth of field, the combined image data is generated.

20. The non-transitory recording medium recording the program according to claim 17,
wherein in a case where the longest subject distance and the shortest subject distance fall within the distances within the depth of field, the combined image data is not generated, and
in a case where the longest subject distance and the shortest subject distance do not fall within the distances within the depth of field, the combined image data is generated.

21. The imaging apparatus according to claim 1,
wherein the focus position interval is calculated based on the longest subject distance and the shortest subject distance.

22. The operation method of the imaging apparatus according to claim 16,
wherein the focus position interval is calculated based on the longest subject distance and the shortest subject distance.

23. The non-transitory recording medium recording the program according to claim 17,
wherein the focus position interval is calculated based on the longest subject distance and the shortest subject distance.

* * * * *